United States Patent
Baker et al.

(10) Patent No.: US 11,947,017 B2
(45) Date of Patent: Apr. 2, 2024

(54) LIDAR SYSTEM FOR AUTONOMOUS VEHICLE

(71) Applicant: Aurora Operations, Inc., Pittsburgh, PA (US)

(72) Inventors: Devlin Baker, Bozeman, MT (US); Stephen C. Crouch, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 17/956,389

(22) Filed: Sep. 29, 2022

(65) Prior Publication Data

US 2023/0025474 A1 Jan. 26, 2023

Related U.S. Application Data

(63) Continuation of application No. 17/167,857, filed on Feb. 4, 2021, now Pat. No. 11,500,106, which is a
(Continued)

(51) Int. Cl.
| | |
|---|---|
| *G01S 17/931* | (2020.01) |
| *G01S 17/58* | (2006.01) |
| *G01S 17/894* | (2020.01) |

(52) U.S. Cl.
CPC ............ *G01S 17/931* (2020.01); *G01S 17/58* (2013.01); *G01S 17/894* (2020.01)

(58) Field of Classification Search
CPC .................................................. G01S 17/931
See application file for complete search history.

(56) References Cited

U.S. PATENT DOCUMENTS

| 4,099,249 A | 7/1978 | Casasent |
| 4,620,192 A | 10/1986 | Collins |

(Continued)

FOREIGN PATENT DOCUMENTS

| CN | 101346773 A | 1/2009 |
| CN | 102150007 A | 8/2011 |

(Continued)

OTHER PUBLICATIONS

Stamatis, 3D automatic target recognition for future LIDAR missiles Dec. 2016 IEEE Transactions on Aerospace and Electronic Systems 52(6):2662-2675 DOI:10.1109/TAES.2016.150300.*
(Continued)

*Primary Examiner* — Jean Paul Cass
(74) *Attorney, Agent, or Firm* — FOLEY & LARDNER LLP

(57) ABSTRACT

Techniques for controlling an autonomous vehicle with a processor that controls operation, includes operating a Doppler LIDAR system to collect point cloud data that indicates for each point at least four dimensions including an inclination angle, an azimuthal angle, a range, and relative speed between the point and the LIDAR system. A value of a property of an object in the point cloud is determined based on only three or fewer of the at least four dimensions. In some of embodiments, determining the value of the property of the object includes isolating multiple points in the point cloud data which have high value Doppler components. A moving object within the plurality of points is determined based on a cluster by azimuth and Doppler component values.

15 Claims, 38 Drawing Sheets

Related U.S. Application Data continuation of application No. 16/725,399, filed on Dec. 23, 2019, now Pat. No. 10,914,841, which is a continuation of application No. PCT/US2019/028532, filed on Apr. 22, 2019.

(60) Provisional application No. 62/661,327, filed on Apr. 23, 2018.

(56) References Cited

U.S. PATENT DOCUMENTS

| | | | |
|---|---|---|---|
| 4,648,276 A | 3/1987 | Klepper et al. | |
| 4,804,893 A | 2/1989 | Melocik | |
| 5,075,864 A | 12/1991 | Sakai | |
| 5,216,534 A | 6/1993 | Boardman et al. | |
| 5,223,986 A | 6/1993 | Mayerjak et al. | |
| 5,227,910 A | 7/1993 | Khattak | |
| 5,231,401 A | 7/1993 | Kaman et al. | |
| 5,687,017 A | 11/1997 | Katoh et al. | |
| 5,781,156 A | 7/1998 | Krasner | |
| 5,828,585 A | 10/1998 | Welk et al. | |
| 5,947,903 A | 9/1999 | Ohtsuki et al. | |
| 5,999,302 A | 12/1999 | Sweeney et al. | |
| 6,029,496 A | 2/2000 | Kreft | |
| 6,211,888 B1 | 4/2001 | Ohtsuki et al. | |
| 6,671,595 B2* | 12/2003 | Lu | B60T 8/17551 180/197 |
| 6,753,950 B2 | 6/2004 | Morcom | |
| 6,871,148 B2 | 3/2005 | Morgen et al. | |
| 6,931,055 B1 | 8/2005 | Underbrink et al. | |
| 7,122,691 B2 | 10/2006 | Oshima et al. | |
| 7,152,490 B1 | 12/2006 | Freund et al. | |
| 7,486,802 B2 | 2/2009 | Hougen | |
| 7,511,824 B2 | 3/2009 | Sebastian et al. | |
| 7,639,347 B2* | 12/2009 | Eaton | G01S 7/4818 356/5.1 |
| 7,742,152 B2 | 6/2010 | Hui et al. | |
| 7,917,039 B1 | 3/2011 | Delfyett | |
| 8,135,513 B2 | 3/2012 | Bauer et al. | |
| 8,531,650 B2 | 9/2013 | Feldkhun et al. | |
| 8,751,155 B2 | 6/2014 | Lee | |
| 8,805,197 B2 | 8/2014 | Delfyett | |
| 8,818,609 B1 | 8/2014 | Boyko et al. | |
| 8,831,780 B2 | 9/2014 | Zelivinski et al. | |
| 8,954,252 B1 | 2/2015 | Urmson et al. | |
| 9,041,915 B2 | 5/2015 | Earhart et al. | |
| 9,046,909 B2 | 6/2015 | Leibowitz et al. | |
| 9,086,273 B1 | 7/2015 | Gruver et al. | |
| 9,097,800 B1 | 8/2015 | Zhu | |
| 9,348,137 B2 | 5/2016 | Plotkin et al. | |
| 9,383,753 B1 | 7/2016 | Templeton et al. | |
| 9,607,220 B1 | 3/2017 | Smith et al. | |
| 9,618,742 B1 | 4/2017 | Droz et al. | |
| 9,753,462 B2* | 9/2017 | Gilliland | G05D 1/0214 |
| 10,036,812 B2 | 7/2018 | Crouch et al. | |
| 10,231,705 B2 | 3/2019 | Lee | |
| 10,345,434 B2 | 7/2019 | Hinderling et al. | |
| 10,422,649 B2 | 9/2019 | Engelman et al. | |
| 10,485,508 B2 | 11/2019 | Miyaji et al. | |
| 10,520,602 B2 | 12/2019 | Villeneuve et al. | |
| 10,534,084 B2 | 1/2020 | Crouch et al. | |
| 10,568,258 B2 | 2/2020 | Wahlgren | |
| 10,571,567 B2 | 2/2020 | Campbell et al. | |
| 11,002,856 B2 | 5/2021 | Heidrich et al. | |
| 11,041,954 B2 | 6/2021 | Crouch et al. | |
| 11,249,192 B2 | 2/2022 | Crouch et al. | |
| 11,402,506 B2* | 8/2022 | Ohtomo | G01S 17/89 |
| 11,441,899 B2* | 9/2022 | Pivac | G01S 5/163 |
| 2002/0071109 A1 | 6/2002 | Allen et al. | |
| 2002/0140924 A1 | 10/2002 | Wangler et al. | |
| 2003/0117312 A1 | 6/2003 | Nakanishi et al. | |
| 2004/0034304 A1 | 2/2004 | Sumi | |
| 2004/0109155 A1 | 6/2004 | Deines | |
| 2004/0158155 A1 | 8/2004 | Njemanze | |
| 2004/0222366 A1 | 11/2004 | Frick | |
| 2005/0149240 A1 | 7/2005 | Tseng et al. | |
| 2006/0132752 A1 | 6/2006 | Kane | |
| 2006/0239312 A1 | 10/2006 | Kewitsch et al. | |
| 2007/0005212 A1 | 1/2007 | Xu et al. | |
| 2008/0018881 A1 | 1/2008 | Hui et al. | |
| 2008/0024756 A1 | 1/2008 | Rogers | |
| 2008/0040029 A1 | 2/2008 | Breed | |
| 2008/0100822 A1 | 5/2008 | Munro | |
| 2009/0002679 A1 | 1/2009 | Ruff et al. | |
| 2009/0009842 A1 | 1/2009 | Destain et al. | |
| 2009/0030605 A1 | 1/2009 | Breed | |
| 2010/0094499 A1 | 4/2010 | Anderson | |
| 2010/0183309 A1 | 7/2010 | Etemad et al. | |
| 2010/0188504 A1 | 7/2010 | Dimsdale et al. | |
| 2010/0312432 A1 | 12/2010 | Hamada et al. | |
| 2011/0007299 A1 | 1/2011 | Moench et al. | |
| 2011/0015526 A1 | 1/2011 | Tamura | |
| 2011/0026007 A1 | 2/2011 | Gammenthaler | |
| 2011/0026008 A1 | 2/2011 | Gammenthaler | |
| 2011/0205523 A1 | 8/2011 | Rezk et al. | |
| 2011/0292371 A1 | 12/2011 | Chang | |
| 2012/0038902 A1 | 2/2012 | Dotson | |
| 2012/0127252 A1 | 5/2012 | Lim et al. | |
| 2012/0229627 A1 | 9/2012 | Wang | |
| 2012/0274922 A1 | 11/2012 | Hodge | |
| 2012/0281907 A1 | 11/2012 | Samples et al. | |
| 2012/0306383 A1 | 12/2012 | Munro | |
| 2013/0120989 A1 | 5/2013 | Sun et al. | |
| 2013/0268163 A1 | 10/2013 | Comfort et al. | |
| 2013/0325244 A1 | 12/2013 | Wang et al. | |
| 2014/0036252 A1 | 2/2014 | Amzajerdian et al. | |
| 2014/0064607 A1 | 3/2014 | Grossmann et al. | |
| 2015/0005993 A1 | 1/2015 | Breuing | |
| 2015/0046119 A1 | 2/2015 | Sandhawalia et al. | |
| 2015/0130607 A1 | 5/2015 | Macarthur | |
| 2015/0160332 A1 | 6/2015 | Sebastian et al. | |
| 2015/0177379 A1 | 6/2015 | Smith et al. | |
| 2015/0185244 A1 | 7/2015 | Inoue et al. | |
| 2015/0260836 A1 | 9/2015 | Hayakawa | |
| 2015/0267433 A1 | 9/2015 | Leonessa et al. | |
| 2015/0269438 A1 | 9/2015 | Samarasekera et al. | |
| 2015/0270838 A1 | 9/2015 | Chan et al. | |
| 2015/0282707 A1 | 10/2015 | Tanabe et al. | |
| 2015/0323660 A1 | 11/2015 | Hampikian | |
| 2015/0331103 A1 | 11/2015 | Jensen | |
| 2015/0331111 A1 | 11/2015 | Newman et al. | |
| 2016/0078303 A1 | 3/2016 | Samarasekera et al. | |
| 2016/0084946 A1 | 3/2016 | Turbide | |
| 2016/0091599 A1 | 3/2016 | Jenkins | |
| 2016/0123720 A1 | 5/2016 | Thorpe et al. | |
| 2016/0125739 A1* | 5/2016 | Stewart | B63B 43/18 701/301 |
| 2016/0216366 A1 | 7/2016 | Phillips et al. | |
| 2016/0245903 A1 | 8/2016 | Kalscheur et al. | |
| 2016/0260324 A1 | 9/2016 | Tummala et al. | |
| 2016/0266243 A1 | 9/2016 | Marron | |
| 2016/0274589 A1 | 9/2016 | Templeton et al. | |
| 2016/0350926 A1 | 12/2016 | Flint et al. | |
| 2016/0377721 A1 | 12/2016 | Lardin et al. | |
| 2016/0377724 A1 | 12/2016 | Crouch et al. | |
| 2017/0160541 A1 | 6/2017 | Carothers et al. | |
| 2017/0248691 A1 | 8/2017 | Mcphee et al. | |
| 2017/0299697 A1 | 10/2017 | Swanson | |
| 2017/0329014 A1 | 11/2017 | Moon et al. | |
| 2017/0329332 A1 | 11/2017 | Pilarski et al. | |
| 2017/0343652 A1 | 11/2017 | De Mersseman et al. | |
| 2017/0350964 A1 | 12/2017 | Kaneda | |
| 2017/0350979 A1 | 12/2017 | Uyeno et al. | |
| 2017/0356983 A1 | 12/2017 | Jeong et al. | |
| 2018/0003805 A1 | 1/2018 | Popovich et al. | |
| 2018/0136000 A1 | 5/2018 | Rasmusson et al. | |
| 2018/0188355 A1 | 7/2018 | Bao et al. | |
| 2018/0224547 A1 | 8/2018 | Crouch et al. | |
| 2018/0267556 A1* | 9/2018 | Templeton | G05D 1/0246 |
| 2018/0276986 A1 | 9/2018 | Delp | |
| 2018/0284286 A1 | 10/2018 | Eichenholz et al. | |
| 2018/0299534 A1 | 10/2018 | Lachapelle et al. | |
| 2018/0307913 A1 | 10/2018 | Finn et al. | |
| 2019/0064831 A1 | 2/2019 | Gali et al. | |

(56) References Cited

U.S. PATENT DOCUMENTS

| | | | |
|---|---|---|---|
| 2019/0086514 A1* | 3/2019 | Dussan | G01S 7/484 |
| 2019/0107606 A1 | 4/2019 | Russell et al. | |
| 2019/0154439 A1 | 5/2019 | Binder | |
| 2019/0154832 A1 | 5/2019 | Maleki et al. | |
| 2019/0154835 A1 | 5/2019 | Maleki et al. | |
| 2019/0258251 A1 | 8/2019 | Ditty et al. | |
| 2019/0317219 A1 | 10/2019 | Smith et al. | |
| 2019/0318206 A1 | 10/2019 | Smith et al. | |
| 2019/0346856 A1 | 11/2019 | Berkemeier et al. | |
| 2019/0361119 A1 | 11/2019 | Kim et al. | |
| 2020/0025879 A1 | 1/2020 | Pacala et al. | |
| 2020/0049819 A1 | 2/2020 | Cho et al. | |
| 2021/0089047 A1* | 3/2021 | Smith | G05D 1/0246 |
| 2021/0165102 A1 | 6/2021 | Crouch et al. | |
| 2021/0325664 A1 | 10/2021 | Adams et al. | |
| 2023/0025474 A1* | 1/2023 | Baker | G01S 17/87 |

FOREIGN PATENT DOCUMENTS

| | | |
|---|---|---|
| CN | 103227559 A | 7/2013 |
| CN | 104793619 A | 7/2015 |
| CN | 104956400 A | 9/2015 |
| CN | 105425245 A | 3/2016 |
| CN | 105629258 A | 6/2016 |
| CN | 105652282 A | 6/2016 |
| CN | 107015238 A | 8/2017 |
| CN | 107193011 A | 9/2017 |
| CN | 207318710 U | 5/2018 |
| DE | 10 2007 001 103 A1 | 7/2008 |
| DE | 10 2017 200 692 A1 | 8/2018 |
| EP | 1 298 453 A2 | 4/2003 |
| EP | 1 298 453 B1 | 4/2003 |
| EP | 2 243 042 B1 | 10/2010 |
| EP | 3 330 766 A1 | 6/2018 |
| GB | 2 349 231 A | 10/2000 |
| JP | S63-071674 A | 4/1988 |
| JP | H06-148556 A | 5/1994 |
| JP | H09-257415 A | 10/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 3422720 B2 | 6/2003 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2018-204970 A | 12/2018 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/132020 A1 | 9/2014 |
| WO | WO-2015/037173 A1 | 3/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |
| WO | WO-2018/102190 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

Korean Office Action issued in connection with KR Appl. Ser. No. 10-2021-7023519 dated Feb. 13, 2023.

Chester, David B. "A Parameterized Simulation of Doppler Lidar", All Graduate Thesis and Dissertions, Dec. 2017, Issue 6794, <URL: https://digitalcommons.usu.edu/etd/6794 > * pp. 13-14, 27-28, 45*.

Notice of Reasons of Rejection issued in connection with JP Appl. Ser. No. 2022-000212 dated Feb. 7, 2023.

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion—Shadows and Occlusion—Peachpit", Jul. 3, 2006 (Jul. 3, 2006), P055697780, Retrieved from the Internet:URL:https://www.peachpit.com/articles/article.aspx?p=486505&seqNum=7[retrieved on May 25, 2020] 2 pages.

Aull, B. et al., "Geiger-Mode Avalanche Photodiodes for Three-Dimensional Imaging," Lincoln Laboratory Journal, vol. 13, No. 2, 2002, pp. 335-350.

Bashkansky, M. et al., "RF phase-coded random-modulation LIDAR," Optics Communications, vol. 231, 2004, pp. 93-98.

Beck, S. et al., "Synthetic-aperture imaging laser radar: laboratory demonstration and signal processing," Applied Optics, vol. 44, No. 35, Dec. 10, 2005, pp. 7621-7629.

Berkovic, G. and Shafir, E., "Optical methods for distance and displacement measurements", Advances in Optics and Photonics, vol. 4, Issue 4, Dec. 2012, pp. 441-471.

Besl, P. and Mckay, N., "A Method for Registration of 3-D shapes", IEEE Transactions on Pattern Analysis and Machine Intelligence, vol. 14, No. 2, Feb. 1992, pp. 239-256.

Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.

Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.

Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.

Chinese Office Action on CN Appl. Ser. No. 201880009947.5 dated Oct. 11, 2021 (5 pages).

Contu, F., "The Do's and Don'ts of High Speed Serial Design in FPGA's". Xilinix All Programmable, Copyright 2013, High Speed Digital Design & Validation Seminars 2013, pp. 1-61.

Crouch, S. and Barber, Z., "Laboratory demonstrations of interferometric and spotlight synthetic aperture ladar techniques," Optics Express, vol. 20, No. 22, Oct. 22, 2012, pp. 24237-24246.

Crouch, S. et al., "Three dimensional digital holographic aperture synthesis", Optics Express, vol. 23, No. 18, Sep. 7, 2015, pp. 23811-23816.

Dapore, B. et al., "Phase noise analysis of two wavelength coherent imaging system", Optics Express, vol. 21, No. 25, Dec. 16, 2013, pp. 30642-30652.

Decision of Rejection on JP Appl. Ser. No. 2019-527155 dated Jun. 8, 2021 (8 pages).

(56) References Cited

OTHER PUBLICATIONS

Decision of Rejection on JP Appl. Ser. No. 2020-559530 dated Aug. 31, 2021 (13 pages).
Duncan, B. and Dierking, M., "Holographic aperture ladar: erratum", Applied Optics, vol. 52, No. 4, Feb. 1, 2013, pp. 706-708.
Duncan, B. et al., "Holographic aperture ladar", Applied Optics, vol. 48, Issue 6, Feb. 20, 2009, pp. 1168-1177.
El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
European Office Action on EP 17876731.5 dated Feb. 21, 2022 (5 pages).
Examination Report on EP Appl. Ser. No. 17898933.1 dated May 25, 2022 (5 pages).
Examination Report on EP Appl. Ser. No. 19791789.1 dated Dec. 21, 2021 (12 pages).
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Fehr, D. et al., "Compact Covariance descriptors in 3D point clouds for object recognition," presented at the Robotics and Automation (ICRA), May 14, 2012, IEEE International Conference, pp. 1793-1798.
Final Office Action on U.S. Appl. No. 16/464,657 dated Jun. 30, 2022.
Final Office Action on U.S. Appl. No. 16/725,399 dated Aug. 26, 2020 (57 pages).
Final Rejection on U.S. Appl. No. 17/167,857 dated Oct. 25, 2021 (46 pages).
Final U.S. Office Action on U.S. Appl. No. 17/331,362 dated Nov. 29, 2021 (17 pages).
First Office Action on CN Appl. Ser. No. 201780081215.2 dated Mar. 3, 2021 (14 pages).
First Office Action on CN Appl. Ser. No. 201780081968.3 dated Dec. 3, 2020 (6 pages).
First Office Action on CN Appl. Ser. No. 201980033898.3 dated Apr. 20, 2021 (14 pages).
Foucras, M. et al., "Detailed Analysis of the Impact of the Code Doppler on the Acquisition Performance of New GNSS Signals," Ion ITM, International Technical Meeting of The Institute of Navigation, San Diego, California, Jan. 27, 2014, pp. 1-13.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions In Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).
International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3x3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).
Lu et al., "Recognizing objects in 3D point clouds with multi-scale features", Sensors 2014, 14, 24156-24173; doi: 10.3390/s141224156 (Year: 2014).
Lu, M. et al, "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.
Mackinnon, D. et al., "Adaptive laser range scanning", American Control Conference, Piscataway, NJ, 2008, pp. 3857-3862.
Marron, J. et al., "Three-dimensional Lensless Imaging Using Laser Frequency Diversity", Applied Optics, vol. 31, No. 2, Jan. 10, 1992, pp. 255-262.
Miyasaka, T. et al., "Moving Object Tracking and Identification in Traveling Environment Using High Resolution Laser Radar", Graphic Information Industrial, vol. 43, No. 2, pp. 61-69, Feb. 1, 2011.
Monreal, J. et al., "Detection of Three Dimensional Objects Based on Phase Encoded Range Images", Sixth International Conference on Correlation Optics, vol. 5477, Jun. 4, 2004, pp. 269-280.
Munkres, J., "Algorithms for the Assignment and Transportation Problems", Journal of the Society for Industrial and Applied Mathematics, vol. 5, No. 1, Mar. 1957, pp. 32-38.
Non-Final Office Action on U.S. Appl. No. 16/464,063 dated Apr. 22, 2022 (23 pages).
Non-Final Office Action on U.S. Appl. No. 16/464,648 dated Jun. 1, 2021 (6 pages).
Non-Final Office Action on U.S. Appl. No. 16/464,657 dated Dec. 22, 2021 (17 pages).

(56) References Cited

OTHER PUBLICATIONS

Non-Final Office Action on U.S. Appl. No. 16/535,127 dated Jun. 3, 2022 (6 pages).
Non-Final Office Action on U.S. Appl. No. 16/725,399 dated Mar. 5, 2020 (53 pages).
Non-Final Office Action on U.S. Appl. No. 17/167,857 dated Apr. 6, 2022 (50 pages).
Notice of Allowance for U.S. Appl. No. 16/725,399 dated Dec. 3, 2020 (11 pages).
Notice of Allowance on KR Appl. Ser. No. 10-2019-7019062 dated Feb. 10, 2021 (4 Pages).
Notice of Allowance on KR Appl. Ser. No. 10-2019-7019076 dated Feb. 15, 2021 (4 pages).
Notice of Allowance on KR Appl. Ser. No. 10-2019-7019078 dated Feb. 15, 2021 (4 pages).
Notice of Allowance on U.S. Appl. No. 16/464,063 dated Aug. 9, 2022.
Notice of Allowance on U.S. Appl. No. 17/167,857 dated Aug. 8, 2022.
Notice of Allowance on U.S. Appl. No. 17/167,857 dated Aug. 24, 2022.
Notice of Allowance on U.S. Appl. No. 15/423,978 dated Jul. 15, 2019 (8 pages).
Notice of Allowance on U.S. Appl. No. 15/645,311 dated Apr. 18, 2019 (13 pages).
Notice of Allowance on U.S. Appl. No. 16/515,538 dated Feb. 23, 2021 (16 pages).
Notice of Final Rejection for KR Appl. Ser. No. 10-2021-7019744 dated Jan. 25, 2022 (3 pages).
Notice of Preliminary Rejection on KR Appl. Ser. No. 10-2021-7014545 dated Aug. 19, 2021 (17 pages).
Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).
Notice of Reasons for Refusal on JP Appl. Ser. No. 2020-559530 dated Apr. 20, 2021 (11 pages).
Notice of Reasons for Refusal on JP Appl. Ser. No. 2021-118743 dated Jun. 7, 2022 (9 pages).
Notice of Reasons for Refusal on JP Appl. Ser. No. 2021-165072 dated Apr. 19, 2022 (10 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Apr. 26, 2022 (11 pages).
Notice of Reasons for Refusal on JP Appl. Ser. No. 2021-538998 dated Nov. 30, 2021 (20 pages).
Notice of Reasons for Rejection issued in connection with JP Appl. Ser. No. JP 2021-126516 dated Jun. 21, 2022 (16 pages).
O'donnell, R., "Radar Systems Engineering Lecture 11 Waveforms and Pulse Compression," IEEE New Hampshire Section, Jan. 1, 2010, pp. 1-58.
Office Action for U.S. Appl. No. 17/167,857 dated Jun. 28, 2021 (37 pages).
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).
Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.
Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Chinese Office Action on CN Appl. Ser. No. 201880009947.5 dated Apr. 4, 2022 (3 pages).
Second Chinese Office Action on CN Appl. Ser. No. 201980033898.3 dated Oct. 27, 2021 (6 pages).
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
U.S. Notice of Allowance on US dated Sep. 14, 2022.
U.S. Notice of Allowance on U.S. Appl. No. 17/331,362 dated Feb. 17, 2022 (14 pages).
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.
Wikipedia, "Digital-to-analog converter", retrieved from https://en.wikipedia.org/wiki/Digital-to-analog_converter, on Apr. 15, 2017, 7 pages.
Wikipedia, "Field-programmable gate array", retrieved from https://en.wikipedia.org/wiki/Field-programmable_gate_array, on Apr. 15, 2017, 13 pages.
Wikipedia, "In-phase and quadrature components", retrieved from https://en.wikipedia.org/wiki/In-phase_and_quadrature_components, on Jan. 26, 2018, 3 pages.
Wikipedia, "Phase-shift keying", retrieved from https://en.wikipedia.org/wiki/Phase-shift_keying#Binary_phase-shift_keying.28BPSK.29, on Oct. 23, 2016, 9 pages.
Ye, J., "Least Squares Linear Discriminant Analysis", 24th International Conference on Machine Learning, pp. 1087-1093 (as of Nov. 27, 2016).
Extended European Search Report issued in connection with EP Appl. No. 23189916.2 dated Nov. 9, 2023.

* cited by examiner

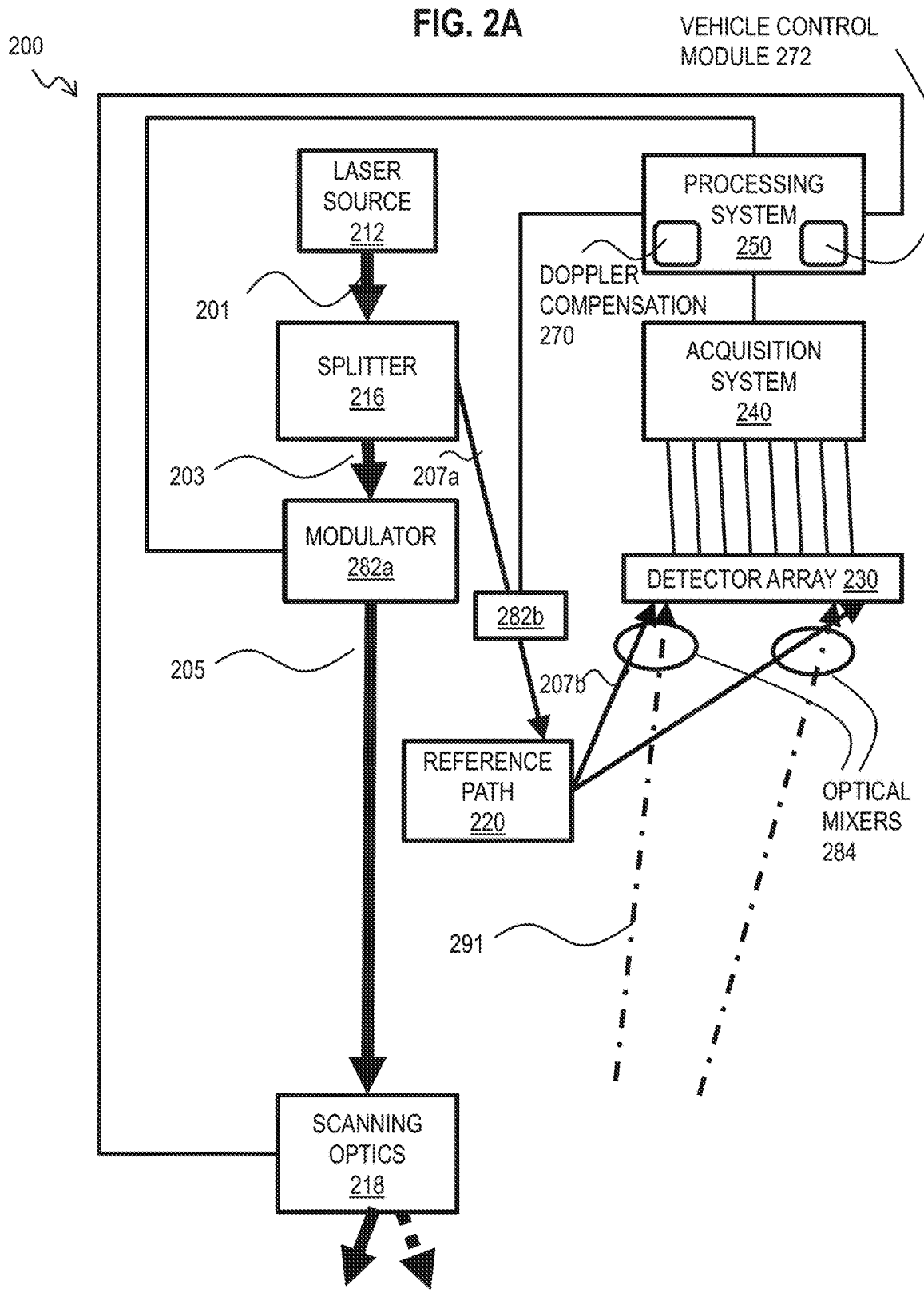

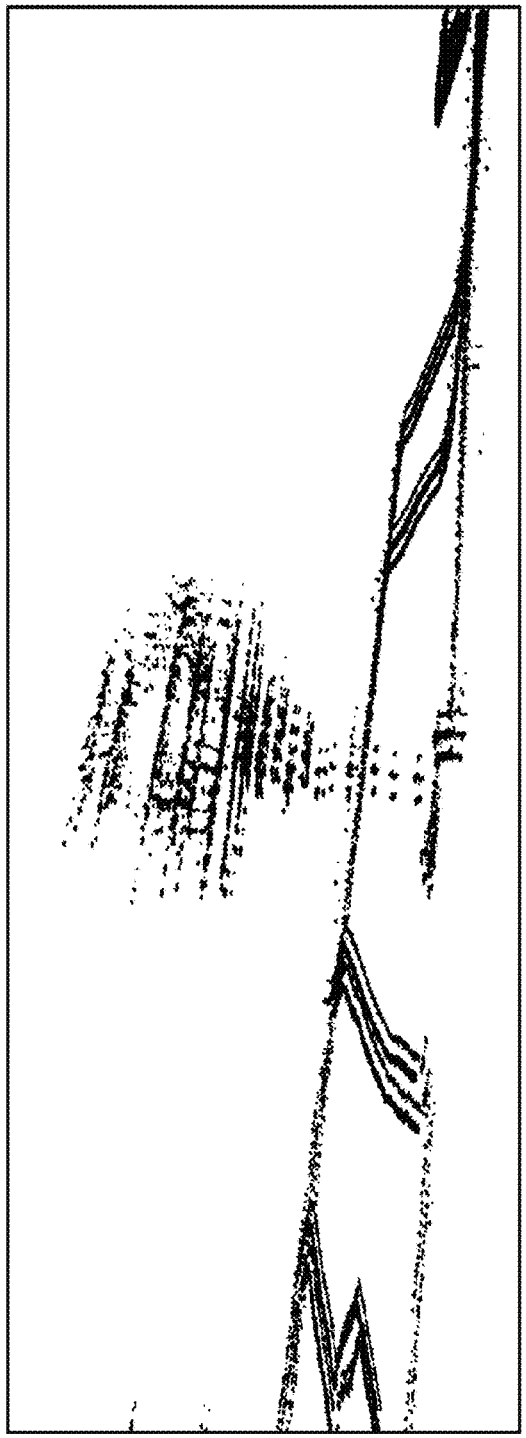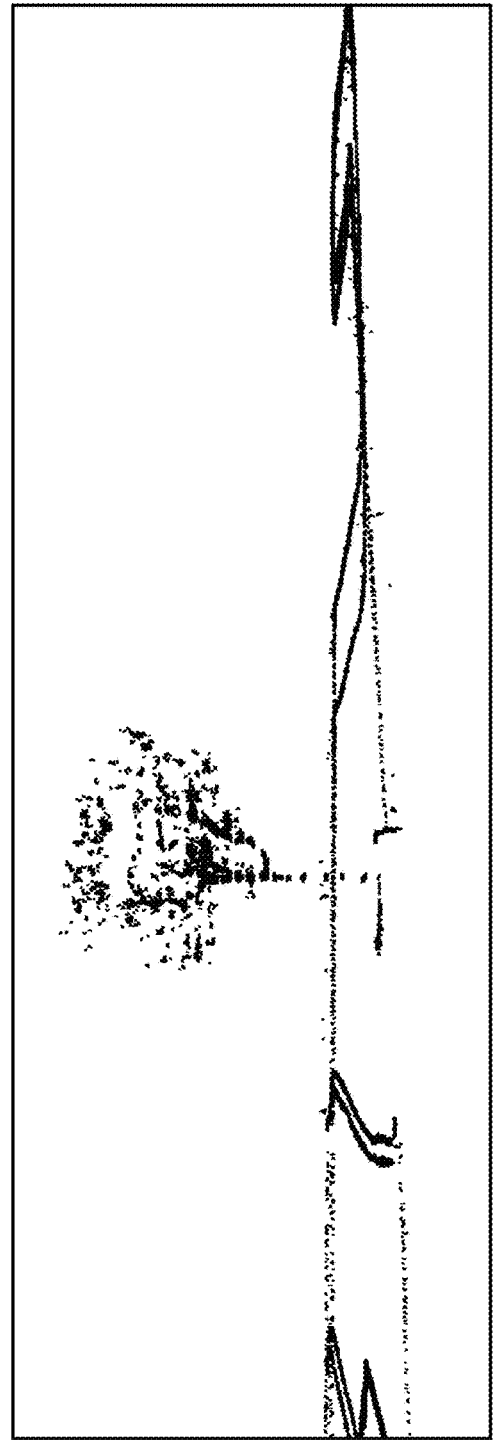
FIG. 5B
FIG. 5C

Object 1
1191
● $t_1$

Object 2
● 1192
$t_2$ $r_1$ $r_2$ $l_1$ $l_2$
1121
$p$
Sensor $r_1 - r_2 = t_1 - t_2$ $r = rRl$ $R(r_1 l_1 - r_2 l_2) = t_1 - t_2$ $R\Delta l = \Delta t$ $p = rRl + t$

FIG. 11

Object 1
1391

Object 2
1392

$V = l'V$ $V_1 - V_2 = l'_1 V - l'_2 V = (l'_1 - l'_2)'V$ $\Delta l' V = \Delta V$ $V_{global} = RV_{local}$ $V$ $l_1$  $l_2$ 1321 $p$ Sensor

LIDAR SYSTEM FOR AUTONOMOUS VEHICLE

CROSS-REFERENCE TO RELATED APPLICATIONS

This application is a continuation of U.S. patent application Ser. No. 17/167,857, filed Feb. 4, 2021, which is a continuation of U.S. patent application Ser. No. 16/725,399, filed Dec. 23, 2019, which is a continuation of International Application No. PCT/US2019/028532, filed Apr. 22, 2019, which claims the benefit of and priority to U.S. Patent Application No. 62/661,327, filed Apr. 23, 2018. The entire disclosures of U.S. patent application Ser. No. 17/167,857, U.S. patent application Ser. No. 16/725,399, International Application No. PCT/US2019/028532, and U.S. Patent Application No. 62/661,327 are hereby incorporated by reference as if fully set forth herein.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work by current inventors, show a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO2018/160240 and WO/2018/144853 based on Patent Cooperation Treaty (PCT) patent applications PCT/US2017/062703 and PCT/US2018/016632, respectively.

Autonomous navigation solutions require the cooperation of a multitude of sensors to reliably achieve desired results. For example, modern autonomous vehicles often combine cameras, radars, and LIDAR systems for spatial awareness. These systems further employ Global Positioning System (GPS) solutions, inertial measurement units, and odometer to generate location, velocity and heading within a global coordinate system. This is sometimes referred to as an inertial navigation system (INS) "solution." The navigation task represents an intricate interplay between the proposed motion plan (as directed by the INS and mapping software) and the avoidance of dynamic obstacles (as informed by the cameras, radar, and LIDAR systems). The dependence of these two subsystems becomes complicated when sub-components of either system behaves unreliably. The INS solution is notoriously unreliable, for example.

SUMMARY

The current inventors have recognized that hi-res range-Doppler LIDAR can be utilized to improve the control of an autonomous vehicle. For example, when a component of prior INS solution fails, data feeds from the hi-res range-Doppler LIDAR may be called upon to help localize the vehicle. An example would be searching for objects with known relative positions (e.g., lane markings) or known geospatial positions (e.g., a building or roadside sign or orbiting markers) in an attempt to improve solutions for a vehicle's position and velocity.

In a first set of embodiments, a method implemented on a processor configured for operating a Doppler LIDAR system includes operating a Doppler LIDAR system to collect point cloud data that indicates for each point at least four dimensions including an inclination angle, an azimuthal angle, a range, and relative speed between the point and the LIDAR system. The method also includes determining a value of a property of an object in the point cloud based on only three or fewer of the at least four dimensions.

In some of embodiments of the first set, determining the value of the property of the object includes isolating multiple points in the point cloud data which have high value Doppler components; and determining a moving object within the plurality of points based on a cluster by azimuth and Doppler component values.

In some embodiments of the first set, determining the value of the property of the object in the point cloud includes identifying a plurality of stationary points in the point cloud based at least in part on an inclination angle for each point in the plurality of stationary points. This method further includes determining a ground speed of the LIDAR based on a plurality of relative speeds corresponding to the plurality of stationary points. In some of these embodiments, identifying the plurality of stationary points includes discarding from the plurality of stationary points a point with relative speed that deviates more than a threshold from a statistic based on the plurality of relative speeds corresponding to the plurality of stationary points. In some embodiments, the method includes determining an azimuthal direction of a LIDAR velocity based on an azimuthal angle associated with a stationary point for which the relative speed is a maximum among the plurality of stationary points.

In some embodiments of the first set, the method includes de-skewing by changing an azimuth or inclination or range of a point in the point cloud data based on a current LIDAR velocity and a time difference from a fixed time within a scan period.

In a second set of embodiments, a method implemented on a processor configured for operating a high resolution LIDAR system includes operating a high resolution LIDAR system to collect point cloud data that indicates for each point at least four dimensions including an inclination angle, an azimuthal angle, a range, and a reflectivity of the point. The method also includes determining multiple objects in the point cloud. Each object is based on multiple adjacent points in the point cloud with high values of reflectivity. Furthermore, the method includes determining a corresponding number of objects in a database. Each object in the database has a known position. Still further, the method includes determining a position of the Doppler LIDAR system based at least in part on the known position of each object in the database for the corresponding objects in the database.

In a third set of embodiments, a method implemented on a processor configured for operating a Doppler LIDAR system includes operating a Doppler LIDAR system to collect point cloud data that indicates for each point at least four dimensions including an inclination angle, an azimuthal angle, a range, relative speed between the point and the LIDAR system, and a reflectivity of the point. The method includes determining multiple objects in the point cloud. Each object is based on either adjacent points in the point cloud with high values of reflectivity, or adjacent points in the point cloud with relative speed values approximately appropriate for globally stationary objects. The method also includes determining a corresponding number of objects in a database. Each object in the database has a known position. The method further includes determining a velocity of the Doppler LIDAR system based at least in part on the known position of each object in the database for the corresponding objects in the database.

In a fourth set of embodiments, a method implemented on a processor configured for operating a Doppler LIDAR system includes operating a Doppler LIDAR system to collect point cloud data that indicates for each point at least four dimensions including an inclination angle, an azimuthal angle, a range, relative speed between the point and the LIDAR system, and a reflectivity of the point. The method also includes determining multiple spots on an object in the point cloud. The object is based on either adjacent points in the point cloud with high values of reflectivity, or a cluster of azimuth angle and Doppler component values. The method still further includes determining a rotation rate or global velocity of the object based on a difference in Doppler component values among the spots on the object.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates example components of a high resolution (hi res) Doppler LIDAR system, according to an embodiment;

FIG. 5B is a plot that illustrates an example raw Doppler LIDAR point cloud, rendered in x/y/z space, not compensated for ego-motion, according to an embodiment;

FIG. 5C. is a plot that illustrates an example processed Doppler LIDAR point cloud, rendered in x/y/z space, range-compensated for ego-motion, based on Doppler-computed velocity solution, according to an embodiment;

FIG. 11 is a block diagram that illustrates example components of a computation to determine own position relative to detected surveyed objects (stationary objects in a mapping database), according to an embodiment;

DETAILED DESCRIPTION

Figure 1A:
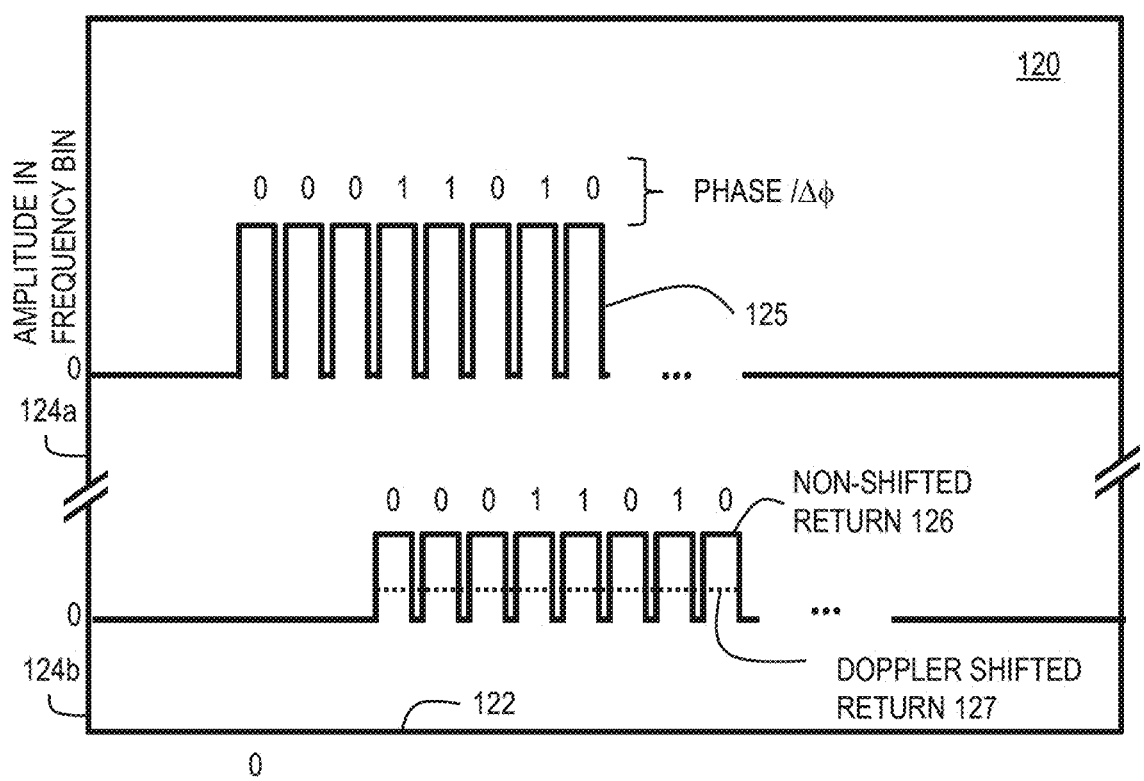
FIG. 1A is a schematic graph that illustrates the example transmitted signal as a series of binary digits along with returned optical signals for measurement of range, according to an embodiment.

A method and apparatus and system and computer-readable medium are described for use of Doppler correction of optical range detection to operate a vehicle. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a single front mounted hi-res Doppler LIDAR system on a personal automobile; but, embodiments are not limited to this context. In other embodiments, multiple systems with overlapping or non-overlapping fields of view or one or more such systems mounted on smaller or larger land or sea or air or space vehicles (whether autonomous or semi-autonomous or operator assisted) are employed. In some embodiments, the high resolution Doppler LIDAR is one, as described in inventors' earlier work, that uses a continuous wave (CW) laser with external modulation. External modulation provides advantages in enabling waveform flexibility through electronic control, reducing laser requirements (laser is just CW), allowing novel methods for simultaneous range and Doppler (velocity measurement), and allowing better performance at low SNR's when the beam is quickly traversing different speckle realizations.

1. Phase-Encoded Detection Overview

Using an optical phase-encoded signal for measurement of range, the transmitted signal is in phase with a carrier (phase=0) for part of the transmitted signal and then changes by one or more phases changes represented by the symbol $\Delta\phi$ (so phase=$\Delta\phi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as Δϕ)*{0, 1, 2 and 3}, which, for Δϕ=π/2 (90 degrees), equals {0, π/2, π and 3π/2}, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (thus, it is a non-coherent scheme).

For optical ranging applications, the carrier frequency is an optical frequency fc and a RF $f_0$ is modulated onto the optical carrier. The number N and duration τ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+$f_0$ in arbitrary units relative to zero. The vertical axis 124b indicates amplitude of an optical returned signal at frequency fc+$f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is diminished.

The observed frequency f' of the return differs from the correct frequency f=fc+$f_0$ of the return by the Doppler effect given by Equation 1.

$$f' = \frac{(c + v_o)}{(c + v_s)} f \quad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, Δf=f'−f, is the Doppler shift, $\Delta f_D$, which causes problems for the range measurement, and is given by Equation 2.

$$\Delta f_D = \left[\frac{(c + v_o)}{(c + v_s)} - 1\right] f \quad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

In phase coded ranging, the arrival of the phase coded reflection is detected in the return by cross correlating the transmitted signal or other reference signal with the returned signal, implemented practically by cross correlating the code for a RF signal with an electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time Δt after the start of the transmitted signal. This indicates that the returned signal includes a version of the transmitted phase code beginning at the time Δt. The range R to the reflecting (or backscattering) object is computed from the two way travel time delay based on the speed of light c in the medium, as given by Equation 3.

$$R = c*\Delta t/2 \quad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined and range R is not as readily produced.

Figure 1B:
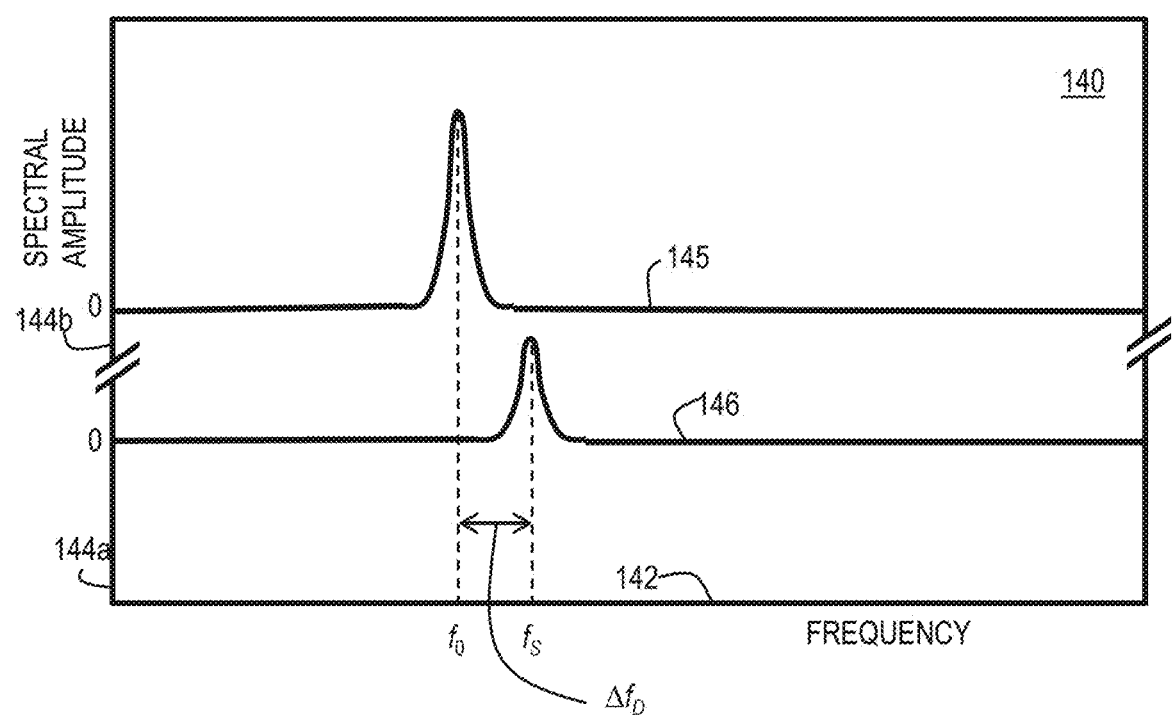
FIG. 1B is a schematic graph that illustrates an example spectrum of the reference signal and an example spectrum of a Doppler shifted return signal, according to an embodiment.

According to various embodiments of the inventor's previous work, the Doppler shift is determined in the electrical processing of the returned signal; and the Doppler shift is used to correct the cross correlation calculation. Thus a peak is more readily found and range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF $f_0$; but, instead, is blue shifted by $\Delta f_D$ to a shifted frequency fs. In practice, a complex return representing both in-phase and quadrature (I/Q) components of the return is used to determine the peak at $+\Delta f_D$, thus the direction of the Doppler shift, and the direction of motion of the target on the vector between the sensor and the object, is apparent from a single return.

Figure 1C:
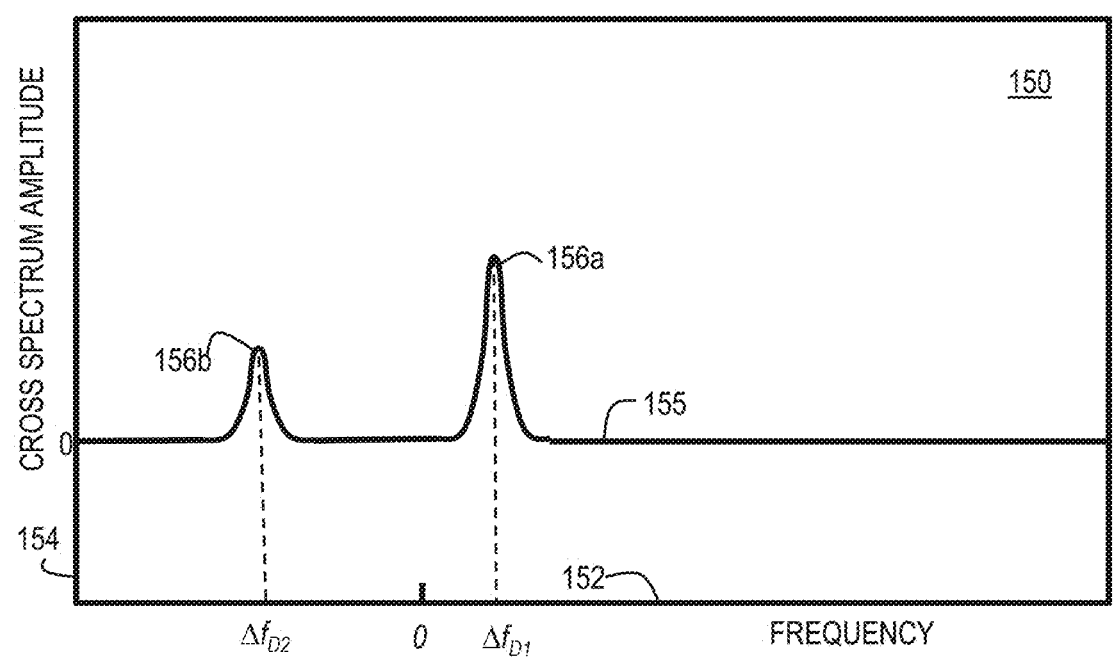
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it is more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1B) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a signed velocity of approach of objects in the vicinity of the LIDAR, as can be critical for collision avoidance applications. However, if I/Q processing is not done, peaks appear at both $+/-\Delta f_{D1}$ and both $+/-\Delta f_{D2}$, so there is ambiguity on the sign of the Doppler shift and thus the direction of movement.

As described in more detail in inventor's previous work the Doppler shift(s) detected in the cross spectrum are used to correct the cross correlation so that the peak 135 is apparent in the Doppler compensated Doppler shifted return at lag $\Delta t$, and range R can be determined. In some embodiments simultaneous I/Q processing is performed as described in more detail in international patent application publication entitled "Method and system for Doppler detection and Doppler correction of optical phase-encoded range detection" by S. Crouch et al., WO2018/144853. In other embodiments, serial I/Q processing is used to determine the sign of the Doppler return as described in more detail in patent application publication entitled "Method and System for Time Separated Quadrature Detection of Doppler Effects in Optical Range Measurements" by S. Crouch et al., WO20019/014177. In other embodiments, other means are used to determine the Doppler correction; and, in various embodiments, any method or apparatus or system known in the art to perform Doppler correction is used.

2. Chirped Detection Overview

Figure 1D:
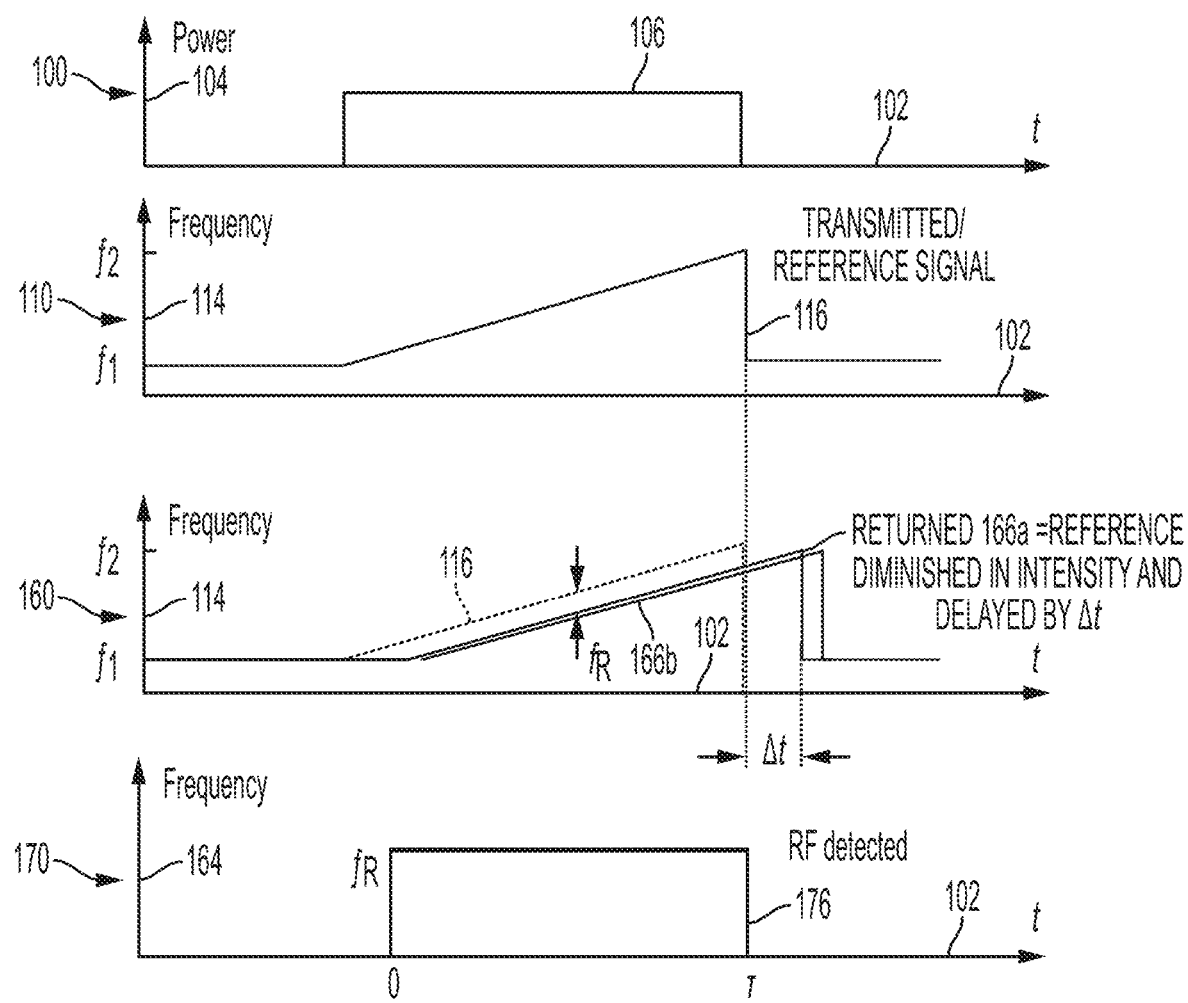
FIG. 1D is a set of graphs that illustrates an example optical chirp measurement of range, according to an embodiment.

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, r starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration r of the pulse, and thus has a bandwidth $B=f_2-f_1$. The frequency rate of change is $(f_2-f_1)/\tau$.

The returned signal is depicted in graph 160 which has a horizontal axis 102 that indicates time and a vertical axis 114 that indicates frequency as in graph 110. The chirp 116 of graph 110 is also plotted as a dotted line on graph 160. A first returned signal is given by trace 166a, which is just the transmitted reference signal diminished in intensity (not shown) and delayed by $\Delta t$. When the returned signal is received from an external object after covering a distance of 2R, where R is the range to the target, the returned signal start at the delayed time $\Delta t$ is given by 2R/c, where c is the speed of light in the medium (approximately $3\times10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R=(f_2-f_1)\tau*2R/c=2BR/c\tau \qquad (4a)$$

The value of $f_R$ is measured by the frequency difference between the transmitted signal 116 and returned signal 166a in a time domain mixing operation referred to as de-chirping. So the range R is given by Equation 4b.

$$R=f_R c\tau/2B \qquad (4b)$$

Of course, if the returned signal arrives after the pulse is completely transmitted, that is, if 2R/c is greater than $\tau$, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990. The disadvantage is that the digitizer bandwidth requirement is generally higher. The positive aspects of coherent detection are otherwise retained.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 1E:
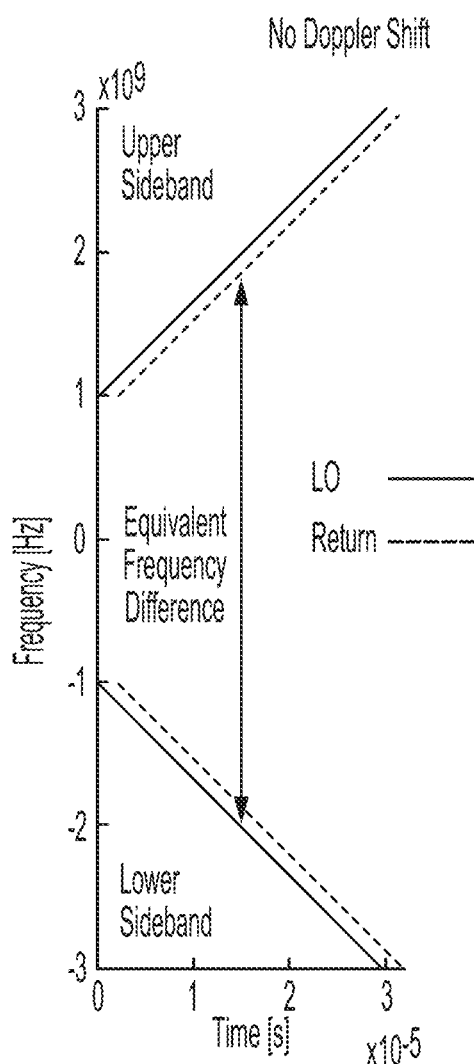
FIG. 1E is a graph using a symmetric LO signal, and shows the return signal in this frequency time plot as a dashed line when there is no Doppler shift, according to an embodiment.

FIG. 1E is a graph using a symmetric LO signal, and shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency $f_c$ or reference signal in example units of GigaHertz ($10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneous decreases from $f_4$ to $f_3$ (e.g., 1 to 2 GHz below the optical carrier) The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1<f_1<f_p<f_1<f_4$. Though, in the illustrated embodiment, the higher frequencies provide the up chirp and the lower frequencies provide the down chirp, in other embodiments, the higher frequencies produce the down chirp and the lower frequencies produce the up chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

As described in U.S. patent application publication by Crouch et al., entitled "Method and System for Doppler Detection and Doppler Correction of Optical Chirped Range Detection," WO2018/160240, when selecting the transmit (TX) and local oscillator (LO) chirp waveforms, it is advantageous to ensure that the frequency shifted bands of the system take maximum advantage of available digitizer bandwidth. In general this is accomplished by shifting either the up chirp or the down chirp to have a range frequency beat close to zero.

Figure 1F:
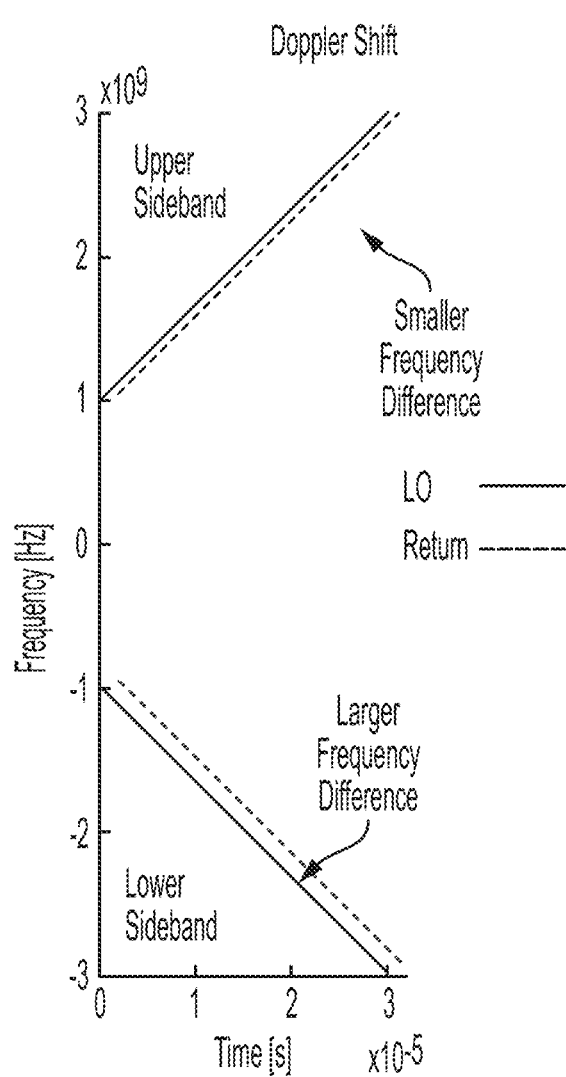
FIG. 1F is a graph similar to FIG. 1E, using a symmetric LO signal, and shows the return signal in this frequency time plot as a dashed line when there is a non zero Doppler shift, according to an embodiment.

FIG. 1F is a graph similar to FIG. 1E, using a symmetric LO signal, and shows the return signal in this frequency time plot as a dashed line when there is a non zero Doppler shift. In the case of a chirped waveform, the time separated I/Q processing (aka time domain multiplexing) can be used to overcome hardware requirements of other approaches as described above. In that case, an AOM is used to break the range-Doppler ambiguity for real valued signals. In some embodiments scoring system is used to pair the up and down chirp returns as described in more detail in the above cited patent application publication WO2018/160240. In other embodiments, I/Q processing is used to determine the sign of the Doppler chirp as described in more detail in patent application publication entitled "Method and System for Time Separated Quadrature Detection of Doppler Effects in Optical Range Measurements" by S. Crouch et al., WO20019/014177.

3. Optical Detection Hardware Overview

In order to depict how to use hi-res range-Doppler detection systems, some generic hardware approaches are described. FIG. 2A is a block diagram that illustrates example components of a high resolution Doppler LIDAR system, according to an embodiment. Optical signals are indicated by arrows. Electronic wired or wireless connections are indicated by segmented lines without arrowheads. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers 284 to produce an optical signal of characteristics to be properly detected. The frequency, phase or amplitude of the interference pattern, or some combination, is recorded by acquisition system 240 for each detector at multiple times during the signal duration D.

The number of temporal samples processed per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 19, or a chip set described below with reference to FIG. 20. A signed Doppler compensation module 270 determines the sign and size of the Doppler shift and the corrected range based thereon along with any other corrections described herein. In some embodiments, the processing system 250 also provides scanning signals to drive the scanning optics 218, and includes a modulation signal module to send one or more electrical signals that drive modulators 282a, 282b, as illustrated in FIG. 2. In the illustrated embodiment, the processing system also includes a vehicle control module 272 to provide information on the vehicle position and movement relative to a shared geospatial coordinate system or relative to one or more detected objects or some combination. In some embodiments the vehicle control module 272 also controls the vehicle (not shown) in response to such information.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount $\Delta fs$, so that the beat frequencies of the up and down chirps occur in different frequency bands, which can be picked up, e.g., by the FFT component in processing system 250, in the analysis of the electrical signal output by the optical detector 230. For example, if the blue shift causing range effects is $f_B$, then the beat frequency of the up chirp will be increased by the offset and occur at $f_B+\Delta fs$ and the beat frequency of the down chirp will be decreased by the offset to $f_B-\Delta fs$. Thus, the up chirps will be in a higher frequency band than the down chirps, thereby separating them. If $\Delta fs$ is greater than any expected Doppler effect, there will be no ambiguity in the ranges associated with up chirps and down chirps.

The measured beats can then be corrected with the correctly signed value of the known $\Delta fs$ to get the proper up-chirp and down-chirp ranges. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources.

Figure 2B:
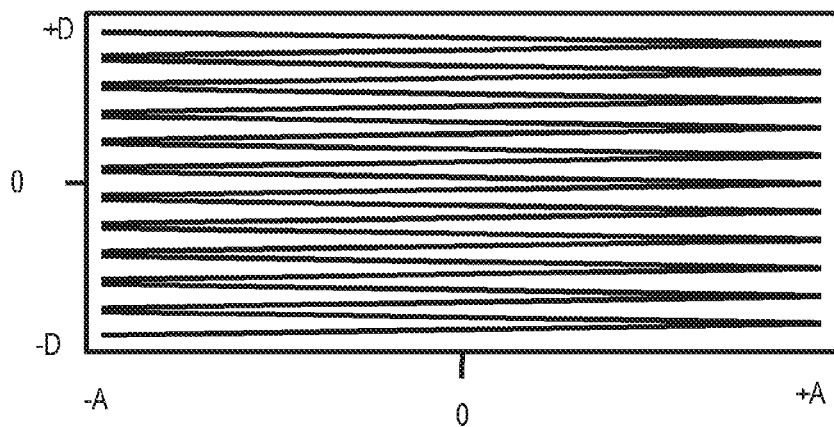
FIG. 2B is a block diagram that illustrates a saw tooth scan pattern for a hi-res Doppler system, used in some embodiments.

FIG. 2B is a block diagram that illustrates a saw tooth scan pattern for a hi-res Doppler LIDAR system, used in some embodiments. The scan sweeps through a range of azimuth angles (horizontally) and inclination angles (vertically above and below a level direction at zero inclination). In other embodiments, other scan patters are used. Any scan pattern known in the art may be used in various embodiments. For example, in some embodiments, adaptive scanning is performed using methods described in international patent application publications by Crouch entitled "Method and system for adaptive scanning with optical ranging systems," WO2018/125438, or entitled "Method and system for automatic real-time adaptive scanning with optical ranging systems," WO2018/102188.

Figure 2C:
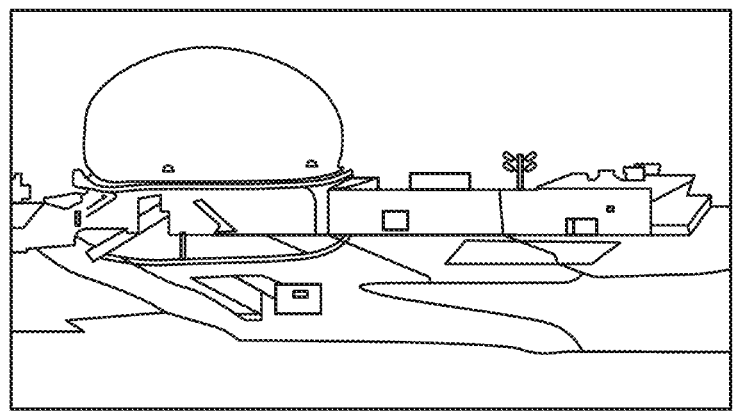
FIG. 2C is an image that illustrates an example speed point cloud produced by a hi-res Doppler LIDAR system, according to an embodiment.

FIG. 2C is an image that illustrates an example speed point cloud produced by a scanning hi-res Doppler LIDAR system, according to an embodiment. Although called a point cloud each element of the cloud represents the return from a spot. The spot size is a function of the beam width and the range. In some embodiments, the beam is a pencil beam that has circularly symmetric Gaussian collimated beam and cross section diameter (beam width) emitted from the LIDAR system, typically between about 1 millimeters (mm, 1 mm=$10^{-3}$ meters) and 100 mm. Each pixel of the 2D image indicates a different spot illuminated by a particular azimuth angle and inclination angle, and each spot has associated a range (third dimension) and speed ($4^{th}$ dimension) relative to the LIDAR. In some embodiments, a reflectivity measure is also indicated by the intensity or amplitude of the returned signal (a fifth dimension). Thus, each point of the point cloud represents at least a 4D vector and possibly a 5D vector.

Using the above techniques, a scanning hi-res range-Doppler LIDAR produces a high-resolution 3D point cloud image with point by point signed relative speed of the scene in view of the LIDAR system. With current hi-res Doppler LIDARs, described above, a Doppler relative speed is determined with high granularity (<0.25 m/s) across a very large speed spread (>+/−100 m/s). The use of coherent measurement techniques translates an inherent sensitivity to Doppler into a simultaneous range-Doppler measurement for the LIDAR scanner. Additionally, the coherent measurement techniques allow a very high dynamic range measurement relative to more traditional LIDAR solutions. The combination of these data fields allows for powerful vehicle location in the presence of INS dropouts.

4. Vehicle Control Overview

In some embodiments a vehicle is controlled at least in part based on data received from a hi-res Doppler LIDAR system mounted on the vehicle.

Figure 3A:
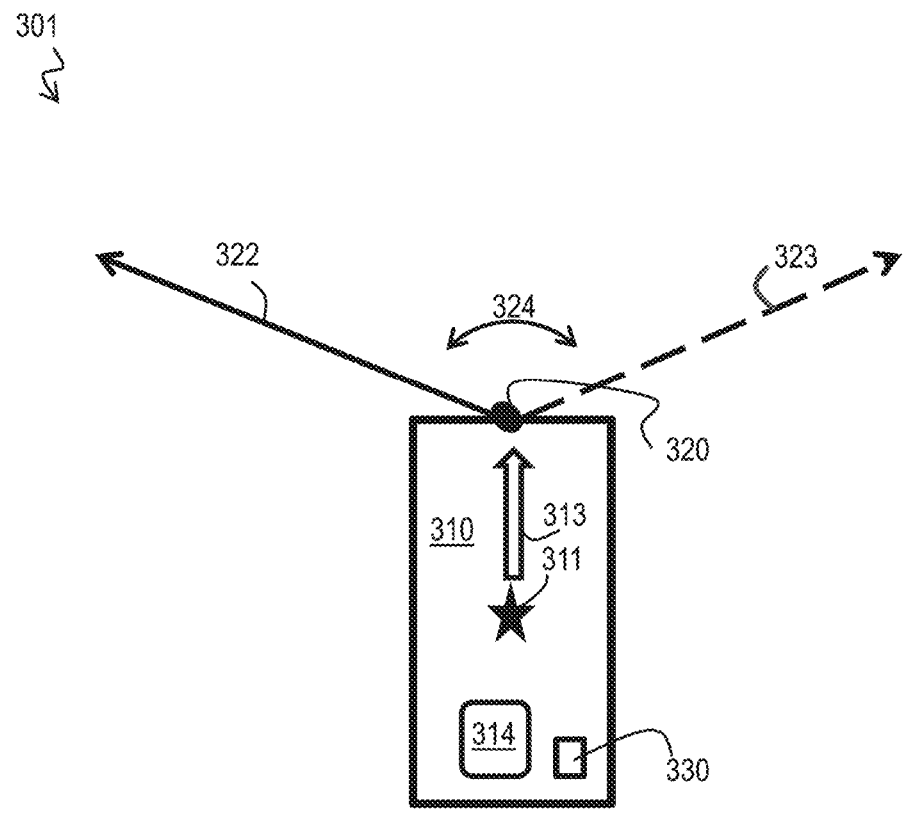
FIG. 3A is a block diagram that illustrates an example system that includes at least one hi-res Doppler LIDAR system mounted on a vehicle, according to an embodiment.
Figure 3A:
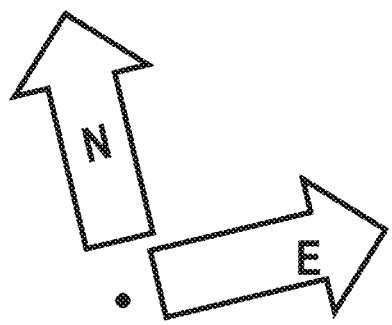

FIG. 3A is a block diagram that illustrates an example system that includes at least one hi-res Doppler LIDAR system 320 mounted on a vehicle 310, according to an embodiment. The vehicle has a center of mass indicted by a star 311 and travels in a forward direction given by arrow 313. In some embodiments, the vehicle 310 includes a component, such as a steering or braking system (not shown), operated in response to a signal from a processor. In some embodiments the vehicle has an on-board processor 314, such as chip set depicted in FIG. 20. In some embodiments, the on board processor 314 is in wired or wireless communication with a remote processor, as depicted in FIG. 19. The hi-res Doppler LIDAR uses a scanning beam 322 that sweeps from one side to another side, represented by future beam 323, through an azimuthal field of view 324, as well as through vertical angles (not shown) illuminating spots in the surroundings of vehicle 310. In some embodiments, the field of view is 360 degrees of azimuth. In some embodiments the inclination angle field of view is from about +10 degrees to about −10 degrees or a subset thereof.

In some embodiments, the vehicle includes ancillary sensors (not shown), such as a GPS sensor, odometer, tachometer, temperature sensor, vacuum sensor, electrical voltage or current sensors, among others well known in the art. In some embodiments, a gyroscope 330 is included to provide rotation information.

Also depicted in FIG. 3A is a global coordinate system represented by an arrow pointing north and an arrow pointing east from a known geographic location represented by a point at the base of both arrows. Data in a mapping system, as a geographical information system (GIS) database is positioned relative to the global positioning system. In controlling a vehicle, it is advantageous to know the location and heading of the vehicle in the global coordinate system as well as the relative location and motion of the vehicle compared to other moving and non-moving objects in the vicinity of the vehicle.

Figure 3B:
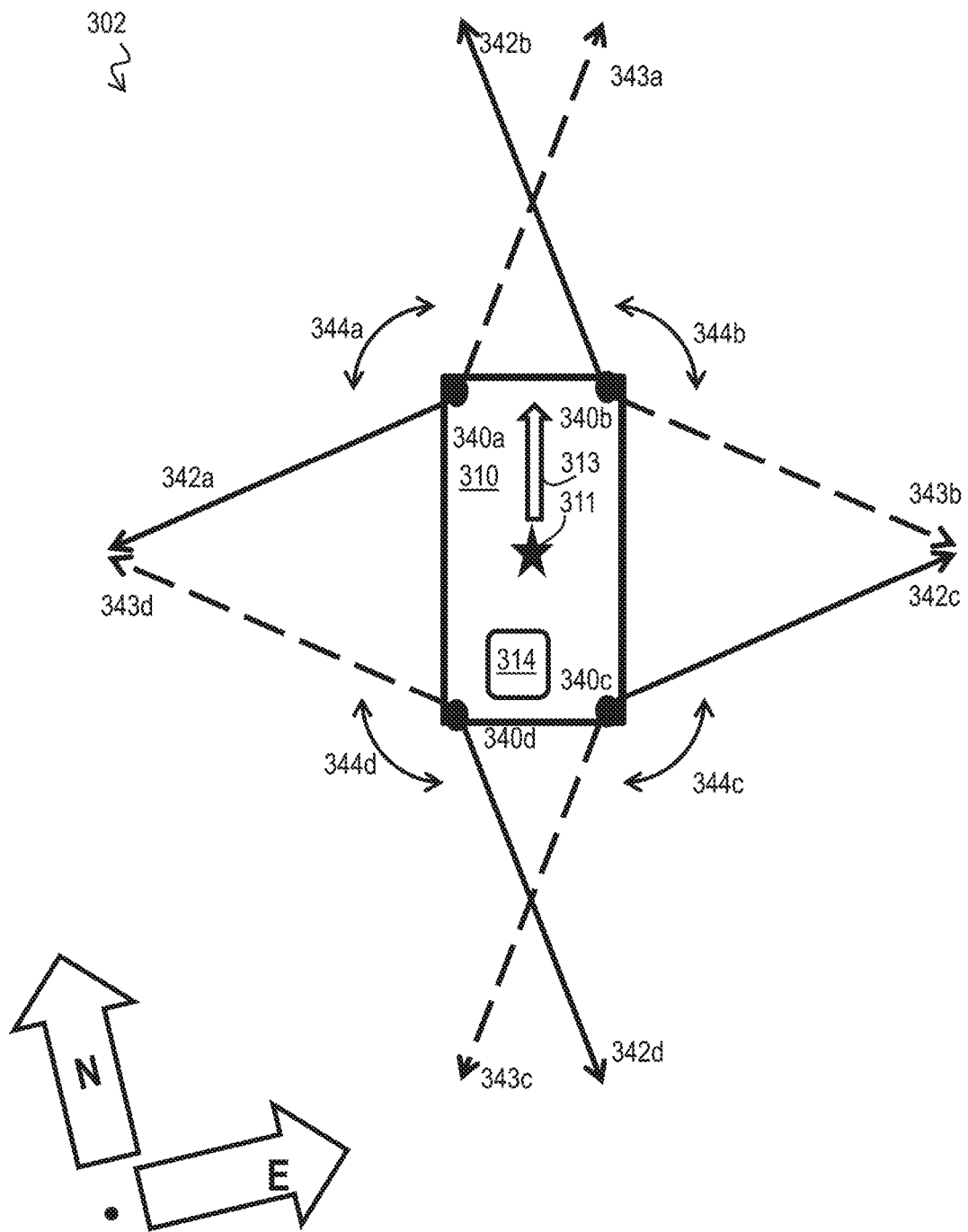
FIG. 3B is a block diagram that illustrates an example system that includes multiple hi-res Doppler LIDAR system mounted on a vehicle, according to an embodiment.

FIG. 3B is a block diagram that illustrates an example system that includes multiple hi-res Doppler LIDAR systems mounted on a vehicle 310, according to an embodiment. Items 310, 311, 313 and 314, and the global coordinate system, are as depicted in FIG. 3A. Here the multiple hi-res Doppler LIDAR systems, 340a, 340b, 340c, 340c (collectively referenced hereinafter as LIDAR systems 340) are positioned on the vehicle 310 to provide complete angular coverage, with overlap at some angles, at least for ranges beyond a certain distance. FIG. 3B also depicts the fields of view 344a, 344b, 344c, 344d, respectively (hereinafter collectively referenced as fields of view 344) between instantaneous leftmost beams 342a, 342b, 342c, 342d, respectively (hereinafter collectively referenced as leftmost beams 342) and rightmost beams 343a, 343b, 343c, 343d, respectively (hereinafter collectively referenced as rightmost beams 343). In other embodiments, more or fewer hi-res Doppler LIDAR systems 340 are used with smaller or larger fields of view 344.

Figure 3C:
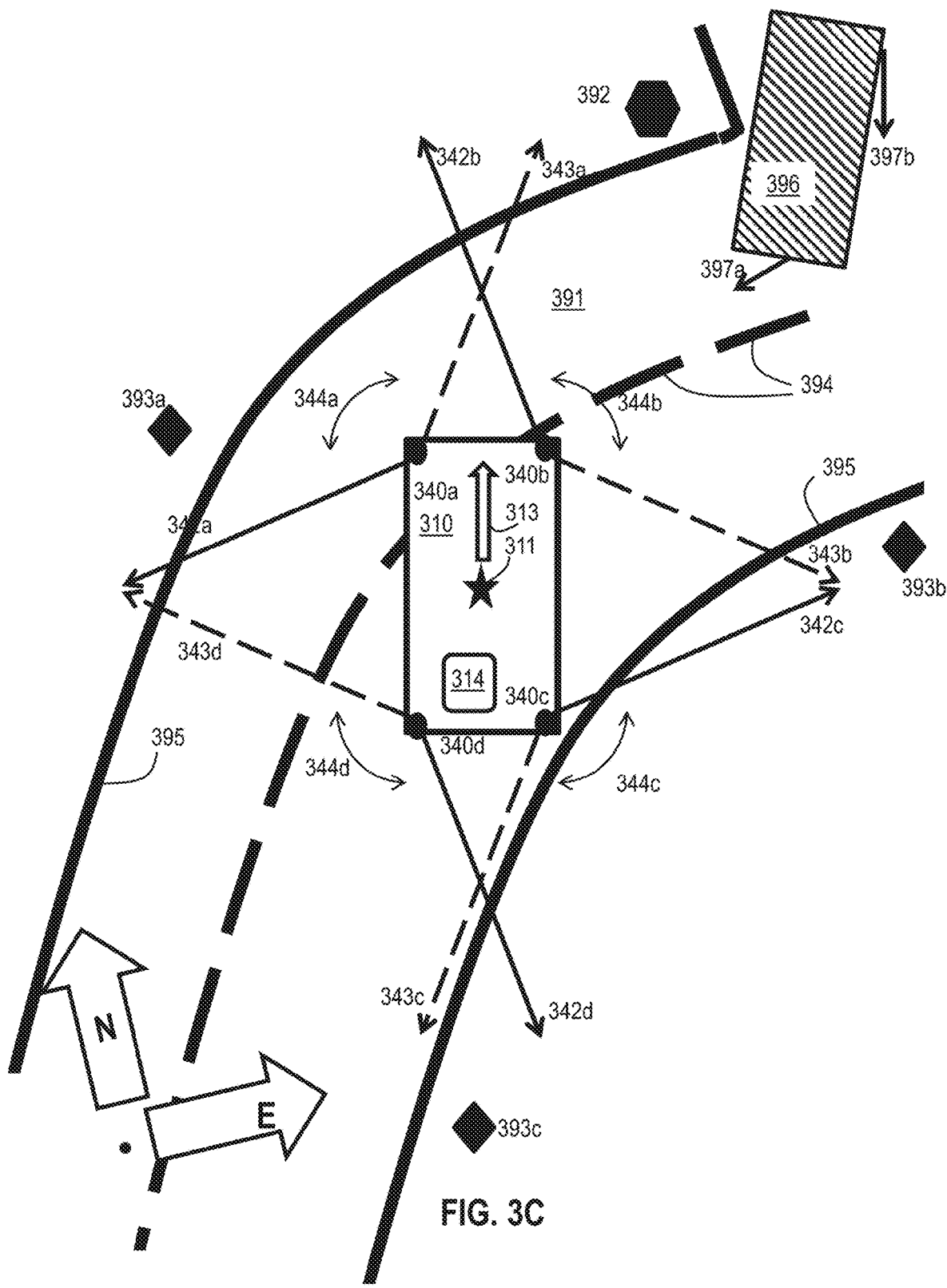
FIG. 3C is a block diagram that illustrates an example system that includes multiple hi-res Doppler LIDAR system mounted on a vehicle in relation to objects detected in the point cloud, according to an embodiment.

FIG. 3C is a block diagram that illustrates an example system that includes multiple hi-res Doppler LIDAR systems 340 mounted on a vehicle 310 in relation to objects detected in the point cloud, according to an embodiment. Items 310, 311, 313, 314, 340, 342, 343 and 344, as well as the global coordinate system, are as depicted in FIG. 3B. Items detectable in a 3D point cloud from the systems 340 includes road surface 391, curbs 395, stop sign 392, light posts 393a, 393b, 393c (collectively referenced hereinafter as light posts 393), lane markings 394 and moving separate vehicle 396. The separate moving vehicle 396 is turning and so has a different velocity vector 397a at a front of the vehicle from a velocity vector 397b at the rear of the vehicle. Some of these items, such as stop sign 392 and light posts 393, might have global coordinates in a GIS database.

Figure 4:
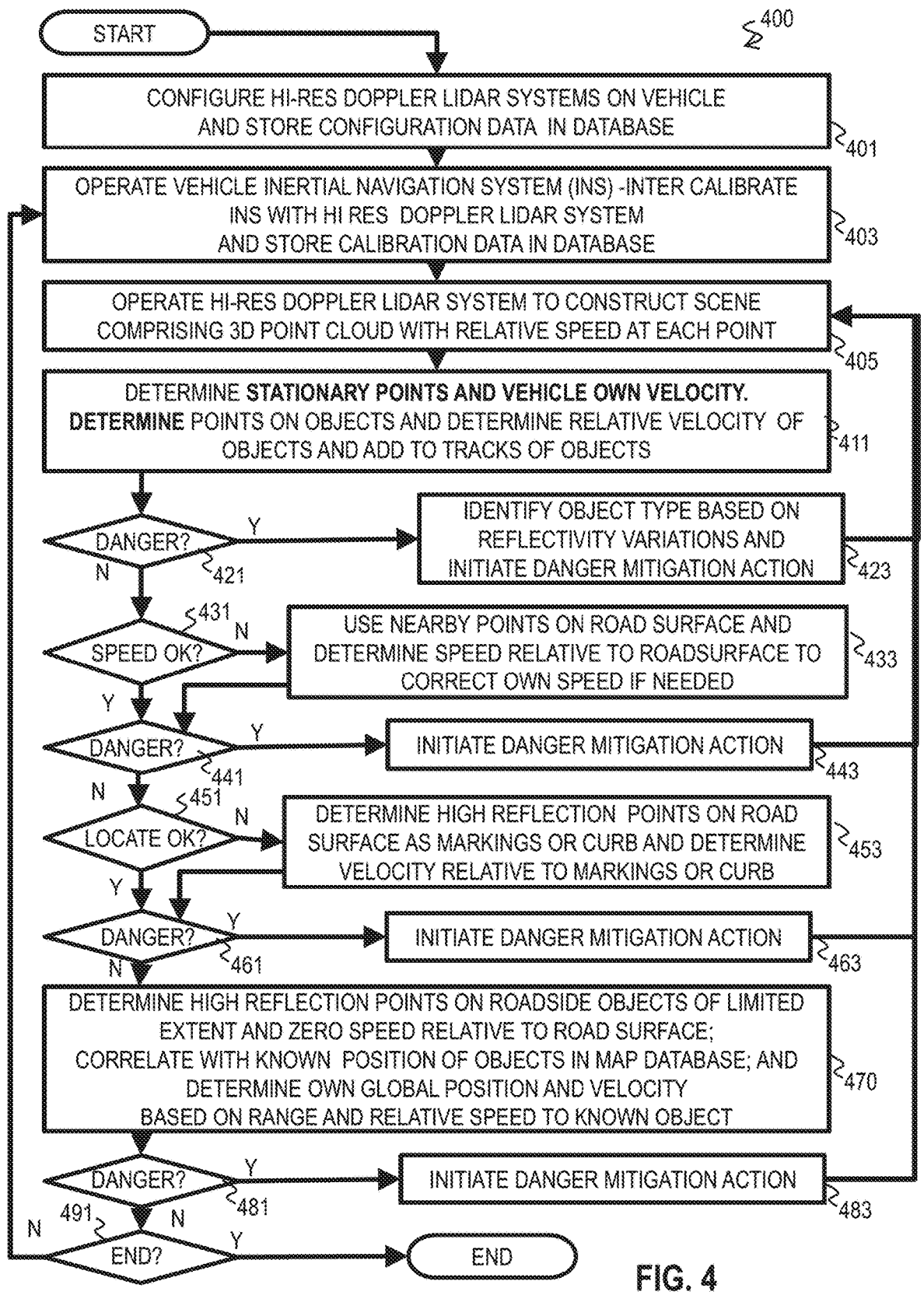
FIG. 4 is a flow chart that illustrates an example method for using data from a hi res Doppler LIDAR system in an automatic vehicle setting, according to an embodiment.

FIG. 4 is a flow chart that illustrates an example method 400 for using data from a high resolution Doppler LIDAR system in an automatic or assisted vehicle setting, according to an embodiment. Although steps are depicted in FIG. 4, and in subsequent flowcharts in FIG. 6, FIG. 8, FIG. 10, FIG. 12, FIG. 14 and FIG. 16, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, a high-resolution Doppler LIDAR system 340 is configured on a vehicle 310 (also called an own vehicle below to distinguish form separate vehicles 396 in the vicinity). In some embodiments, the configuration includes installing the LIDAR system 340 on the vehicle 310. Configuration data is stored in one or more own vehicle databases, either locally on vehicle 310 or remotely or some combination. Configuration data includes at least the position of the system 340 relative to a center of mass 311 of the vehicle and a field of view 344 of the system relative to the forward direction 313 of the vehicle. In some embodiments, step 40 includes storing other constants or parameter values of methods used in one or more of the following steps, such as a value for a solution tolerance for the own vehicle's velocity as described below with reference to FIG. 8.

In step 403, sensors systems on own vehicle are operated. For example, an inertial navigation system (INS) is operated to obtain speed information from the odometer, position information from a Global Positioning System (GPS) receiver, direction information from a gyroscope, and 3D point cloud data from the hi-res Doppler LIDAR system to calibrate the position and direction of the field of view of the LIDAR relative to the center of mass and direction of the vehicle. The calibration data is stored in the one or more databases.

In step 405, even beyond any calibration measurements, the hi-res Doppler LIDAR is operated to construct a scene comprising a 3D point cloud with relative speed at each point as a result of one complete scan at each of one or more such LIDAR systems 340. In step 411, the scene data is analyzed to determine stationary objects (e.g., roadbed 391 or traffic sign 392 or lamp posts 393 or curb 395 or markings 394 or some combination), own speed relative to stationary objects (also called ego-motion herein), and speed and direction of one or more moving objects (e.g., 396), if any. Various embodiments of methods for determining each or all of these results are described in more detail below with reference to the remaining flow diagrams.

It is advantageous if the determination of ego-motion is fast enough to detect motion changes (accelerations) before large distances (on the order of the size of the vehicle) are covered. The maximum component-wise change of the vehicle velocity vector ($a_{max}$) is advantageously small compared to the product of the scan period ($T_{scan}$) and the Doppler resolution (m) of the LIDAR, as given by Equation 4.

$$a_{max} < T_{scan} r_D \quad (4)$$

For example, a LIDAR sensor with $r_D=0.25$ m/s and a 10 Hz scan rate ($T_{scan}=0.1$ sec) may fail to properly segment moving actors if the vehicle's acceleration exceeds 2.5 m/s². As this is not a particularly high value, current implementations solve for velocity on each "Framelet" (left-to-right scan of a vertical array of one or more concurrent Doppler LIDAR beams), rather than a full vertical frame (which consists of one or more framelets conducted sequentially in time at differing inclination angle offsets). This allows typical operation of the velocity solution to have an effective 80 Hz scan rate, giving a maximum acceleration of 20 m/s²— more than two times the acceleration of gravity, sufficient for many vehicle scenarios, including most automobile operations. Similar limits exist for velocity estimation of other objects, because, to first order, the variation in velocity across the extent of the other object advantageously exceeds the characteristic Doppler noise value for a determination of the motion of the other object.

In general, it is useful to have each spot of the point cloud measured in less than a millisecond so that point clouds of hundreds of spots can be accumulated in less than a tenth of a second. Faster measurements, on the order of tens of microseconds, allow point cloud a hundred times larger. For example, the hi-res Doppler phase-encoded LIDAR described above can achieve a 500 Mbps to 1 Gbps baud rate. As a result, the time duration of these codes for one measurement is then between about 500 nanoseconds (ns, 1 ns=$10^{-9}$ seconds) and 8 microseconds. It is noted that the range window can be made to extend to several kilometers under these conditions and that the Doppler resolution can also be quite high (depending on the duration of the transmitted signal).

In step 421, it is determined if the moving objects represent a danger to the own vehicle, e.g., where own vehicle velocity or moving object velocity or some combination indicates a collision or near collision. If so, then, in step 423, danger mitigation action is caused to be initiated, e.g., by sending an alarm to an operator or sending a command signal that causes one or more systems on the own vehicle, such as brakes or steering or airbags, to operate. In some embodiments, the danger mitigation action includes determining what object is predicted to be involved in the collision or near collision. For example, collision avoidance is allowed to be severe enough to skid or roll the own vehicle if the other object is a human or large moving object like a train or truck, but a slowed collision is allowed if the other object is a stop sign or curb. In some of these embodiments, the object is identified based on reflectivity variations or shape or some combination using any methods known in the art. For example, in some embodiments, object identification is performed using methods described in PCT patent application by Crouch entitled "method and system for classification of an object in a point cloud data set," WO2018/102190. In some embodiments, the object is identified based on global position of own vehicle and a GIS indicating a global position for the other stationary or moving object. Control then passes back to step 405, to collect the next scene using the hi-res Doppler LIDAR system 340. The loop of steps 405 to 411 to 421 to 423 is repeated until there is no danger determined in step 421. Obviously, the faster a scan can be measured, the faster the loop can be completed.

In step 431, it is determined if the speed of the own vehicle is reliable (indicated by:OK" in FIG. 4). For example, the calibration data indicates the odometer is working properly and signals are being received from the odometer, or the gyroscope indicates the own vehicle is not spinning. In some embodiments, speed determined from the 3D point cloud with relative speed is used to determine speed in the global coordinate system and the speed is not OK if the odometer disagrees with the speed determined from the point cloud. If not, then in step 433 speed is determined based on the 3D point cloud with relative speed data. In some embodiments, such speed relative to the road surface or other ground surface is determined automatically in step 411. In some embodiments, that previously used speed relative to the ground surface is used in step 433. In some embodiments, 3D point cloud data are selected for such speed determination and the speed determination is made instead, or again, during step 433. Control then passes to step 441.

In step 441, it is determined if the speed and direction of the own vehicle indicate danger, such as danger of leaving the roadway or of exceeding a safe range of speeds for the vehicle or road conditions, if, for example, values for such parameters are in the one or more own vehicle databases. If so, control passes to step 443 to initiate a danger mitigation action. For example, in various embodiments, initiation of danger mitigation action includes sending an alarm to an operator or sending a command signal that causes one or more systems on the own vehicle, such as brakes or steering, to operate to slow the vehicle to a safe speed and direction, or airbags to deploy. Control then passes back to step 405 to collect the hi-res Doppler LIDAR data to construct the next scene In step 451, it is determined if the relative location of the own vehicle is reliable (indicated by:OK" in FIG. 4). For example, distance to high reflectivity spots, such as a curb or lane markings, are consistent with being on a road going in the correct direction. If not, then in step 453 relative location is determined based on the 3D point cloud with relative speed data based on measured distances to high reflectivity spots, such as road markings and curbs. In some embodiments, such relative location of own vehicle is determined automatically in step 411. In some embodiments, that previously used relative location of own vehicle is used in step 453. In some embodiments, 3D point cloud data of stationary highly reflective objects are selected to determine relative location of own vehicle during step 453. Control then passes to step 461.

In step 461, it is determined if the relative location of the own vehicle indicates danger, such as danger of leaving the roadway. If so, control passes to step 463 to initiate a danger mitigation action. For example, in various embodiments, initiation of danger mitigation action includes sending an alarm to an operator or sending a command signal that causes one or more systems on the own vehicle, such as brakes or steering, to operate to direct the own vehicle to remain on the roadway, or airbags to deploy. Control then passes back to step 405 to collect the hi-res Doppler LIDAR data to construct the next scene.

If there is no danger detected in steps 421, 441 or 461, then control passes to step 470. In step 470, global location is determined based on the 3D point cloud with relative speed data. In some embodiments, such global location of own vehicle is determined automatically in step 411. In some embodiments, that previously used global location of own vehicle is used again in step 470. In some embodiments, 3D point cloud data of stationary objects, such as road signs and lamp posts, or moving objects with precisely known global coordinates and trajectories, such as orbiting objects, are selected and cross referenced with the GIS to determine global location of own vehicle during step 470. In some embodiments, step 470 is omitted. Control then passes to step 481.

In step 481, it is determined if the global location of the own vehicle indicates danger, such as danger of being on the wrong roadway to progress to a particular destination. If so, control passes to step 483 to initiate a danger mitigation action. For example, in various embodiments, initiation of danger mitigation action includes sending an alarm to an operator or sending a command signal that causes one or more systems on the own vehicle, such as brakes or steering, to operate to direct the own vehicle to the correct global location, or airbags to deploy. Control then passes back to step 405 to collect the hi-res Doppler LIDAR data to construct the next scene.

If danger is not detected in any steps 421, 441, 461 or 481, then control passes to step 491 to determine if end conditions are satisfied. Any end conditions can be used in various embodiments. For example, in some embodiments, end conditions are satisfied if it is detected that the vehicle has been powered off, or arrived at a particular destination, or a command is received from an operator to turn off the system. If end conditions are not satisfied, then control passes back to step 403 and following, described above. Otherwise, the process ends.

5. Example Embodiments

Figure 5A:
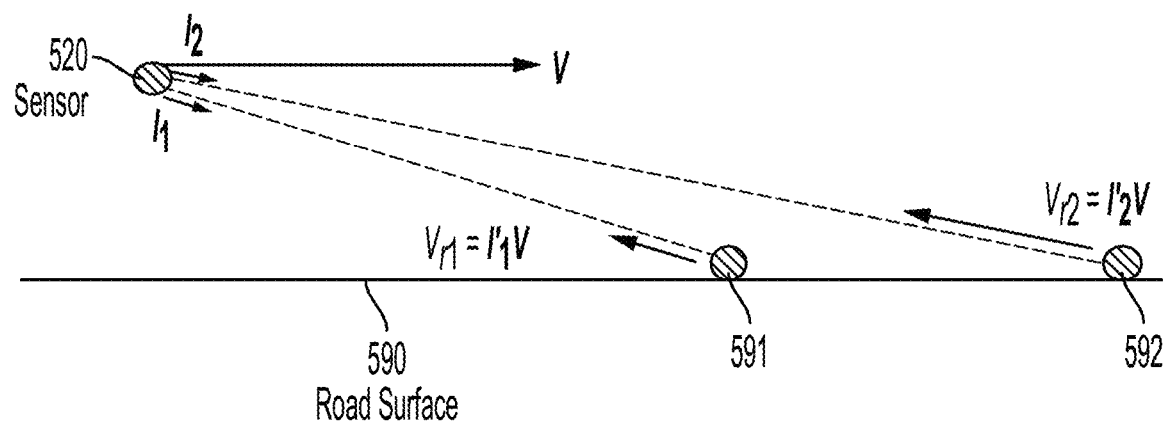
FIG. 5A is a block diagram that illustrates example components of a computation to detect own vehicle movement relative to a stationary road surface, according to an embodiment.

FIG. 5A is a block diagram that illustrates example components of a computation to detect own vehicle movement relative to a stationary road surface (ego-motion), according to an embodiment. Sensor 520 of a hi-res Doppler LIDAR system is mounted on a vehicle proceeding with velocity V (in the vehicle forward direction). The sensor is at a height above a road surface; and, during a scan short compared to a time for the vehicle to move an appreciable distance, receives returns from spots 591 and 592 different distances ahead on the road surface 590 in response to scanning beams at inclination angles represented by unit vectors (i.e., having magnitudes=1) $l_1$ and $l_2$, respectively. The relative speeds $V_{r1}$ and $V_{r2}$, respectively, of the returns from stationary spots 591 and 592, are measured directly by the hi-res Doppler LIDAR system as observed in the reference frame of the sensor 520. These speeds are equal to the dot product of the inverse unit vectors $l_1'$ and $l_2'$, respectively, and the velocity V of the vehicle, as given in Equation 5a and 5b.

$$V_{r1} = l_1' \cdot V \tag{5a}$$

$$V_{r2} = l_2' \cdot V \tag{5b}$$

Since $l_1'$ and $l_2'$ are known and $V_{r1}$ and $V_{r2}$, are measured, and V is known to be horizontal (parallel to road surface 590) and assumed to be in the direction of the vehicle heading, each equation can be solved for V. However, due to systematic errors, each determination can be in error. To remove systematic errors, a difference is determined as given by equation 5c and the difference equation is solved for V.

$$V_{r1} - V_{r2} = (l_1' - l_2') \cdot V \tag{5c}$$

Or expressed differently as equation 5d.

$$\Delta Vr = \Delta l' \cdot V \tag{5d}$$

Where $\Delta Vr = V_{r1} - V_{r2}$ and $\Delta l' = l_1' - l_2'$, as shown in FIG. 5. Thus, the LIDAR system is operated to collect point cloud data that indicates for each point an inclination angle and relative speed between the point and the LIDAR system. Multiple stationary points are identified in the point cloud based on an inclination angle for each point. Then the determining ground speed of the LIDAR (and by inference the ground speed of the vehicle) is based on multiple relative speeds corresponding to the multiple stationary points.

It is worth noting that this processing is limited to two dimensions (inclination and Doppler component) of the 4 or 5 dimensions (inclination, azimuth, range and Doppler component) available in the data. This is an example of determining a value of a property of an object in the point cloud based on only three or fewer of the at least four dimensions. An advantage of this two-dimensional approach is that various computational methods for solving simultaneous equations with noise are much more efficient than they would be if those methods had to be executed in three or four dimensions. Common methods for solving simultaneous linear equations with noise are generically called least squares solutions, primarily using the identity to minimize the quantity b-Ax which implies $x = (A^T * A)^{-1} * A^T * b$, which requires finding the inverse of $(A^T * A)$. This is commonly accomplished with SVD (singular value decomposition) or complete orthogonal decomposition (COD). Such are more computationally intensive the higher the dimensionality of the vectors b, x and matrix A. Thus, solutions can be determined in less time, for any processing power available; and, therefore, this approach provides more time to respond to any dangerous situations.

FIG. 5B is a plot that illustrates an example raw Doppler LIDAR point cloud, rendered in x/y/z space, not compensated for ego-motion, according to an embodiment. FIG. 5C is a plot that illustrates an example processed Doppler LIDAR point cloud, rendered in x/y/z space, range-compensated for ego-motion, based on Doppler-computed velocity solution, according to an embodiment.

Figure 6:
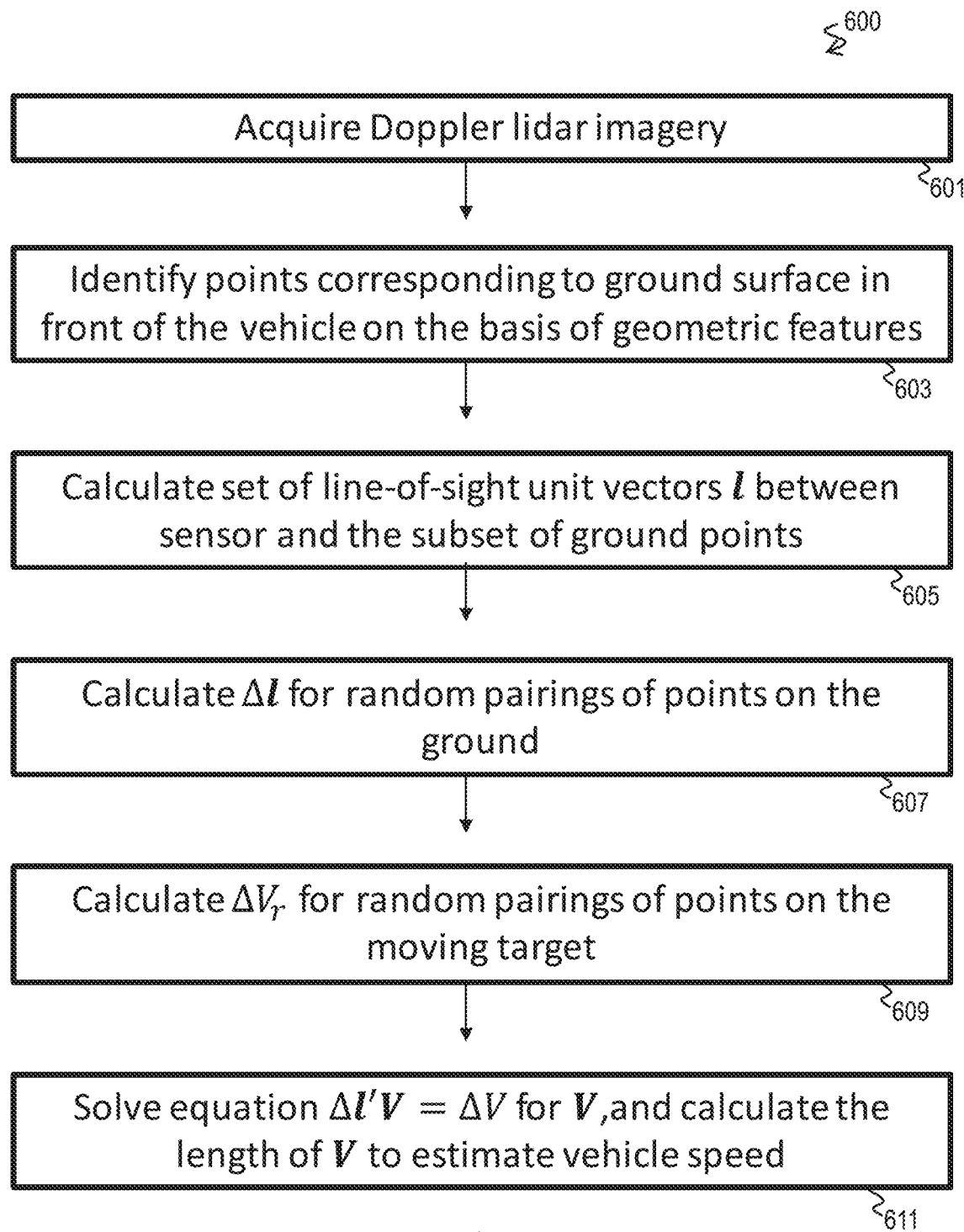
FIG. 6 is a flow diagram that illustrates an example method to determine own vehicle speed, according to an embodiment.

FIG. 6 is a flow diagram that illustrates an example method to determine own vehicle speed, according to an embodiment. This embodiment is based on Equations 5a through 5d. In step 601 hi-res Doppler LIDAR data is acquired, corresponding to step 405 in FIG. 4. In step 603, spots in the data are identified that correspond to the stationary ground surface and in front of the vehicle. In some embodiments, the ground points are identified based on a manual input, e.g., a graphical user interface (GUI) that allows a user to enclose spots in the 3D data cloud to use as ground surface spots. This can also be done automatically based on geometric features, e.g., using points along a line in front of the vehicle along a direction 313 of the vehicle heading and at negative inclination angles.

A moving object among the points will confound the computation; so efforts are made to discard points with speeds too different from the speed of the majority of points that satisfy the geometric conditions.

In step 605, the unit vectors l between the sensor and multiple spots on the ground surface are determined. In step 607 Δl' is determined for random pairs of spots on the ground surface. In step 609, ΔVr is determined based on the measured Doppler speeds for the random pair of spots. In step 611, Equation 5d is solved for the random pair to obtain V. In some embodiments, steps 607, 609 and 611 are repeated for multiple random pairs and averaged to further reduce the effects of noise in the measurements.

Figure 7A:
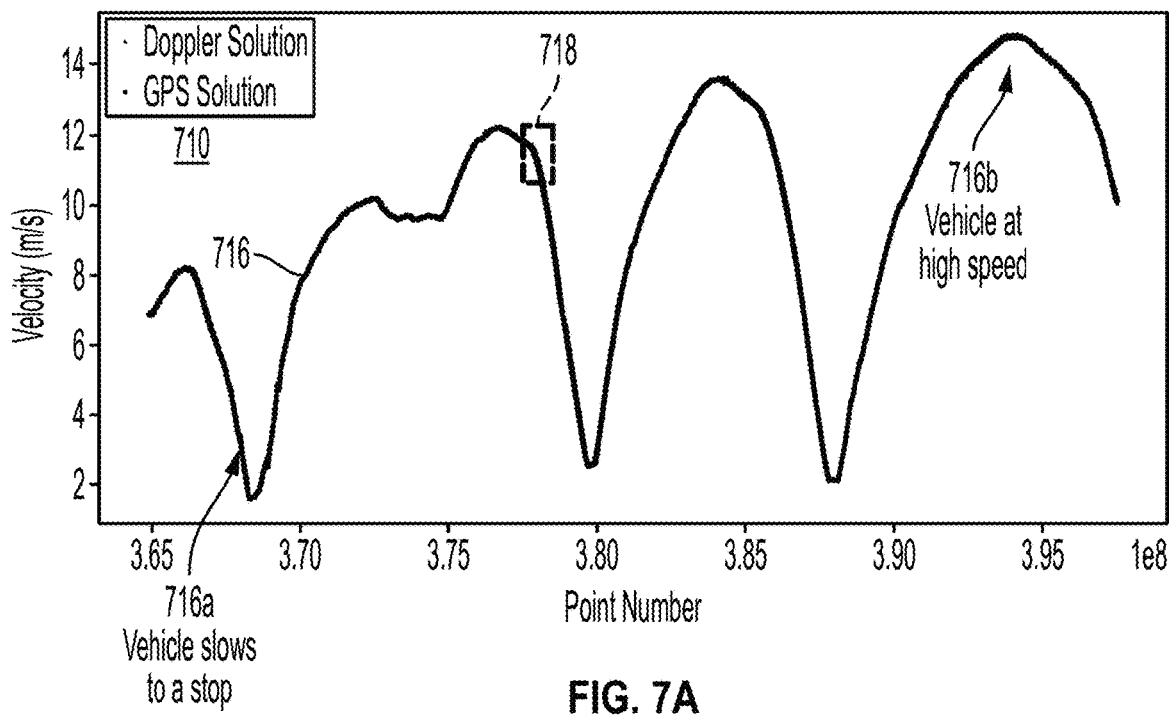
FIG. 7A and FIG. 7B are graphs that illustrate an example comparison between velocities derived from global positioning system (GPS) data and hi-res 3D Doppler LIDAR data, according to an embodiment.
Figure 7B:
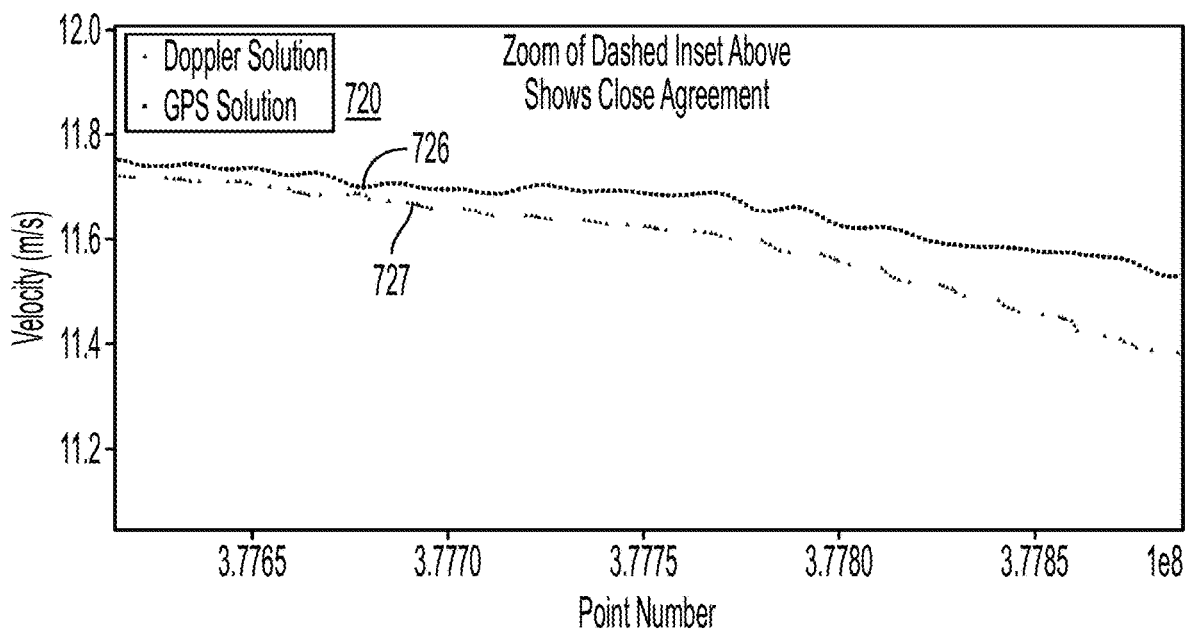

FIG. 7A and FIG. 7B are graphs that illustrate an example comparison between velocities derived from global positioning system (GPS) data and hi-res Doppler LIDAR data, according to an embodiment. FIG. 7A depicts graph 710 with a horizontal axis indicating time in arbitrary units of scan number, and vertical axis indicating speed in forward direction 313 in units of meters per second from a low of about 1 to a high of about 15. Trace 716 shows speed derived from GPS and is called the GPS solution. Vehicle slows to almost a stop at point 716a and reaches a high speed at point 716b. Box 718 indicates a section replotted at expanded scale in graph 720 of FIG. 7B. Graph 720 has a horizontal axis indicating time in arbitrary units of scan number, and has a vertical axis indicating speed in forward direction 313 in units of meters per second from a low of about 11.1 to a high of about 12. Trace 726 shows the GPS solution and trace 727 shows the speed derived from the point cloud from the hi-res Doppler LIDAR, called the Doppler solution. There is close agreement, within about 0.1 meters per second. Both have systematic errors that contribute to the very small drift noticed in these two traces.

Figure 7C:
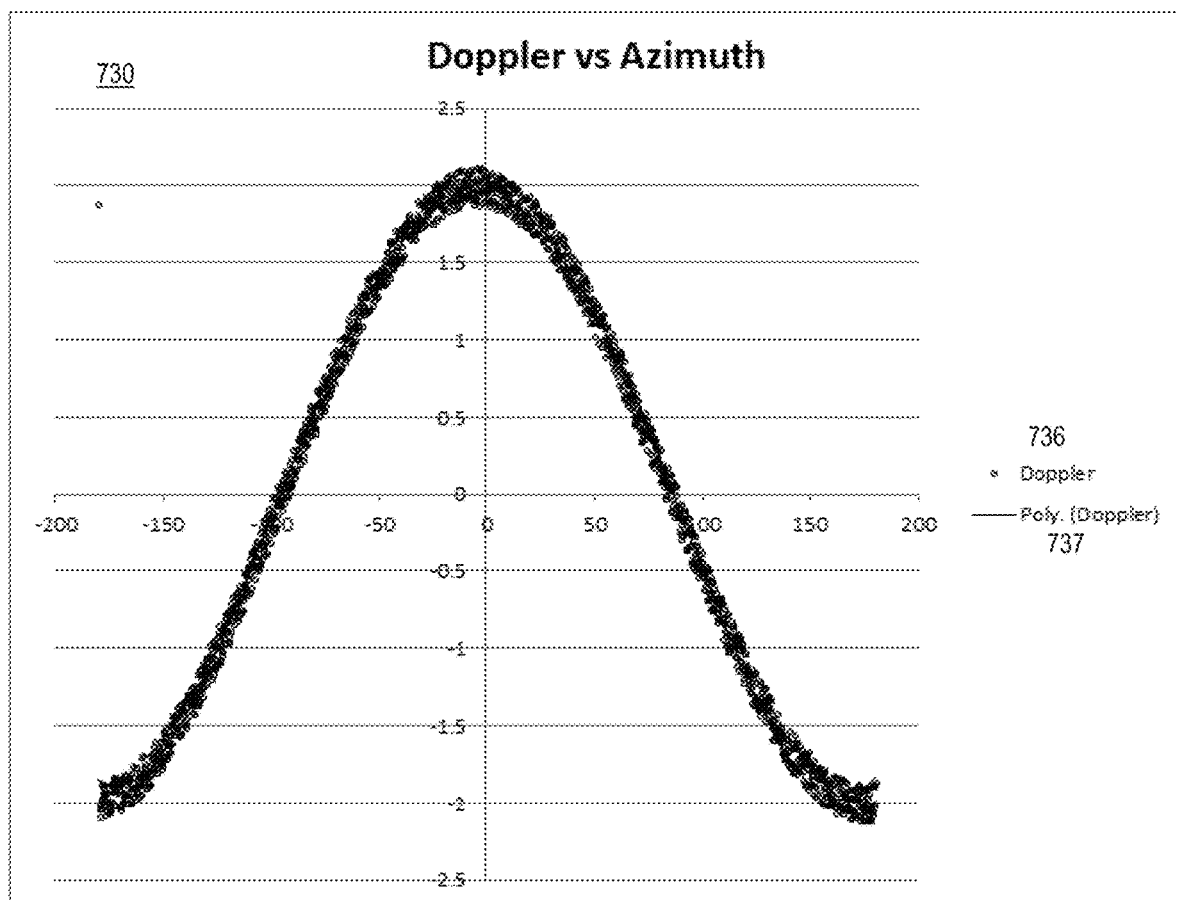
FIG. 7C through and FIG. 7E are graphs that illustrate example dependence of speed from Doppler LIDAR on azimuth angle relative to direction of movement of vehicle, according to an embodiment.

In practice it was found that Equation 5d is itself subject to random noise in the measurements $V_{r1}$ and $V_{r2}$ and that it was difficult to determine objectively which spots represented the stationary ground surface rather than a moving object. It was recognized that measured speeds in direction other than the direction 313 of the vehicle could be used to reduce the effects of noise in the determination of own vehicle velocity (speed and direction). Further, using other azimuthal directions can avoid making the assumption that the vehicle is moving in the forward direction. FIG. 7C through and FIG. 7E are graphs that illustrate example dependence of speed from Doppler LIDAR on azimuth angle relative to direction of movement of vehicle, according to an embodiment. Plot 730 in FIG. 7C depicts measured Doppler speeds in one experiment scanning across 360 degrees. The horizontal axis indicates azimuth angle from −180 degrees to 180 degrees. The vertical axis indicates Doppler speed in meters per second from −2.5 to +2.5. Open circles indicate measurements of the ground (i.e., the assumed stationary points). At each azimuth several speeds are measured as the LIDAR scans the 360 degrees several times. The range in speeds during the experiment are due to noise in the measurement. There were no moving objects in this experiment to contaminate the measurement of stationary points in the point cloud.

Azimuths in front show positive speeds as the relative motion is toward the vehicle, with a maximum in the direction of movement near an azimuth of 0 degrees relative to the direction of the 313 of the vehicle 310. Difference form zero indicates a velocity different from the assumed forward direction of the vehicle. Rearward azimuth angles show a negative speed as the ground spots relative emotion is away from the vehicle. The data can be fit with a polynomial given by trace 737 that resembles a cosine function. Thus, azimuthal direction of the ground speed is determined based on an azimuthal angle associated with a stationary point of the plurality of stationary points for which the relative velocity is a maximum among the plurality of stationary points. And the true ground speed is based on the plurality of stationary points for which the relative velocity is a maximum.

The same noise averaged maximum is achieved using a subset of the data around the direction of vehicle movement. Plot 740 in FIG. 7D has a horizontal axis that indicates azimuth angle from −30 degrees to 30 degrees. The vertical axis indicates Doppler speed in meters per second from 0 to +2.5. The dots 746 represent the measurements from about −25 degrees azimuth to about 25 degrees; and the trace 747 the polynomial fit. Similarly, plot 750 in FIG. 7E has a horizontal axis that indicates azimuth angle from −60 degrees to 60 degrees. The vertical axis indicates Doppler speed in meters per second from 0 to +2.5. The dots 756 represent the measurements from about −25 degrees azimuth to about 25 degrees; and the trace 757 the polynomial fit. Essentially the azimuth corrected vehicle velocity is represented by the polynomial trace in FIG. 7C through FIG. 7D.

In these experiments all points are directed to stationary ground, so the speed of the vehicle is given by the maximum Doppler of the polynomial fit. At each point, the Doppler speed V is the dot product of the unit vector l in the direction of the beam and the velocity V of the vehicle, given by Equation 6.

$$V_r = l' \cdot V \qquad (6)$$

Figure 7D:
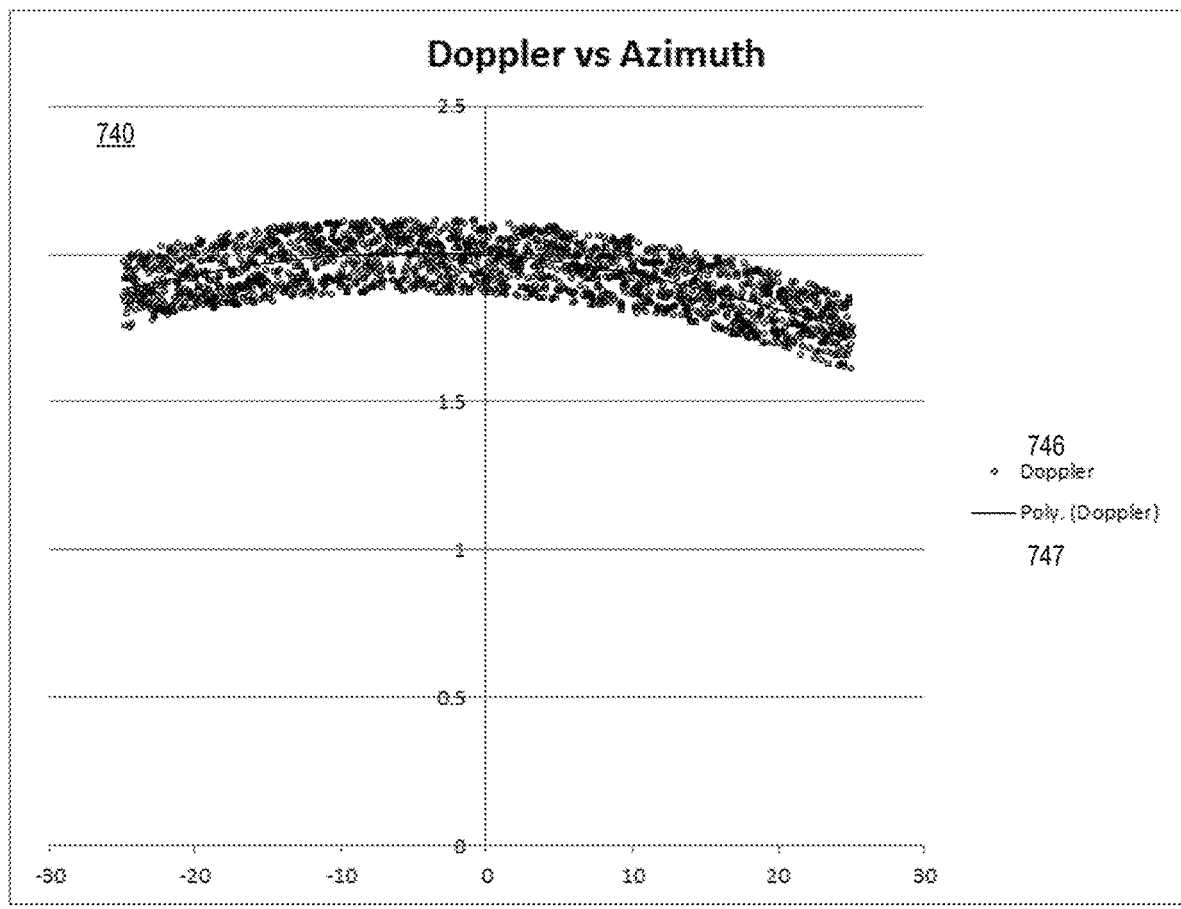
FIG. 7F is a graph that illustrates example measurements of dependence of speed from Doppler LIDAR on azimuth angle, according to an embodiment.
Figure 7E:
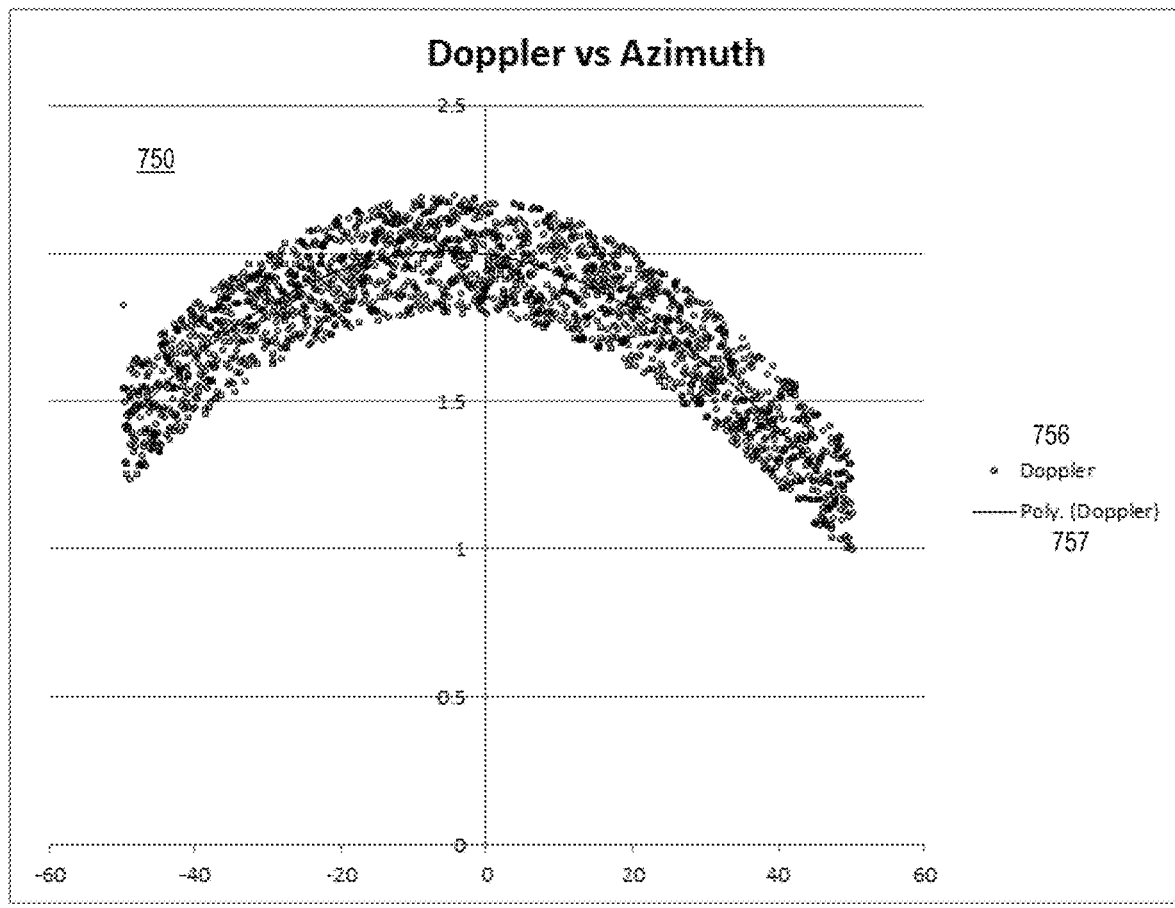
Figure 7F:
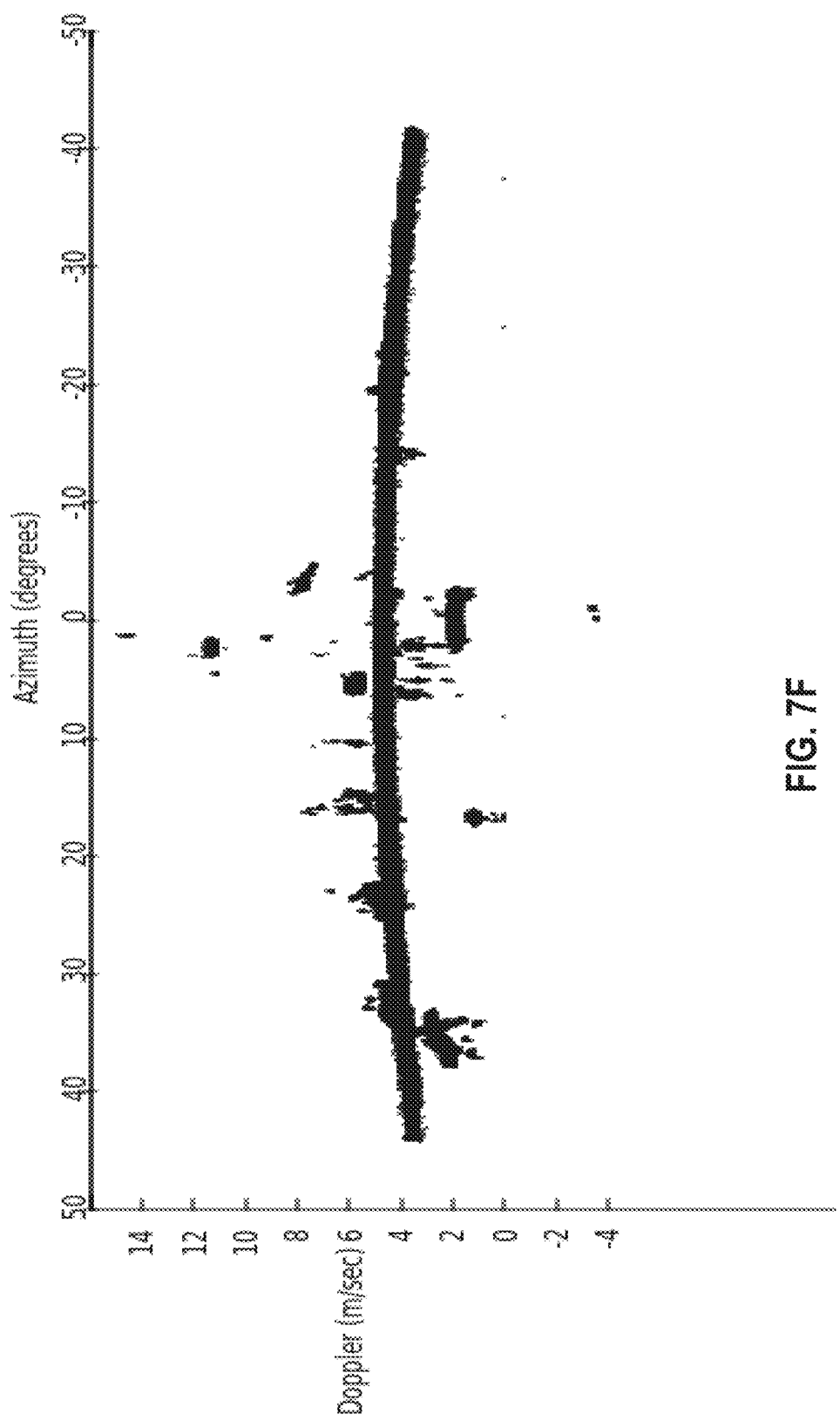

FIG. 7F is a graph that illustrates example measurements of dependence of speed from Doppler LIDAR on azimuth angle, according to an embodiment. This projection shows a Doppler LIDAR point cloud rendered in Azimuth/Range/Doppler space, but then rotated to show the azimuth and Doppler axes only. Distinct moving objects are obvious when viewed from this perspective, as is the cosine structure of the stationary spots.

We generalize the two-dimensional treatment of Equations 5a through 5d, to three dimensions with x, y and z representing east, north and up, respectively. A computationally efficient but potentially numerically unstable approach is to form a system of three equations with three unknowns from three instances of Equation 6 for a set of points detected by the scanner within a short time interval. This system of equations takes the form:

$$AV = D \quad (7)$$

Where A is a matrix of the inverse unit vectors l' for each Doppler measurement, each vector l' having three components $l_x'$, $l_y'l_z'$ for the x, y and z directions, V is the 3 dimensional vector of vehicle velocity and D is an array of the scalar measured Doppler relative speeds. Explicitly:

$$\begin{bmatrix} l_{x1}' & l_{y1}' & l_{z1}' \\ l_{x2}' & l_{y2}' & l_{z2}' \\ l_{x3}' & l_{y3}' & l_{z3}' \end{bmatrix} \begin{bmatrix} V_x \\ V_y \\ V_z \end{bmatrix} = \begin{bmatrix} V_{r1} \\ V_{r2} \\ V_{r3} \end{bmatrix} \quad (8)$$

Equation 8 can be solved by conventional methods, such as iterative relaxation to invert A to give a value for V, the velocity vector.

This approach is sensitive to the choice of points used to form the system, as inverting A will fail if the matrix A is approximately singular. This would occur if the points have very similar beam vectors, e.g., they were collected over a small angular area. Additionally, due to noise in the measurement of the Doppler value as well as the range, an exact solution is unlikely, and the solution must be iteratively converged to. This formulation is highly sensitive to spots on a moving object being included in a solution, so a simple, low-level method for avoiding inclusion of spots on moving objects is advantageous. In some embodiments, moving objects may be segmented out by applying a filter based on their compatibility with the most recent previous velocity solution. For a normalized beam vector of the nth sample, the detected Doppler of a stationary object should follow the relationship given by Equation 9.

$$l_n' \cdot (V + \Delta V) > V_{rn} > l_n' \cdot (V - \Delta V) \quad (9)$$

Here ΔV is a small vector describing the amount of error expected in the Doppler velocity measurement of the scanner multiplied by the maximum expected change in vehicle velocity since the previous solution was sampled. This can be estimated by the most recent acceleration and the sampling time (scan or sub-scan period), among other approaches.

An alternative approach used in some embodiments is to find an over-determined least squares solution, e.g., based on a singular value decomposition (SVD). Here A is a matrix of size n×3, where n is the number of LIDAR spots (e.g., points from the 3D point cloud) used. In this case Equation 7 takes the form of Equation 10a $$\begin{bmatrix} l_{x1}' & l_{y1}' & l_{z1}' \\ \ldots & \ldots & \ldots \\ l_{xn}' & l_{yn}' & l_{zn}' \end{bmatrix} \begin{bmatrix} V_x \\ V_y \\ V_z \end{bmatrix} = \begin{bmatrix} V_{r1} \\ \ldots \\ V_{r3} \end{bmatrix} \quad (10a)$$

A solution is found for the overdetermined expression given by Equation 10a, where the goal is to find the vector V that minimizes a residual vector R that is a column vector of size (n×1) given by Equation 10b.

$$R = \begin{bmatrix} l_{x1}' & l_{y1}' & l_{z1}' \\ \ldots & \ldots & \ldots \\ l_{xn}' & l_{yn}' & l_{zn}' \end{bmatrix} \begin{bmatrix} V_x \\ V_y \\ V_z \end{bmatrix} - \begin{bmatrix} V_{r1} \\ \ldots \\ V_{r3} \end{bmatrix} \quad (10b)$$

Essentially, R represents the differences between the data points and the azimuth corrected vehicle velocity represented by the polynomial trace in FIG. 7C through FIG. 7D.

It is clear that the pseudo-inverse based SVD solution would work well on the data depicted in FIG. 7C, as the character of the Doppler variation across the field of view (FOV) is well defined. By contrast, FIG. 7D displays this same situation over only +/−20 degrees (40° FOV), and the variation is much less obvious. Thus, in practice, this limitation takes the form of a minimum speed where the velocity vector can be well resolved, strongly driven by the FOV. It can be seen that this occurs most commonly in the vertical (inclination/elevation) direction, as LIDAR sensors used on vehicles often have smaller FOVs in the vertical direction. Additionally, the velocity vector should point within the FOV of the LIDAR sensor for best performance (that is, the direction of travel be within the angular space scanner by the LIDAR). Though the formulation will return a value outside of this constraint, it may be invalid, as this case will be indistinguishable from a sharp linear acceleration during the scan period for non-counter-scanning patterns. A non-counter-scanning pattern is a scanning pattern of one or more LIDAR beams in which all beams always travel in the same direction at all times in the execution of a single scanning frame. A counter-scanning pattern is a scanning pattern in which one or more lidar beams travel in more than one opposite direction, either concurrently or at different points in its execution of a single scanning frame.

The FOV limit can be approximated for moderate angles (<~80 degrees) as given by Equation 10c:

$$r < \|v\|(1 - \cos \theta) \quad (10c)$$

Where r is the velocity resolution of the Doppler LIDAR sensor, ‖v‖ is the magnitude of the vehicle velocity vector and θ is the smaller of the two angles between the direction of travel and one of the edges of the FOV.

Similar limits exist for target velocity estimation, as to first order the variation in velocity across the target extent must exceed the characteristic doppler noise value for a determination of the target's motion to function. However in practice the extremely high sample density in the direction of scan provided by the example Doppler LIDARS allows the least-squares fit to function below this limit.

Figure 8:
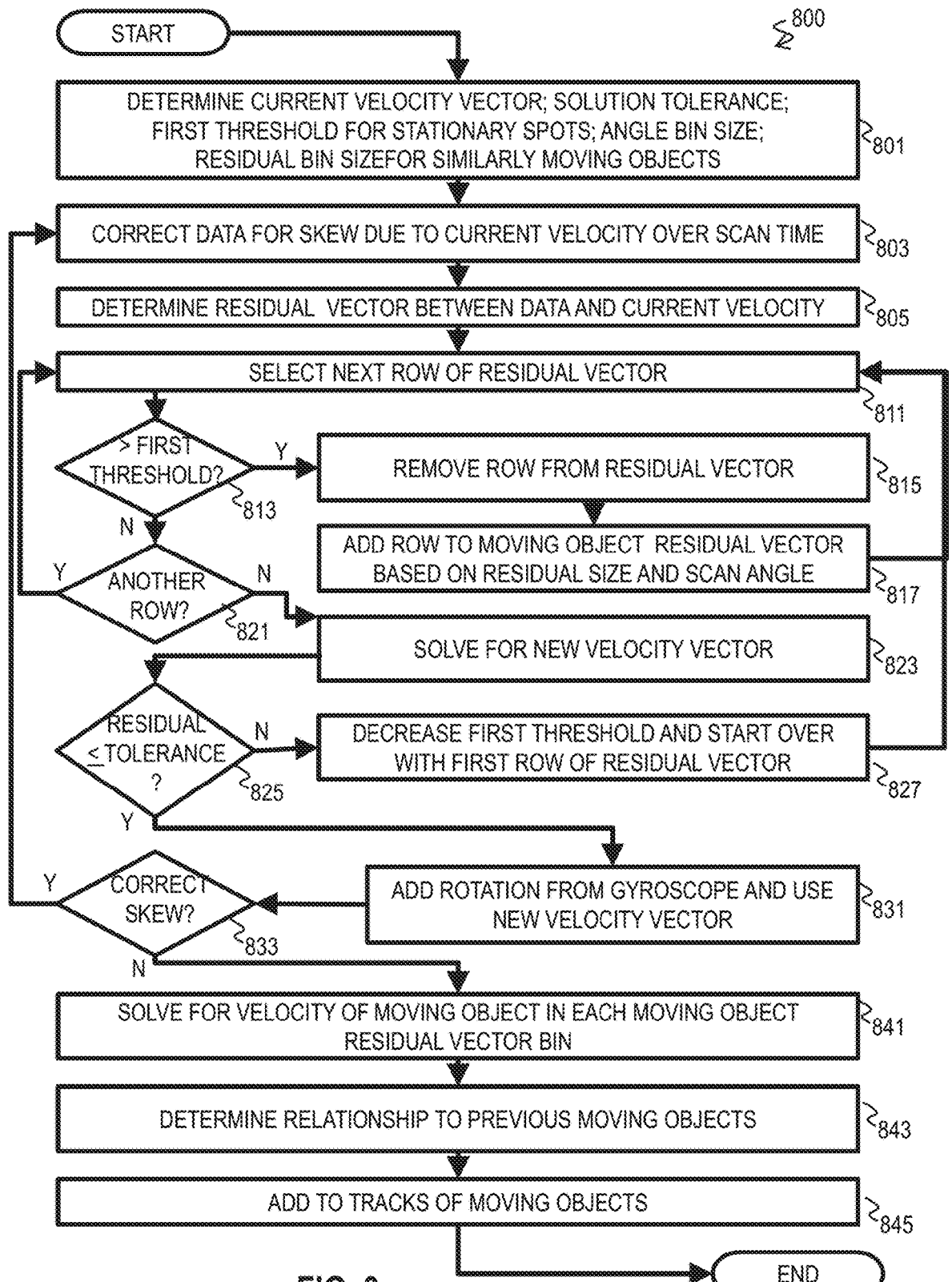
FIG. 8 is a flow diagram that illustrates an example method to determine own vehicle velocity and other moving objects, according to another embodiment.

FIG. 8 is a flow diagram that illustrates an example method to determine own vehicle velocity and other moving objects, according to another embodiment. This involves own motion (ego-motion) compensation. This embodiment is based on the residual column vector R given in Equation 10b and not only determines own motion (ego-motion), but also compensates for the detection of moving and stationary objects based on ego-motion. Note that ego-motion is actually the motion of the LIDAR system; and that motion is imputed to the motion of the vehicle to which the LIDAR is fixed. Also note that the ego-motions for multiple LIDAR systems on the same vehicle can be combined to determine the vehicle's motion.

In step 801 a current velocity vector V current is determined. Any method may be used to determine the current velocity vector which is essentially a first guess for the solution to be found using the method 800. For example, for a vehicle starting from rest, the current velocity vector is zero. For example, in some embodiments in which the solution is sought when the odometer ceases to function, the current velocity vector may be selected as the last speed from the odometer in the direction the vehicle was traveling at the time. For example, in embodiments to determine a solution at a later time increment, the current velocity vector is chosen to be equal the solution at the previous time increment. In some embodiments, the current velocity is determined using the downward inclination pairs and the azimuth with the maximum speed, as described above.

Step 801 includes determining a solution tolerance, a first threshold for residuals associated with stationary spots in the 3D point cloud, an angle bin size for objects expected to move at the same speed, and a residual bin size for similarly moving objects. The first threshold is a velocity difference that is greater than a change in vehicle velocity over a scan time. For example if a scan is completed in 1 millisecond, and a vehicle can accelerate 100 kilometers per hour in ten seconds (about 3 meters per second per second) then a change of more than 0.003 meters per second is not expected to be due to a change in own vehicle speed, and the change is probably due to a moving object being scanned. In such a case the first threshold is about 0.01 meters per second per second. If adjacent beams in a scanning pattern have similar speeds, e.g., similar residual sizes, then they probably belong to the same object. So, data points for the same moving object are expected to have a range of close angle sizes and close speed change sizes. These data are groped in some embodiments to determine the size and speed of moving objects. The values determined for the angle bin size and residual bin size will affect how data points are grouped for determining the presence and speed of moving objects in the 3D point cloud.

Any method may be used to determine the values, including retrieving from local or remote memory or storage, computing using a standard algorithm, receiving in a message from a remote process, either unsolicited or in response to a request for information. In some embodiments, values for all these parameters are determined during step 401 in FIG. 4 and stored in the one or more databases, such a with configuration data.

In step 803, the 3D point cloud data collected during a single scan is corrected for skew due to the current velocity. Skew arises when the vehicle moves during the time the LIDAR scans a scene. So ranges and Doppler speeds associated with each point in the point cloud can be corrected to the beginning of the scan time, or a time midway through the scan, or to a time at the end of the scan, or any other time, using the current value for the vehicle velocity. Thus step 803 includes changing an azimuth or inclination or range of a point in the point cloud data based on a current LIDAR velocity and a time difference from a fixed time within a scan period. In some embodiments, skew is not important or is ignored, and step 803 is omitted.

In step 805, a residual vector is determined based on the current vehicle velocity, e.g., R is computed using Equation 10b with $V_x$, $V_y$ and $V_z$ based on the current value for the vehicle velocity Vcurrent. The rows of the residual vector are then a measure of how much a speed of a point in the point cloud data differs from the current vehicle velocity. If the difference is too great, the point is probably not on a stationary object, such as the ground surface, but, instead, is on a moving object. The next steps are an attempt to discover such spots on moving objects and remove those points from the computation of own vehicle velocity.

In step 811, a next row in the residual vector R is selected. In step 813, it is determined whether the residual value on that row is greater than the first threshold for stationary spots. If so, then the row is probably not for a Doppler observation of a stationary object and control passes to step 815. In step 815, the row is removed from the residual vector R, and corresponding row of the data array D with the Doppler relative velocity Vr, and the vectors size is decremented (e.g., new n=current n−1). In step 817, the removed row is added to a different residual vector for each of one or more moving objects based on the angle bin size and residual bin size. Each moving object residual vector includes only residuals in a certain residual range spanning no more than one residual bin size and only angles in a certain angle range spanning no more than one angle bin size. Control then passes to step 811 to select the next row for the residual vector R. In some embodiments, the removed rows are not added to moving object residual vectors and step 817 is omitted; and, control passes from step 815 to step 811.

If it is determined in step 813 that the next row does not have a residual greater than the first threshold, then control passes to step 821. In step 821, it is determined if there are any more rows of the residual vector R left to select. If so, then control passes back to step 811 to select the next row. If not, then control passes to step 823.

In step 823, operations, such as SVD operations, are performed to determine values of Vcurrent that minimize R to a new set of values Rnew. In some embodiments, the solution is obtained by iteratively searching for a pseudo inverse of the n×3 matrix A in Equation 10a using the singular value decomposition, a factorization of an arbitrary matrix given by Equation 11a.

$$A = U\Sigma V^* \qquad (11a)$$

where U is a unitary matrix of size n×n; Σ is a diagonal matrix of size n×3, V is a 3×3 unitary matrix, and V* is the conjugate transpose of V. The pseudo inverse of A, $A^{-1}$, is based on the approximation given by Equation 1 1b.

$$A^{-1} \approx V\Sigma^{-1} U^* \qquad (11b)$$

Because Σ is a diagonal matrix it is easy to invert; and U* is just the conjugate transpose of U. In this case, the residual R is used only to compute the "quality" of the pseudo inverse solution.

In step 825 it is determined whether the new residuals have been sufficiently reduced. This is done by seeing if the size ∥R∥ of the new residual vector Rnew is less than or equal to a target velocity tolerance. Any method may be used to determine the size ∥R∥, such as the maximum element of Rnew, the sum of the elements of Rnew, the sum of the absolute values of the elements of Rnew, the sum of the squares of the elements of Rnew, among others. The value of the tolerance depends on how the size of Rnew is determined. For example, the residual tolerance should scale along with the error of the Doppler measurement (the error in beam direction also contributes, but is small by comparison). The normalized L2 norm of the residual of a perfect solution should simply be the variance of the Doppler measurement, or the standard deviation squared if the error is Gaussian. A good tolerance would be some small multiple of the variance. If the tolerance is smaller than this, it is unlikely to be met and the end condition will not be achieved. If Rnew is greater than the tolerance, then control passes to step 827.

In step 827 the first threshold value is decreased, so as to remove more rows from the new residual vector Rnew. The process is restarted by making Rnew the current residual vector; and making the first row of the residual vector the next row to be selected. Control passes to step 811 to select the next row of the residual vector. Thus, a loop is formed to repeat the process until a velocity vector Vcurrent is determined with residual vector size at or below the tolerance desired. In some embodiments, that do not converge on a small enough residual vector, a limit is placed on the number of iterations, e.g., the process stops after 100 iterations or when the difference in velocity V between successive iterations is less than a certain percentage, such as 1%.

In step 831 a rotation determined based on data form a gyroscope, if any, is added tot the velocity vector V. Purely rotational motion (spinning about a fixed axis) however cannot be detected by equations described above, so a sensor capable of directly detecting rotational velocity, such as a vibrating structure gyroscope, is recommended as an additional input on any vehicle that is capable of dominantly rotational motion. In some embodiments, a gyroscope is not included and step 831 is omitted. Control then passes to step 833.

In step 833, it is determined whether skew is to be corrected. Computing the vehicle velocity solution based on a set of detected points over a time interval allows a self-consistent way to correct for "rolling shutter"-like skew effects caused by the finite scan speed of the LIDAR's beam within that time interval. For example, a flat upright surface perpendicular to the velocity vector of a LIDAR system with a horizontally scanning beam will appear to be skewed diagonally, as points detected later within the interval will possess shorter ranges due to vehicle translation towards the surface. If the set of points detected over this interval is to be used to match or compare against a map or point cloud to determine vehicle location and/or pose, such finite scan speed skew effects can drastically degrade the precision and stability of matching algorithms. A velocity vector extracted from the set of detected points can be used to provide an instantaneous, self-consistent measurement of the translation of the vehicle during the collection time interval, and the set de-skewed by back-projecting each point along this vector by an amount given by $dt*\|v\|$. If this is to be done, then control passes back to step 803 to de-skew the data. If not, control passes to step 841.

In step 841, the equations formed by moving rows removed from the stationary data points are used to solve for the velocity V of the moving objects in the 3D point cloud relative to the own vehicle using the above method on each moving object residual vector. The velocity of own vehicle is added to this velocity to get the global coordinate velocity Vg of these one or more moving objects, if any. If adjacent objects are determined to be moving similarly, then it is possible to merge the adjacent objects into one object by merging the rows for the two moving object residual vectors and associated Doppler speeds, and then solving for V for the merged equations. Control then passes to step 843.

In step 843, moving objects detected in successive scans are examined to determine if they can be the same object. In step 845, the positions and speeds of the object related from scan to scan are combined to form a track of the object; and, the track of that moving object is added to the one or more databases. In some embodiments, moving objects are not tracked and steps 843 and 845 are omitted.

Figure 9A:
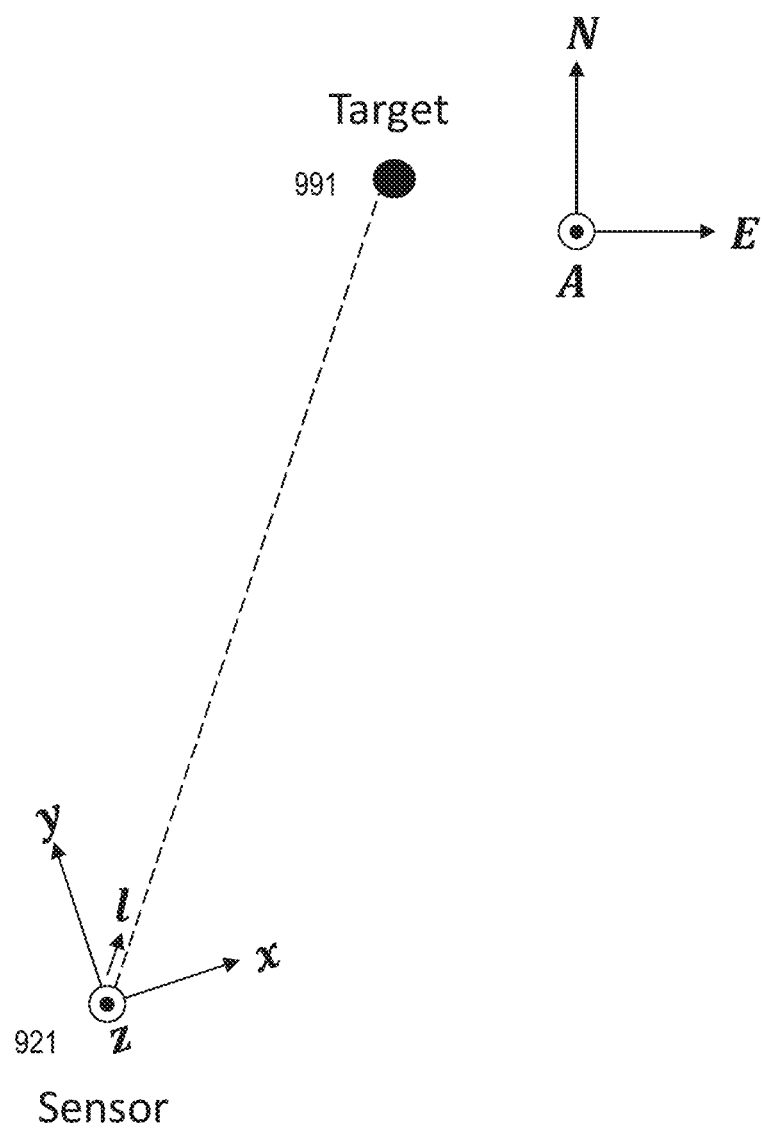
FIG. 9A through FIG. 9C are block diagrams that illustrate example components of a computation to detect movement of another object relative to own vehicle, according to an embodiment.
Figure 9B:
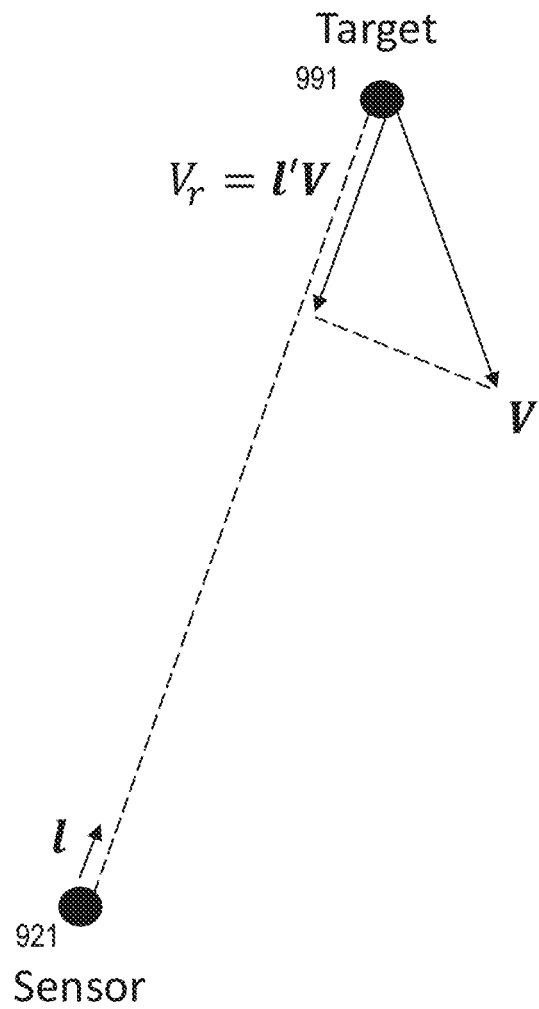
Figure 9C:
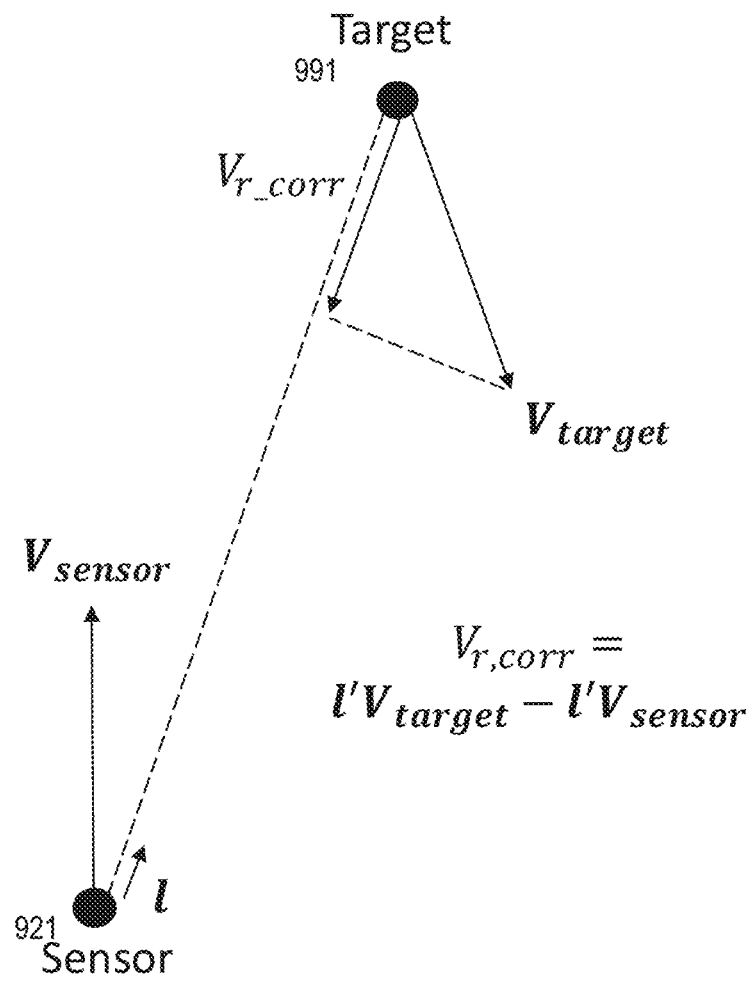

FIG. 9A through FIG. 9C are block diagrams that illustrate example components of a computation to detect movement of another object relative to own vehicle, according to an embodiment. In FIG. 9A, sensor 921 of a hi-res Doppler LIDAR system is mounted on a vehicle proceeding with velocity in the vehicle forward direction y. The sensor is at a height above a road surface; and, during a scan short compared to a time for the vehicle to move an appreciable distance, receives returns from spot 991 in response to scanning beams at an azimuth angle represented by unit vector l. The global coordinate system is indicated by the vectors N in the north direction and E in the east direction, respectively, from a global origin represented by the 3D point A. If motionless, the return simply gives the position of the spot 991. In FIG. 9B, the object represented by spot 991 is moving with velocity indicated by vector V. The relative speeds V, is given by the dot product of the inverse unit vector, l' and the velocity V, e.g., given by Equation 12.

$$V_r = l' \cdot V \tag{12}$$

and is measured directly by the hi-res Doppler LIDAR system as observed in the reference frame of the sensor 921. In FIG. 9C, both the target object 991 and the sensor 921 are moving at velocities Vtarget and Vsensor, respectively. The relative speed (Vr_corr) of the target measured by the hi-res Doppler LIDAR at the sensor is the sum of the two speeds along the line connecting them given by Equation 13.

$$\begin{aligned} \text{Vr\_corr} &= l' \cdot Vtarget + l \cdot Vsensor \\ &= l' \cdot Vtarget - l' \cdot Vsensor \end{aligned} \tag{13}$$

Figure 10:
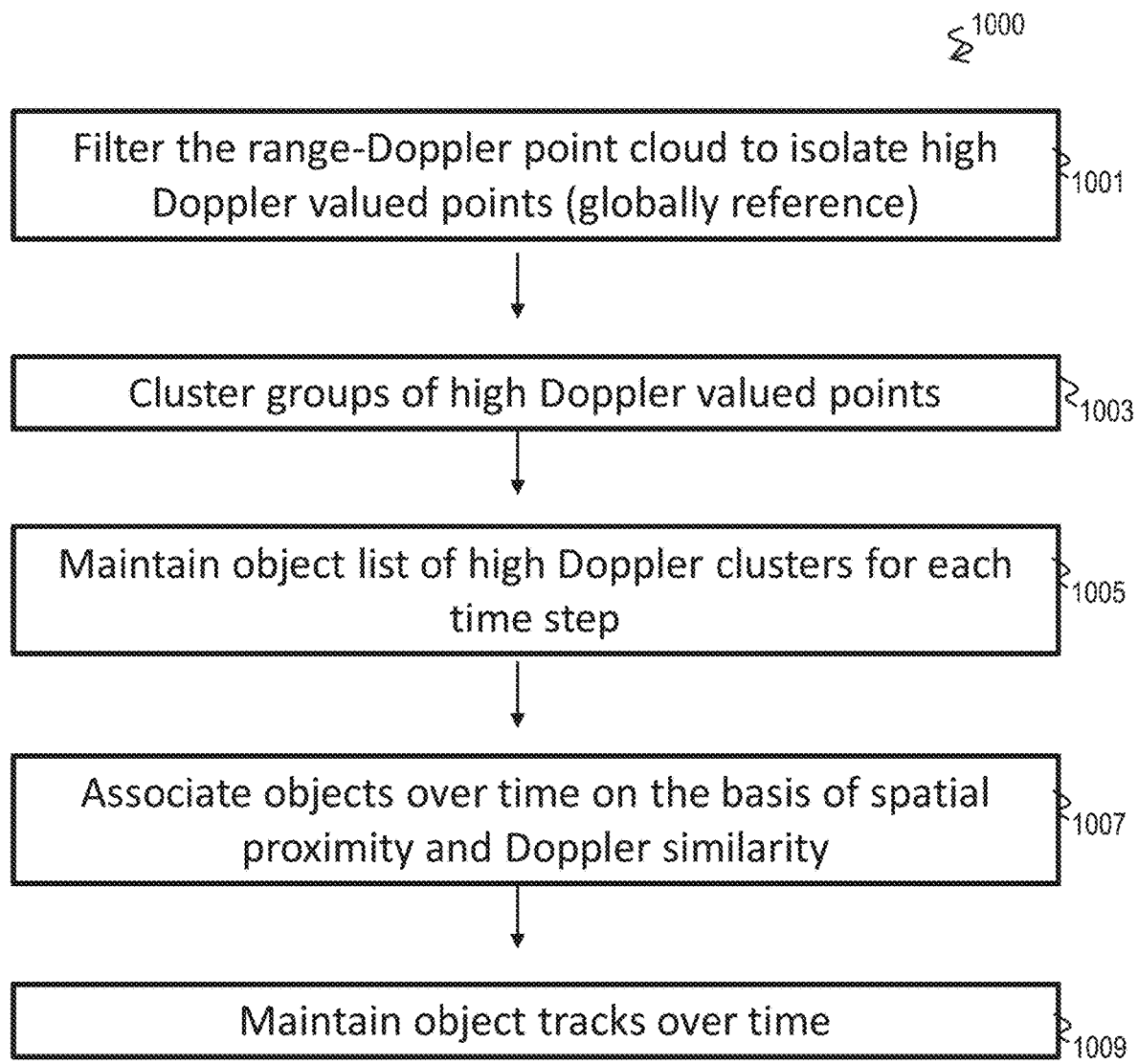
FIG. 10 is a flow diagram that illustrates an example method to determine movement and track of another moving object, according to another embodiment.

FIG. 10 is a flow diagram that illustrates an example method 1000 to determine movement and track of another moving object, according to another embodiment. This embodiment is based on Equations 12 and 13. In step 1001 a point cloud based on hi-res Doppler LIDAR data is filtered to isolate points with large values of Doppler speeds. In step 1003, the points are clustered based on similar Doppler speed values. Each cluster of similar Doppler speeds in similar azimuthal directions, e.g., a small range of azimuthal angles compared to 360 degrees, is considered an object. In step 1005 a list of objects of high Doppler clusters for each time step is maintained. In step 1007, object clusters at different times are associated on the basis of spatial (azimuthal and inclination) proximity and Doppler similarity. In step 1009 an object track for the associated object clusters are determined and maintained, e.g., in computer storage.

It is again worth noting that this processing is limited to three dimensions (inclination, azimuth and Doppler component) of the 4 or 5 dimensions (inclination, azimuth, range, Doppler component, and reflectivity) available in the data. This is another example of determining a value of a property of an object in the point cloud based on only three or fewer of the at least four dimensions. An advantage of this three-dimensional approach is that various computational methods for clustering and solving simultaneous equations with noise are more efficient than they would be if those methods had to be executed in four dimensions. Thus, solutions can be determined in less time, for any processing power available, and therefore this approach provides more time to respond to any dangerous situations.

In some embodiments, the detection of objects with known locations is used to position one's own sensor. FIG. 11 is a block diagram that illustrates example components of a computation to determine own position relative to detected surveyed objects (e.g., stationary objects in a mapping database or moving objects of known positions with time), according to an embodiment. Sensor 1121 of a hi-res Doppler LIDAR system is mounted on a vehicle at position given by 3D vector p; and, during a scan short compared to a time for the vehicle to move an appreciable distance, receives returns from spots 1191 and 1192 at different ranges represented by 3D vectors $r_1$ and $r_2$, respectively, and azimuthal angles in response to scanning beams at azimuth angles represented by unit vectors $l_1$ and $l_2$, respectively. The known locations of the two objects are given by 3D vectors $t_1$ and $t_2$ respectively. The data satisfy the following set of Equations 14a through 14e.

$$r_1-r_2=t_1-t_2 \qquad (14a)$$

$$r=rRl \qquad (14b)$$

$$R(r_1l_1-r_2l_2)=t_1-t_2 \qquad (14c)$$

$$R\Delta l=\Delta t \qquad (14d)$$

$$p=rRl+t \qquad (14e)$$

Thus the 3D vector for the sensor position, p, is determined.

Figure 12:
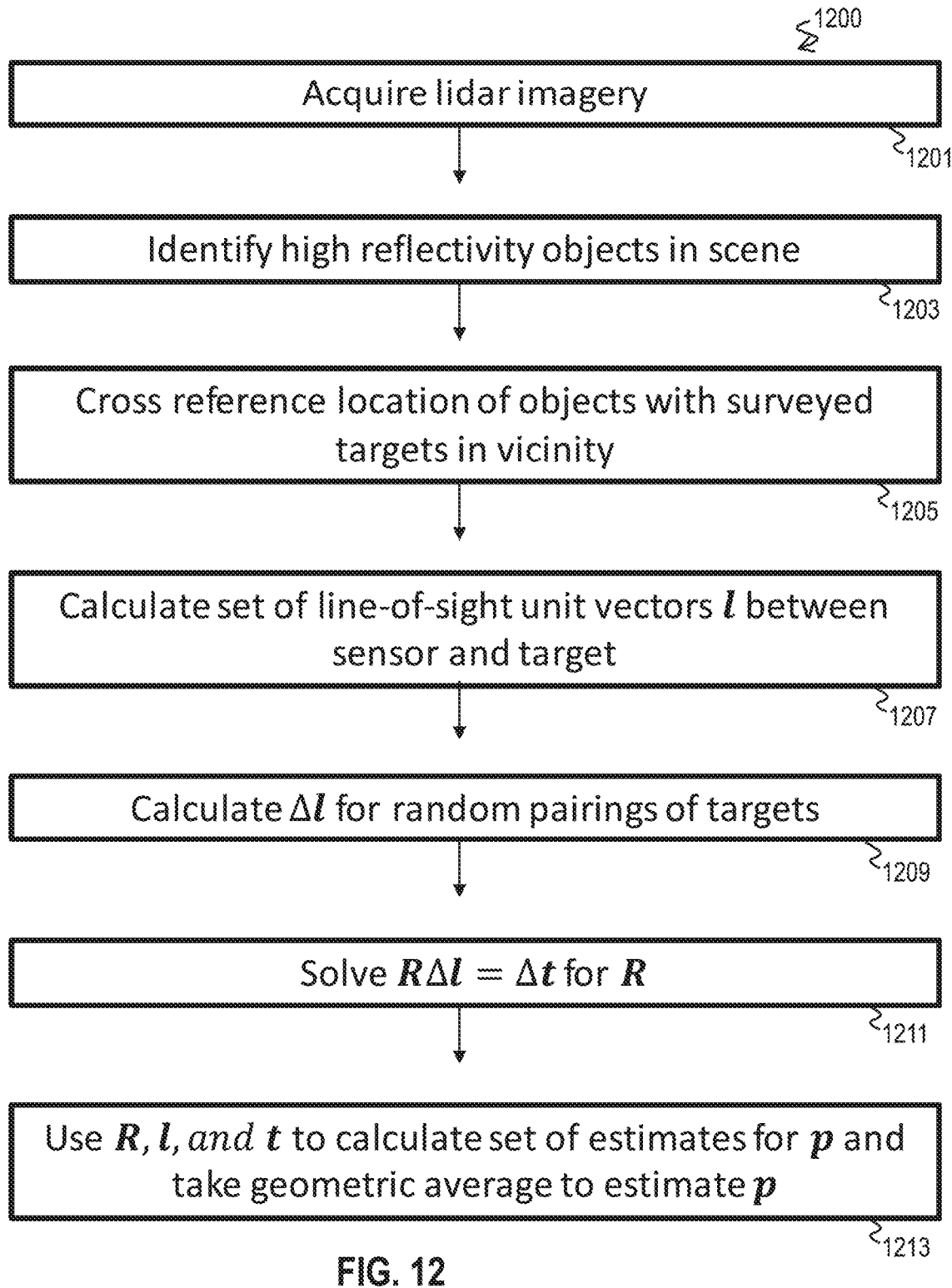
FIG. 12 is a flow diagram that illustrates an example method to determine own position relative to detected surveyed objects, according to an embodiment.

FIG. 12 is a flow diagram that illustrates an example method 1200 to determine own position relative to detected surveyed objects, according to an embodiment. In step 1201, hi-res LIDAR imagery is obtained. It need not be Doppler imagery. In step 1203, high reflectivity objects in scene are identified. These are likely to include objects of known positions, such as street signs 392, lampposts 393, etc. In step 1205, cross reference location of objects with surveyed objects in vicinity, e.g., from a geographic information system (GIS) database. If own position is not well known, these cross references are approximate. e.g., a surveyed object in the GIS might be the detected object or might not. In step 1207, a set of line of sight unit vectors l between sensor and detected objects are determined. In step 1209, $\Delta l$ is calculated for random pairings of such detected objects. In step 1211 solve for R using Equation 14d with measured $\Delta l$ and $\Delta t$ from surveyed position of objects, e.g., from GIS. In step 1213, R, l and t for multiple pairings are each use to estimate position p of sensor. In addition, a geometric average of the multiple values for p is determined to get an estimated value for p. In some embodiments, a confidence level for the value p is also determined during step 213.

Figure 13:
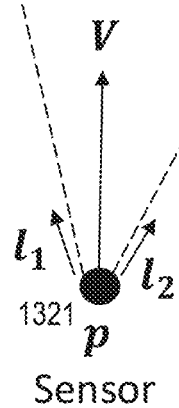
FIG. 13 is a block diagram that illustrates example components of a computation to determine own global velocity, according to an embodiment.

FIG. 13 is a block diagram that illustrates example components of a computation to determine own global velocity, according to an embodiment. In this embodiment, the sensor is on a moving vehicle at position p with velocity V. Sensor 1321 of a hi-res Doppler LIDAR system is mounted on a vehicle at position given by 3D vector p; and, during a scan short compared to a time for the vehicle to move an appreciable distance, receives returns from non-moving spots 1391 and 1392 at different azimuthal angles in response to scanning beams at azimuth angles represented by unit vectors $l_1$ and $l_2$, respectively. The data satisfy the following set of Equations 14a through 14e.

$$V=l'V \qquad (15a)$$

$$V_1-V_2=l'_1V-l'_2V=(l'_1-l'_2)V \qquad (15b)$$

$$\Delta l'V=\Delta V \qquad (15c)$$

$$Vglobal=RVlocal \qquad (15d)$$

Thus the 3D vector for the sensor velocity, Vglobal, is determined.

Figure 14:
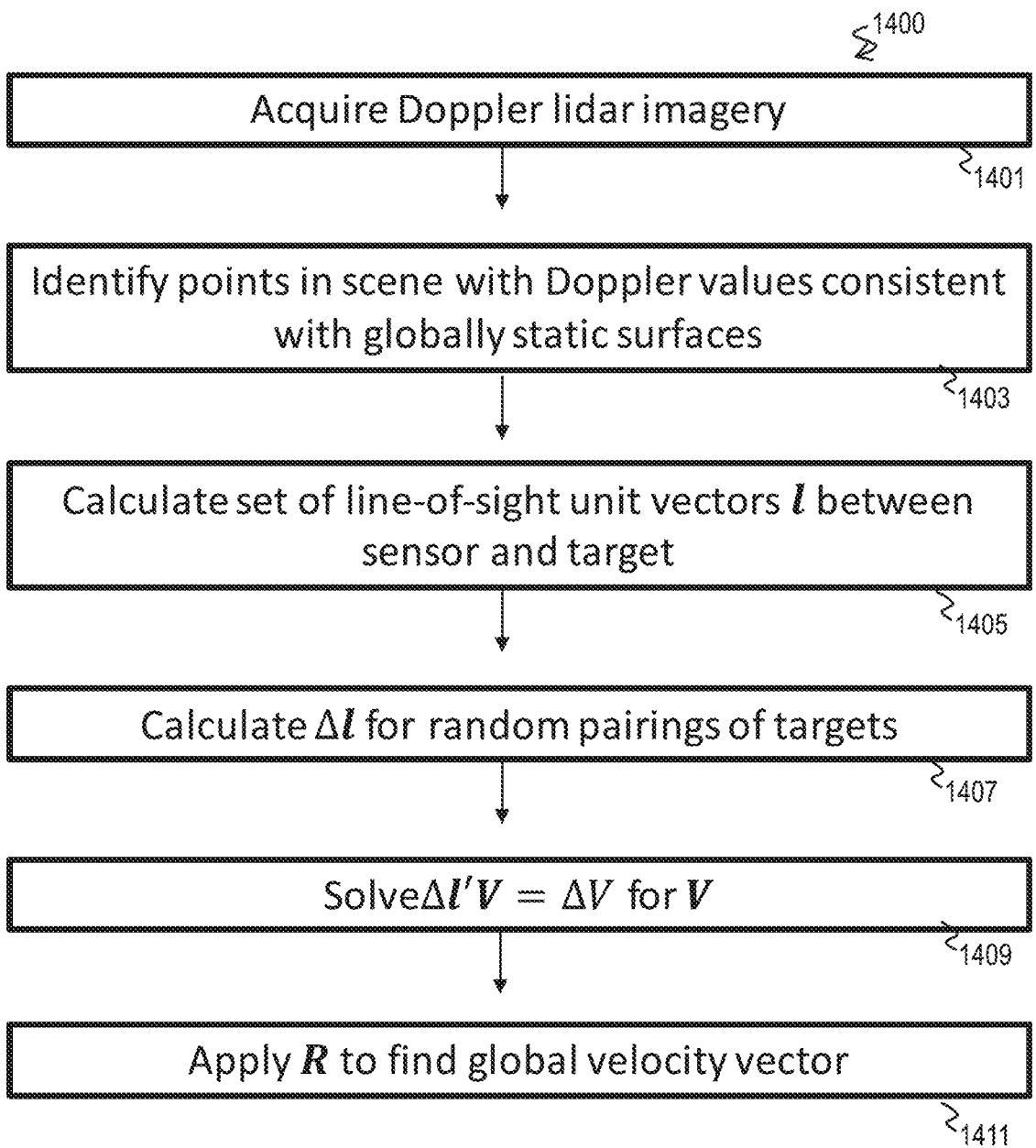
FIG. 14 is a flow diagram that illustrates an example method to determine own global velocity, according to an embodiment.

FIG. 14 is a flow diagram that illustrates an example method 1400 to determine own global velocity, according to an embodiment. In step 1401, hi-res Doppler LIDAR imagery is obtained. In step 1403, identify points in scene with Doppler values consistent with globally static surfaces, using one or more of the techniques described above. In step 1405, a set of line of sight unit vectors l between sensor and detected stationary objects are determined. In step 1407, $\Delta l$ is calculated for such detected spots. In step 1409 solve for Vlocal using Equation 15c with measured $\Delta l'$ and $\Delta □$. In step 1411, R is used to estimate Vglobal.

Figure 15:
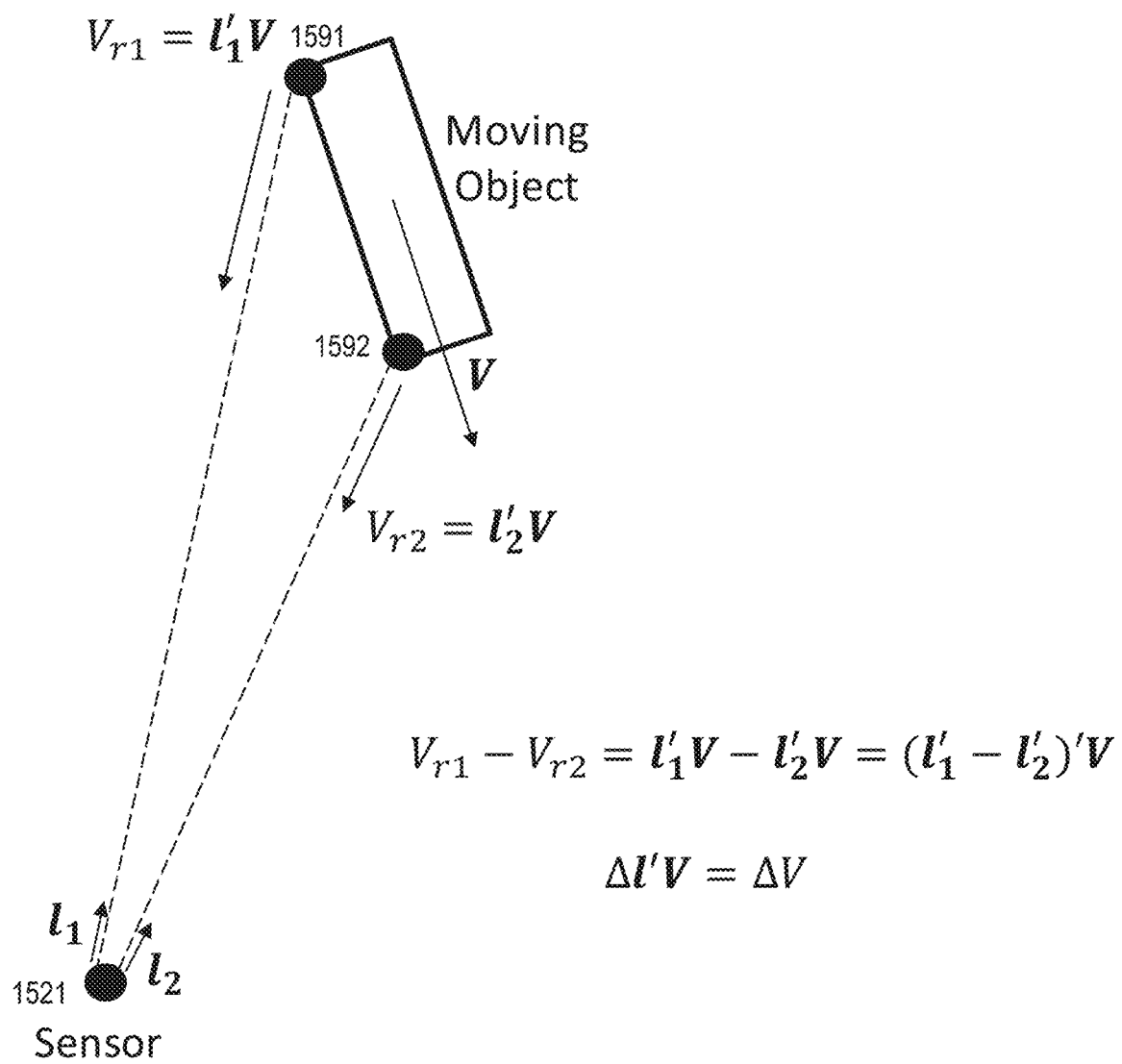
FIG. 15 is a block diagram that illustrates example components of a computation to determine rate of turning of a moving object relative to own vehicle, according to an embodiment.

FIG. 15 is a block diagram that illustrates example components of a computation to determine rate of turning of a moving object relative to own vehicle, according to an embodiment. Sensor 1521 of a hi-res Doppler LIDAR system is mounted on a vehicle; and, during a scan short compared to a time for the vehicle to move an appreciable distance, receives returns from spots 1591 and 1592 at different locations on a turning object moving with velocity V. The spots are at azimuthal angles detected in response to scanning beams at azimuth angles represented by unit vectors $l_1$ and $l_2$, respectively. The detected Doppler speeds are $V_{r1}$ and $V_{r2}$, respectively. The data satisfy the following set of Equations 16a through 16d.

$$V_{r1}=l'_1V \qquad (16a)$$

$$V_{r2}=l'_2V \qquad (16b)$$

$$V_{r1}-V_{r2}=l'_1V-l'_2V=(l'_1-l'_2)V \qquad (16c)$$

$$\Delta l'V=\Delta V \qquad (16d)$$

Thus the global velocity of the target is obtained from the relative velocity of the two spots on the moving target.

Figure 16:
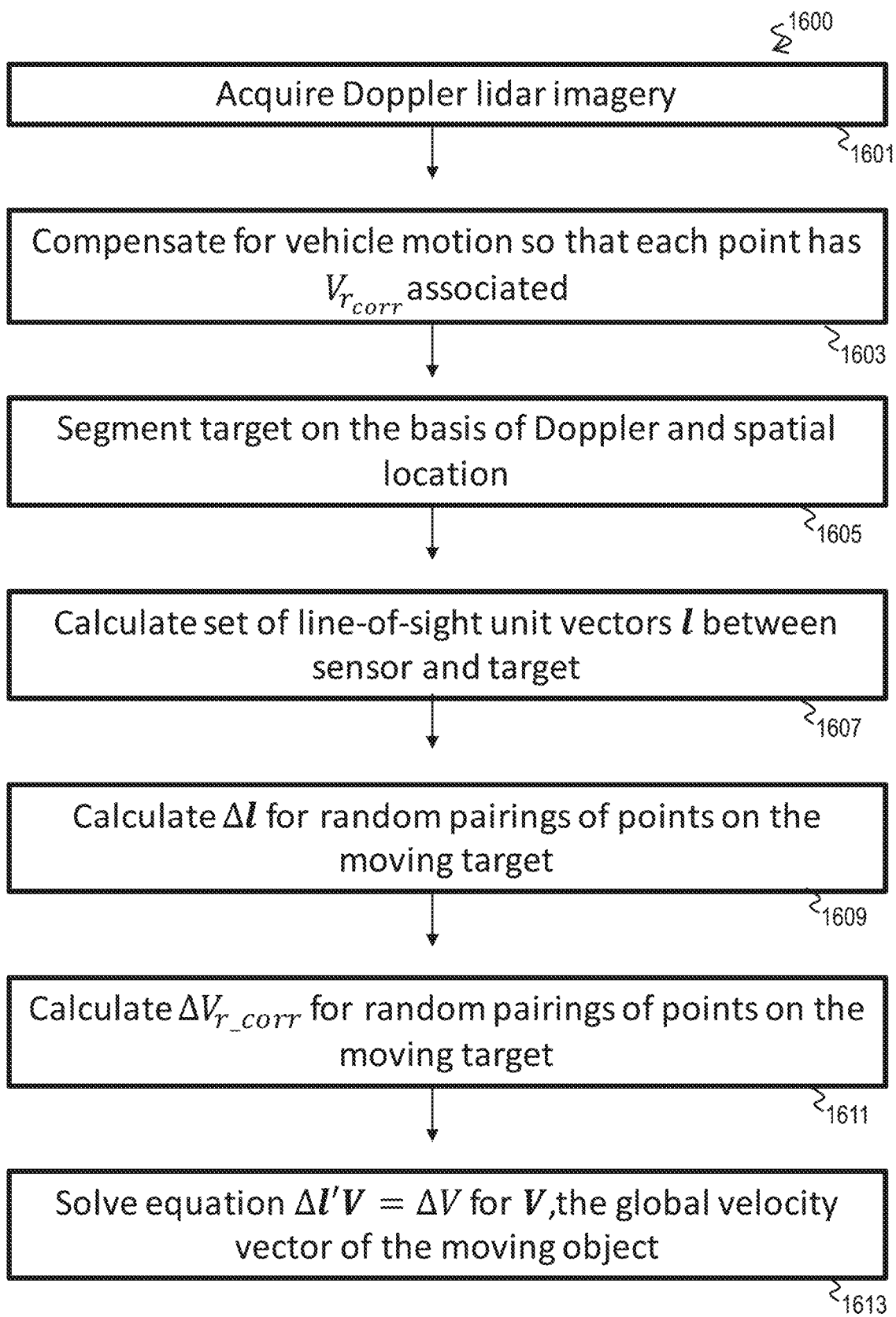
FIG. 16 is a flow diagram that illustrates an example method to determine global velocity of a moving object, according to an embodiment.

FIG. 16 is a flow diagram that illustrates an example method 1600 to determine global velocity of a moving object, according to an embodiment. In step 1601, hi-res Doppler LIDAR imagery is obtained. In step 1603, own vehicle motion is corrected for using Equation 13 to obtain Vr_corr for each spot detected. In step 1605, several spots on the same moving object are clustered based on Doppler speed and azimuthal angle proximity. In step 1607, a set of line of sight unit vectors l between sensor and detected spots on moving object are determined. In step 1609, $\Delta l$ is calculated for random pairings of such detected spots. In step 1611, $\Delta Vr\_corr$ is calculated for random pairings of such detected spots. In step 1613, solve for V using Equation 16d with measured $\Delta l'$ and $\Delta V$. This V is used as Vglobal for the detected object. A linear velocity is the subject of the equations in FIG. 15 and the method in FIG. 16. However, rotating objects may violate that equality\; and some measure of rotation rate would be advantageous.

5. Example Embodiments

Figure 17A:
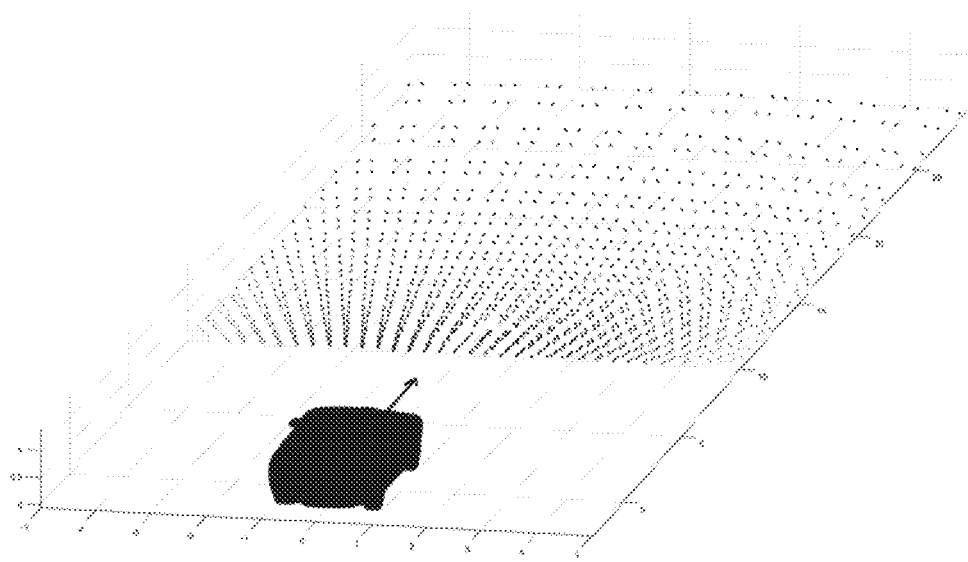
FIG. 17A is a block diagram that illustrates example locations of illuminated spots from a hi-res Doppler LIDAR system, according to an embodiment.

FIG. 17A is a block diagram that illustrates example locations of illuminated spots from a hi-res Doppler LIDAR system, according to an embodiment. These scanned spots are on the road surface and used to determine own global velocity according to method 600 or method 800.

Figure 17B:
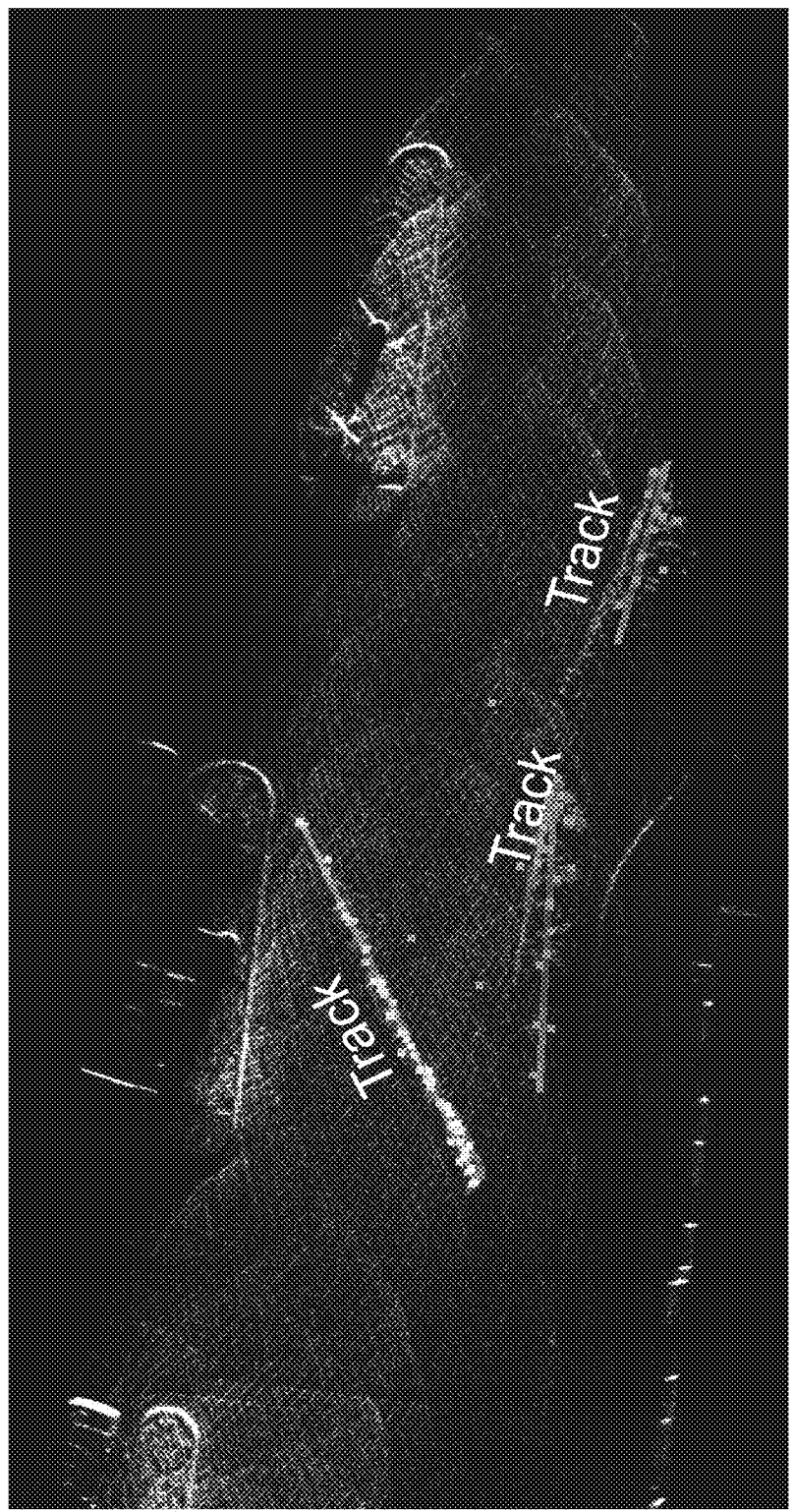
FIG. 17B through FIG. 17D are images that illustrate example returns from illuminated spots indicating returns from stationary objects and tracks of moving objects, according to an embodiment.
Figure 17C:
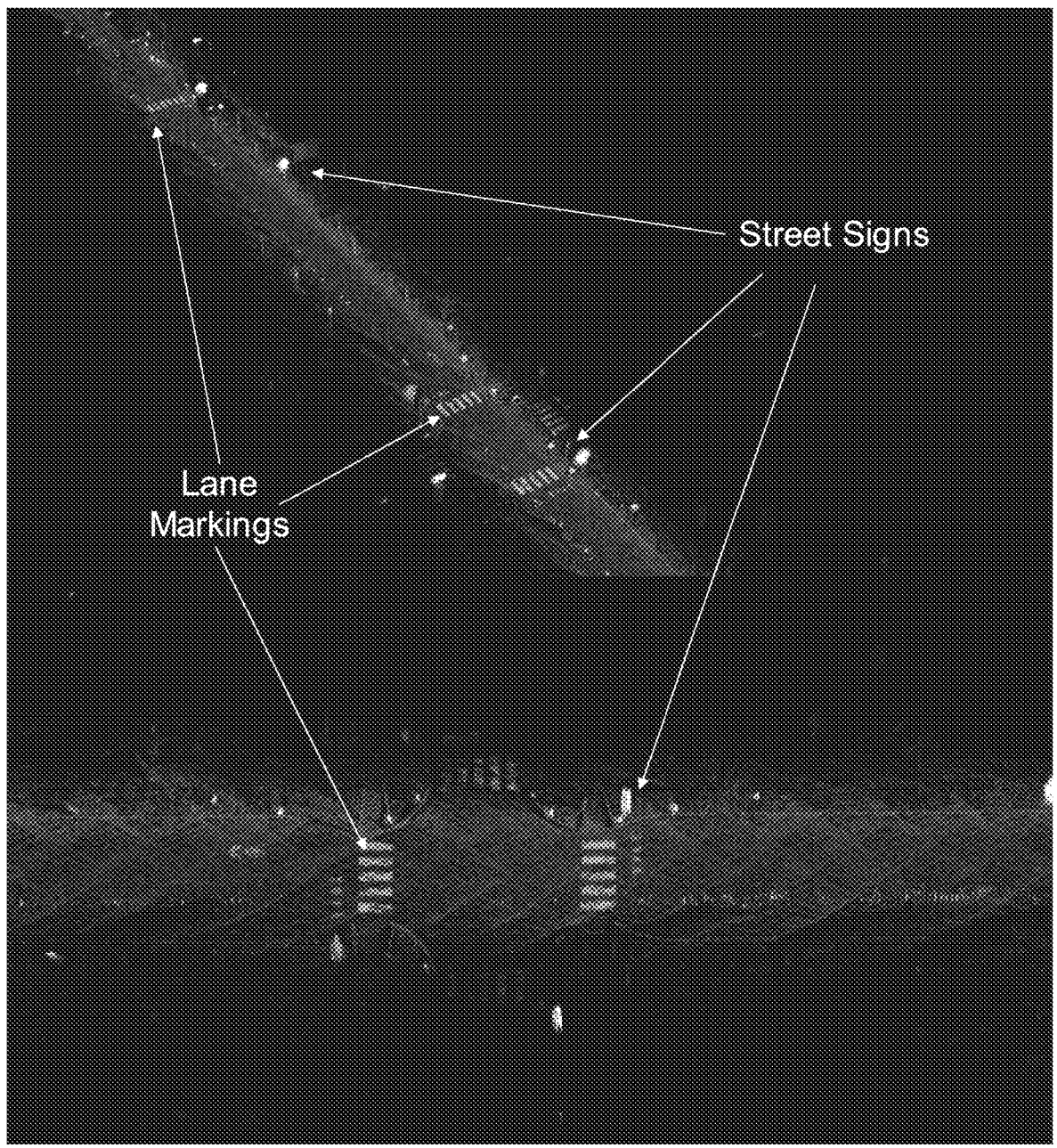
Figure 17D:

FIG. 17B through FIG. 17D are images that illustrate example returns from illuminated spots indicating returns from stationary objects and tracks of moving objects, according to an embodiment. These images are used to track objects using method 800 or 1000.

Figure 18A:
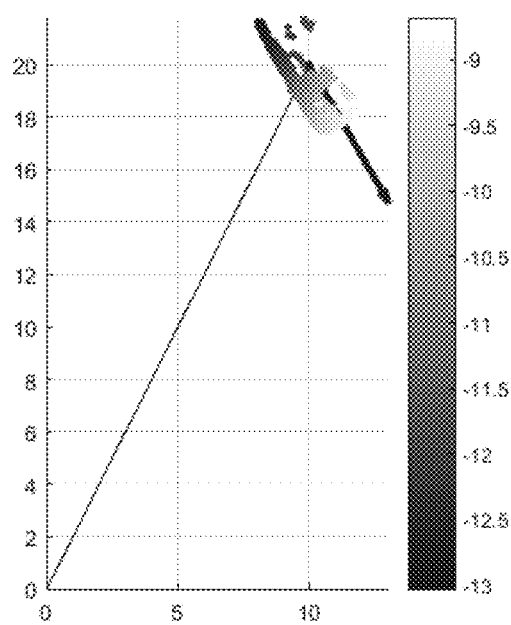
FIG. 18A through FIG. 18C are graphs that illustrate example returns from a separate vehicle as a moving object, according to an embodiment.
Figure 18B:
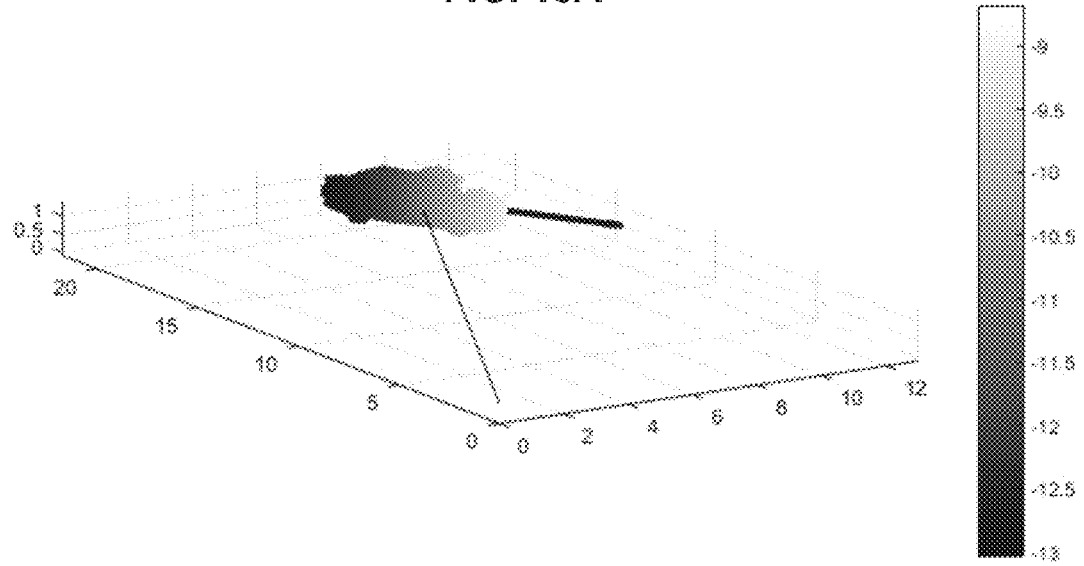
Figure 18C:
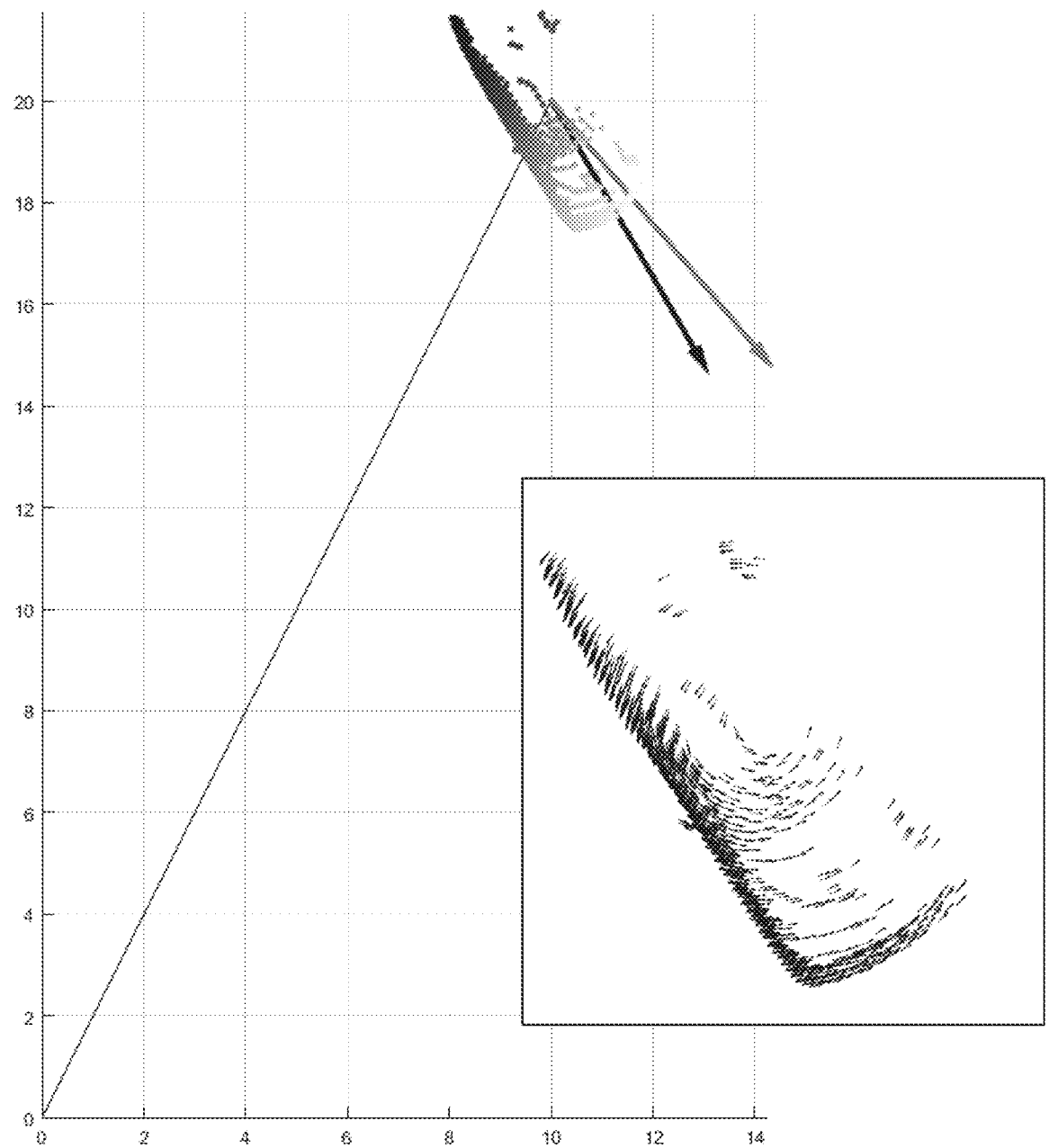

FIG. 18A through FIG. 18C are graphs that illustrate example returns from a separate vehicle as a moving object, according to an embodiment. Doppler points are clustered by speed and azimuthal and inclination angle proximity. The net movement of the object is determined using the method 1600.

Figure 18D:
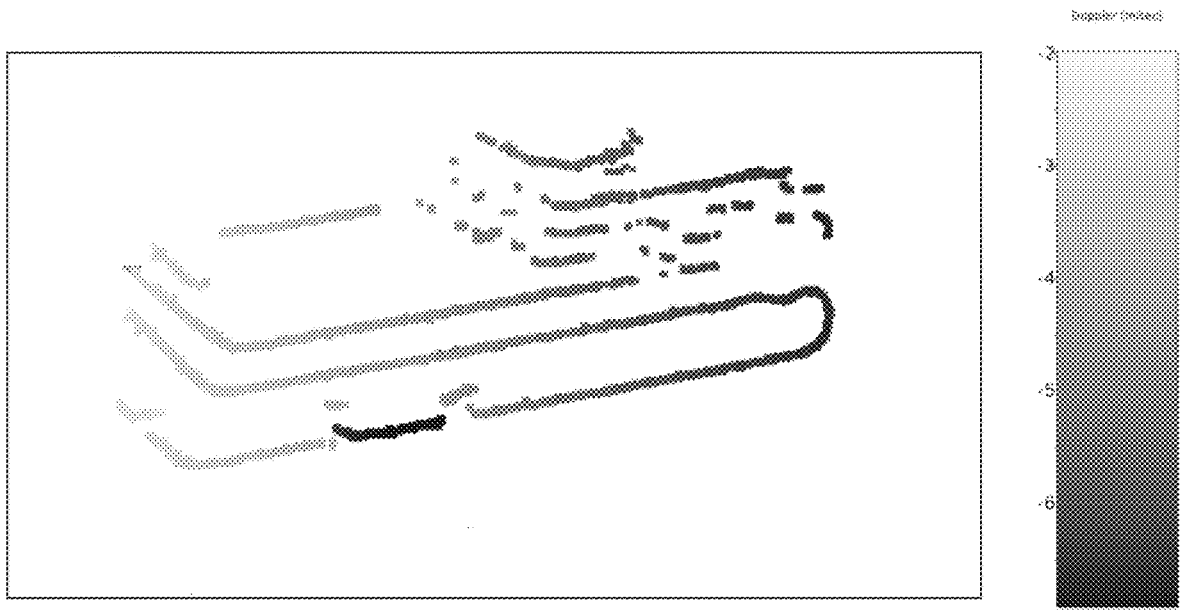
FIG. 18D and FIG. 18E are plots that illustrate example measured point clouds according to an embodiment.
Figure 18E:

FIG. 18D and FIG. 18E are plots that illustrate example measured point clouds according to an embodiment. Each point is shaded according to the measured velocity. A pickup truck turning a corner is depicted, so this object is undergoing translational and rotational motion simultaneously. This is a real-data manifestation of the simulated data depicted in FIG. 8A and FIG. 8B.

6. Computational Hardware Overview

Figure 19:
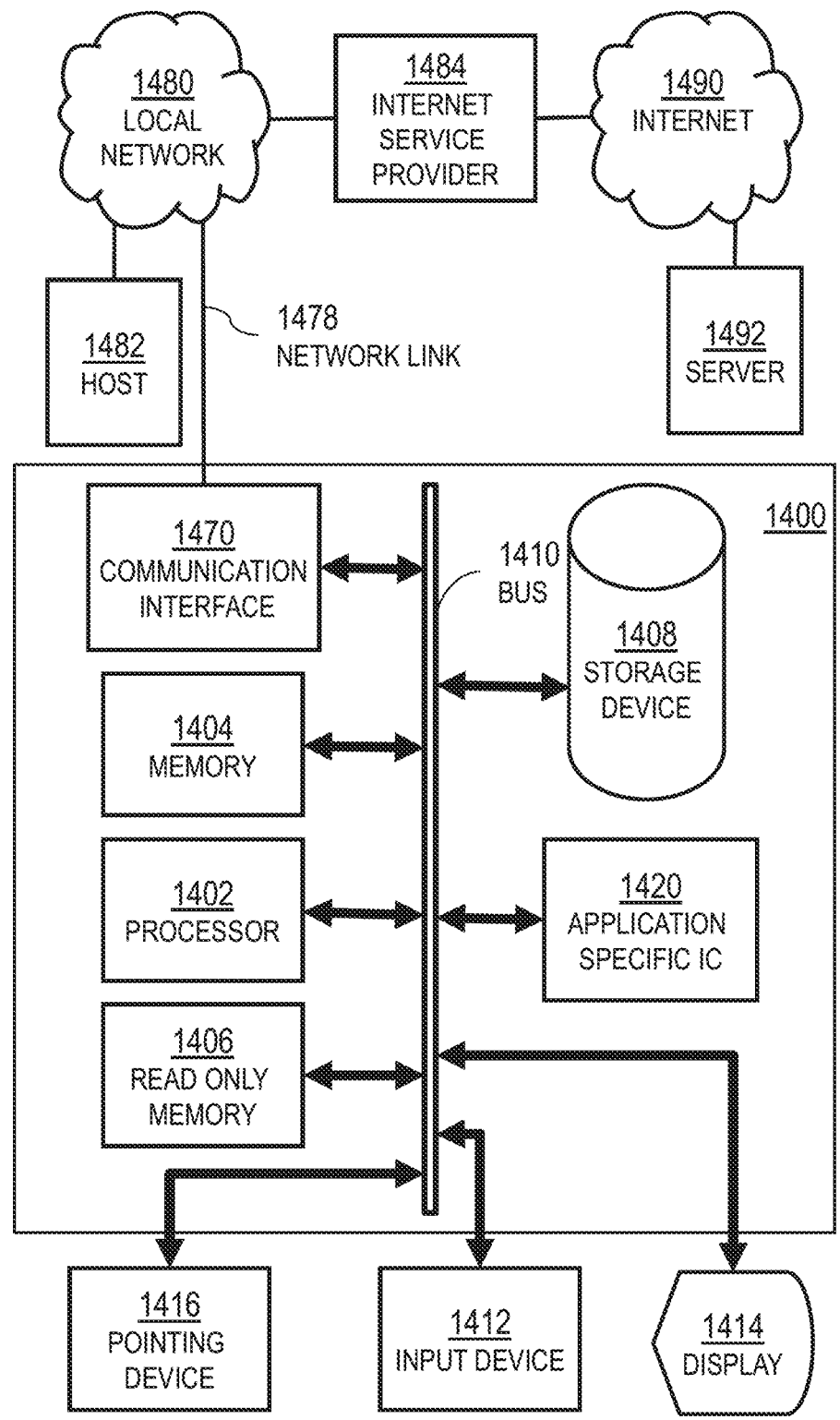
FIG. 19 is a block diagram that illustrates a computer system upon which an embodiment of the invention may be implemented.

FIG. 19 is a block diagram that illustrates a computer system 1900 upon which an embodiment of the invention may be implemented. Computer system 1900 includes a communication mechanism such as a bus 1910 for passing information between other internal and external components of the computer system 1900. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1900, or a portion thereof, constitutes a means for performing one or more steps of one or more methods described herein.

A sequence of binary digits constitutes digital data that is used to represent a number or code for a character. A bus 1910 includes many parallel conductors of information so that information is transferred quickly among devices coupled to the bus 1910. One or more processors 1902 for processing information are coupled with the bus 1910. A processor 1902 performs a set of operations on information. The set of operations include bringing information in from the bus 1910 and placing information on the bus 1910. The set of operations also typically include comparing two or more units of information, shifting positions of units of information, and combining two or more units of information, such as by addition or multiplication. A sequence of operations to be executed by the processor 1902 constitutes computer instructions.

Computer system 1900 also includes a memory 1904 coupled to bus 1910. The memory 1904, such as a random access memory (RAM) or other dynamic storage device, stores information including computer instructions. Dynamic memory allows information stored therein to be changed by the computer system 1900. RAM allows a unit of information stored at a location called a memory address to be stored and retrieved independently of information at neighboring addresses. The memory 1904 is also used by the processor 1902 to store temporary values during execution of computer instructions. The computer system 1900 also includes a read only memory (ROM) 1906 or other static storage device coupled to the bus 1910 for storing static information, including instructions, that is not changed by the computer system 1900. Also coupled to bus 1910 is a non-volatile (persistent) storage device 1908, such as a magnetic disk or optical disk, for storing information, including instructions, that persists even when the computer system 1900 is turned off or otherwise loses power.

Information, including instructions, is provided to the bus 1910 for use by the processor from an external input device 1912, such as a keyboard containing alphanumeric keys operated by a human user, or a sensor. A sensor detects conditions in its vicinity and transforms those detections into signals compatible with the signals used to represent information in computer system 1900. Other external devices coupled to bus 1910, used primarily for interacting with humans, include a display device 1914, such as a cathode ray tube (CRT) or a liquid crystal display (LCD), for presenting images, and a pointing device 1916, such as a mouse or a trackball or cursor direction keys, for controlling a position of a small cursor image presented on the display 1914 and issuing commands associated with graphical elements presented on the display 1914.

In the illustrated embodiment, special purpose hardware, such as an application specific integrated circuit (IC) 1920, is coupled to bus 1910. The special purpose hardware is configured to perform operations not performed by processor 1902 quickly enough for special purposes. Examples of application specific ICs include graphics accelerator cards for generating images for display 1914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1900 also includes one or more instances of a communications interface 1970 coupled to bus 1910. Communication interface 1970 provides a two-way communication coupling to a variety of external devices that operate with their own processors, such as printers, scanners and external disks. In general the coupling is with a network link 1978 that is connected to a local network 1980 to which a variety of external devices with their own processors are connected. For example, communication interface 1970 may be a parallel port or a serial port or a universal serial bus (USB) port on a personal computer. In some embodiments, communications interface 1970 is an integrated services digital network (ISDN) card or a digital subscriber line (DSL) card or a telephone modem that provides an information communication connection to a corresponding type of telephone line. In some embodiments, a communication interface 1970 is a cable modem that converts signals on bus 1910 into signals for a communication connection over a coaxial cable or into optical signals for a communication connection over a fiber optic cable. As another example, communications interface 1970 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1970 sends and receives electrical, acoustic or electromagnetic signals, including infrared and optical signals, that carry information streams, such as digital data.

The term computer-readable medium is used herein to refer to any medium that participates in providing information to processor 1902, including instructions for execution. Such a medium may take many forms, including, but not limited to, non-volatile media, volatile media and transmission media. Non-volatile media include, for example, optical or magnetic disks, such as storage device 1908. Volatile media include, for example, dynamic memory 1904. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1902, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1902, except for carrier waves and other signals.

Logic encoded in one or more tangible media includes one or both of processor instructions on a computer-readable storage media and special purpose hardware, such as ASIC 1920.

Network link 1978 typically provides information communication through one or more networks to other devices that use or process the information. For example, network link 1978 may provide a connection through local network 1980 to a host computer 1982 or to equipment 1984 operated by an Internet Service Provider (ISP). ISP equipment 1984 in turn provides data communication services through the public, world-wide packet-switching communication network of networks now commonly referred to as the Internet 1990. A computer called a server 1992 connected to the Internet provides a service in response to information received over the Internet. For example, server 1992 provides information representing video data for presentation at display 1914.

The invention is related to the use of computer system 1900 for implementing the techniques described herein. According to one embodiment of the invention, those techniques are performed by computer system 1900 in response to processor 1902 executing one or more sequences of one or more instructions contained in memory 1904. Such instructions, also called software and program code, may be read into memory 1904 from another computer-readable medium such as storage device 1908. Execution of the sequences of instructions contained in memory 1904 causes processor 1902 to perform the method steps described herein. In alternative embodiments, hardware, such as application specific integrated circuit 1920, may be used in place of or in combination with software to implement the invention. Thus, embodiments of the invention are not limited to any specific combination of hardware and software.

The signals transmitted over network link 1978 and other networks through communications interface 1970, carry information to and from computer system 1900. Computer system 1900 can send and receive information, including program code, through the networks 1980, 1990 among others, through network link 1978 and communications interface 1970. In an example using the Internet 1990, a server 1992 transmits program code for a particular application, requested by a message sent from computer 1900, through Internet 1990, ISP equipment 1984, local network 1980 and communications interface 1970. The received code may be executed by processor 1902 as it is received, or may be stored in storage device 1908 or other non-volatile storage for later execution, or both. In this manner, computer system 1900 may obtain application program code in the form of a signal on a carrier wave.

Various forms of computer readable media may be involved in carrying one or more sequence of instructions or data or both to processor 1902 for execution. For example, instructions and data may initially be carried on a magnetic disk of a remote computer such as host 1982. The remote computer loads the instructions and data into its dynamic memory and sends the instructions and data over a telephone line using a modem. A modem local to the computer system 1900 receives the instructions and data on a telephone line and uses an infra-red transmitter to convert the instructions and data to a signal on an infra-red a carrier wave serving as the network link 1978. An infrared detector serving as communications interface 1970 receives the instructions and data carried in the infrared signal and places information representing the instructions and data onto bus 1910. Bus 1910 carries the information to memory 1904 from which processor 1902 retrieves and executes the instructions using some of the data sent with the instructions. The instructions and data received in memory 1904 may optionally be stored on storage device 1908, either before or after execution by the processor 1902.

Figure 20:
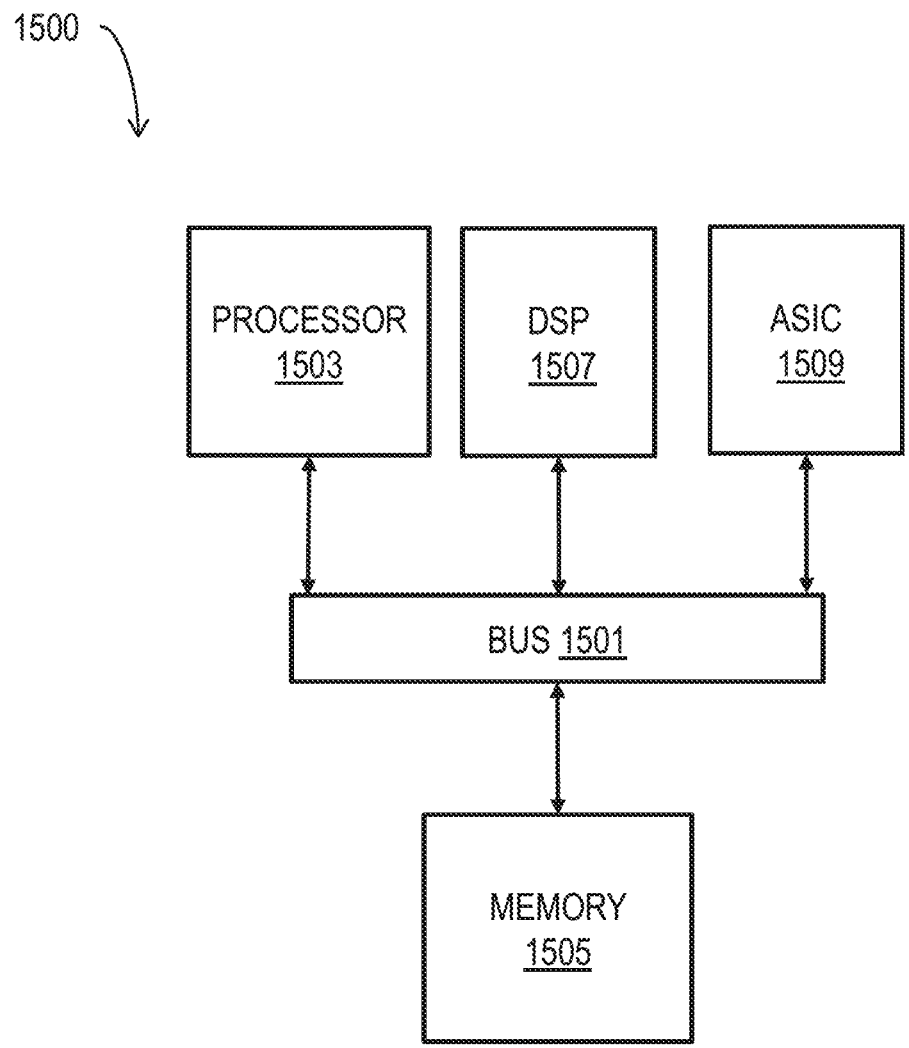
FIG. 20 illustrates a chip set upon which an embodiment of the invention may be implemented.

FIG. 20 illustrates a chip set 2000 upon which an embodiment of the invention may be implemented. Chip set 2000 is programmed to perform one or more steps of a method described herein and includes, for instance, the processor and memory components described with respect to FIG. 19 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2000, or a portion thereof, constitutes a means for performing one or more steps of a method described herein.

In one embodiment, the chip set 2000 includes a communication mechanism such as a bus 2001 for passing information among the components of the chip set 2000. A processor 2003 has connectivity to the bus 2001 to execute instructions and process information stored in, for example, a memory 2005. The processor 2003 may include one or more processing cores with each core configured to perform independently. A multi-core processor enables multiprocessing within a single physical package. Examples of a multi-core processor include two, four, eight, or greater numbers of processing cores. Alternatively or in addition, the processor 2003 may include one or more microprocessors configured in tandem via the bus 2001 to enable independent execution of instructions, pipelining, and multithreading. The processor 2003 may also be accompanied with one or more specialized components to perform certain processing functions and tasks such as one or more digital signal processors (DSP) 2007, or one or more application-specific integrated circuits (ASIC) 2009. A DSP 2007 typically is configured to process real-world signals (e.g., sound) in real time independently of the processor 2003. Similarly, an ASIC 2009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2003 and accompanying components have connectivity to the memory 2005 via the bus 2001. The memory 2005 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 2005 also stores the data associated with or generated by the execution of one or more steps of the methods described herein.

7. Alterations, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A light detection and ranging (LIDAR) sensor system for a vehicle, comprising:
   one or more scanning optics coupled to an autonomous vehicle and configured to output a first transmit signal at a first angle and a second transmit signal at a second angle; and
   one or more processors configured to:
      receive a first return signal from at least one of reflection or scattering of the first transmit signal by an object, the first return signal associated with a first location on the object;
      receive a second return signal from at least one of reflection or scattering of the second transmit signal by the object, the second transmit signal associated with a second location on the object;
      determine a rate of turning of the object by determining a Doppler feature of the object based on the first return signal and the second return signal; and
      provide a control signal to a control system of the vehicle for the control system to control operation of at least one of a steering system of the vehicle or a braking system of the vehicle responsive to the rate of turning of the object.

2. The LIDAR sensor system of claim 1, wherein the first angle is different from the second angle.

3. The LIDAR sensor system of claim 1, further comprising a laser source configured to generate a beam, wherein the one or more scanning optics are configured to output the beam as the first transmit signal.

4. The LIDAR sensor system of claim 1, wherein the one or more processors are configured to determine a three dimensional (3D) point cloud based on the first return signal and the second return signal.

5. The LIDAR sensor system of claim 1, wherein the one or more processors are configured to determine a track for the object based on the rate of turning.

6. The LIDAR sensor system of claim 1, further comprising a modulator configured to apply at least one of phase modulation or frequency modulation to a beam from a laser source to generate the at least one transmit signal.

7. An autonomous vehicle, comprising:
   a LIDAR system configured to:
      output a first transmit signal at a first angle and a second transmit signal at a second angle;
      receive a first return signal from reflection or scattering of the first transmit signal by an object and a second return signal from reflection or scattering of the second transmit signal by the object, the first return signal associated with a first location on the object, the second return signal associated with a second location on the object; and
      determine a rate of turning of the object by determining a Doppler feature of the object based on the first return signal and the second return signal;
   a steering system;
   a braking system; and
   a vehicle controller configured to control operation of at least one of the steering system or the braking system responsive to the rate of turning of the object.

8. The autonomous vehicle of claim 7, wherein the LIDAR sensor system comprises a laser source configured to generate a beam and one or more scanning optics are configured to output the beam as the first transmit signal.

9. The autonomous vehicle of claim 7, wherein the LIDAR system comprises one or more processors configured to determine a three dimensional (3D) point cloud based on the first return signal and the second return signal.

10. The autonomous vehicle of claim 7, wherein the LIDAR system comprises one or more processors configured to determine a track for the object based on the rate of turning.

11. The autonomous vehicle of claim 7, further comprising a modulator configured to apply at least one of phase modulation or frequency modulation to a beam from a laser source to generate the first transmit signal.

12. A vehicle control system, comprising:
   a LIDAR system coupled with a vehicle, the LIDAR system comprising one or more processors configured to:
      receive a first return signal from at least one of reflection or scattering of a first transmit signal by a remote vehicle, the first transmit signal transmitted at a first angle and the first return signal associated with a first location on the remote vehicle;
      receive a second return signal from at least one of reflection or scattering of a second transmit signal by the remote vehicle, the second transmit signal transmitted at a second angle and the second return signal associated with a second location on the remote vehicle; and
      determine a rate of turning of the remote vehicle by determining a Doppler feature of the remote vehicle based on the first return signal and the second return signal; and a vehicle controller configured to control operation of at least one of a steering system of the vehicle or a braking system of the vehicle responsive to the rate of turning of the remote vehicle.

13. The vehicle control system of claim 12, further comprising a laser source configured to generate a beam, wherein the one or more scanning optics are configured to output the beam as the first transmit signal and the second transmit signal.

14. The vehicle control system of claim 12, wherein the one or more processors are configured to determine a three dimensional (3D) point cloud based on the first return signal and the second return signal.

15. The vehicle control system of claim 12, further comprising a sensor comprising at least one of an inertial navigation system (INS), a global positioning system (GPS) receiver, or a gyroscope, wherein the one or more processors of the LIDAR system are configured to determine the rate of turning further based on sensor data received from the sensor.

\* \* \* \* \*